United States Patent [19]
Bledsoe

[11] Patent Number: 5,742,237
[45] Date of Patent: Apr. 21, 1998

[54] TAG LOCATION MONITOR

[75] Inventor: William Byron Bledsoe, Marietta, Ga.

[73] Assignee: Lockheed Martin Corporation, Bethesda, Md.

[21] Appl. No.: 565,092

[22] Filed: Nov. 30, 1995

[51] Int. Cl.[6] .......................... G06K 15/00; H04B 7/00; G08B 5/22; H04Q 7/00
[52] U.S. Cl. .................. 340/825.49; 340/825.35; 340/825.54; 340/572; 235/375
[58] Field of Search .................. 340/825.49, 825.54, 340/825.35, 825.02, 825.06, 539, 572, 825.03, 827, 825.36, 505, 568; 235/375

[56] References Cited

U.S. PATENT DOCUMENTS

| | | | |
|---|---|---|---|
| 4,783,655 | 11/1988 | Cobb et al. | 340/825.49 |
| 4,814,742 | 3/1989 | Morita et al. | 340/825.54 |
| 4,816,824 | 3/1989 | Katz et al. | 340/825.34 |
| 5,051,741 | 9/1991 | Wesby | 340/825.49 |
| 5,401,947 | 3/1995 | Poland | 235/383 |
| 5,424,858 | 6/1995 | Gillotte | 359/143 |
| 5,442,343 | 8/1995 | Cato et al. | 340/825.35 |
| 5,448,226 | 9/1995 | Failing, Jr. et al. | 340/825.35 |
| 5,537,126 | 7/1996 | Kayser et al. | 345/1 |
| 5,565,858 | 10/1996 | Guthrie | 340/825.35 |
| 5,594,425 | 1/1997 | Ladner et al. | 340/825.06 |

Primary Examiner—Michael Horabik
Assistant Examiner—Yonel Beaulieu
Attorney, Agent, or Firm—Eric R. Katz

[57] ABSTRACT

A monitor network of a tag location system includes a grid of monitors for transmitting and receiving messages from neighboring monitors and tags within range of the monitor. Also provided is a memory device for storing: a unique identity of the monitor; each input partner monitor from which the monitor receives messages, and an output partner monitor to which the monitor sends messages; monitor and tag signals; a signal strength of the tag signals and significant changes thereto; an acknowledgement signal; and a distress signal indicating that the monitor has not received acknowledgement signal from its output partner monitor. Further there is a computer for periodically causing all tag signals, associated signal strengths and significant changes stored in the memory device to be transmitted to the output partner monitor, for forwarding received monitor messages to the output partner monitor, for issuing the acknowledgement message to be transmitted of a monitor message, for determining receipt of an acknowledgement and for sending a distress signal to all neighboring monitors within range of the monitor if an acknowledgement signal is not received from the output partner monitor. Tag signals issued by tags and received by the monitor directly from tags within range of the monitor or from input partner monitors are transmitted to the output partner monitor for forwarding to the central station, and wherein, monitor messages issued by the central station and receive from input monitors are transmitted, if required, to the output monitor.

12 Claims, 90 Drawing Sheets

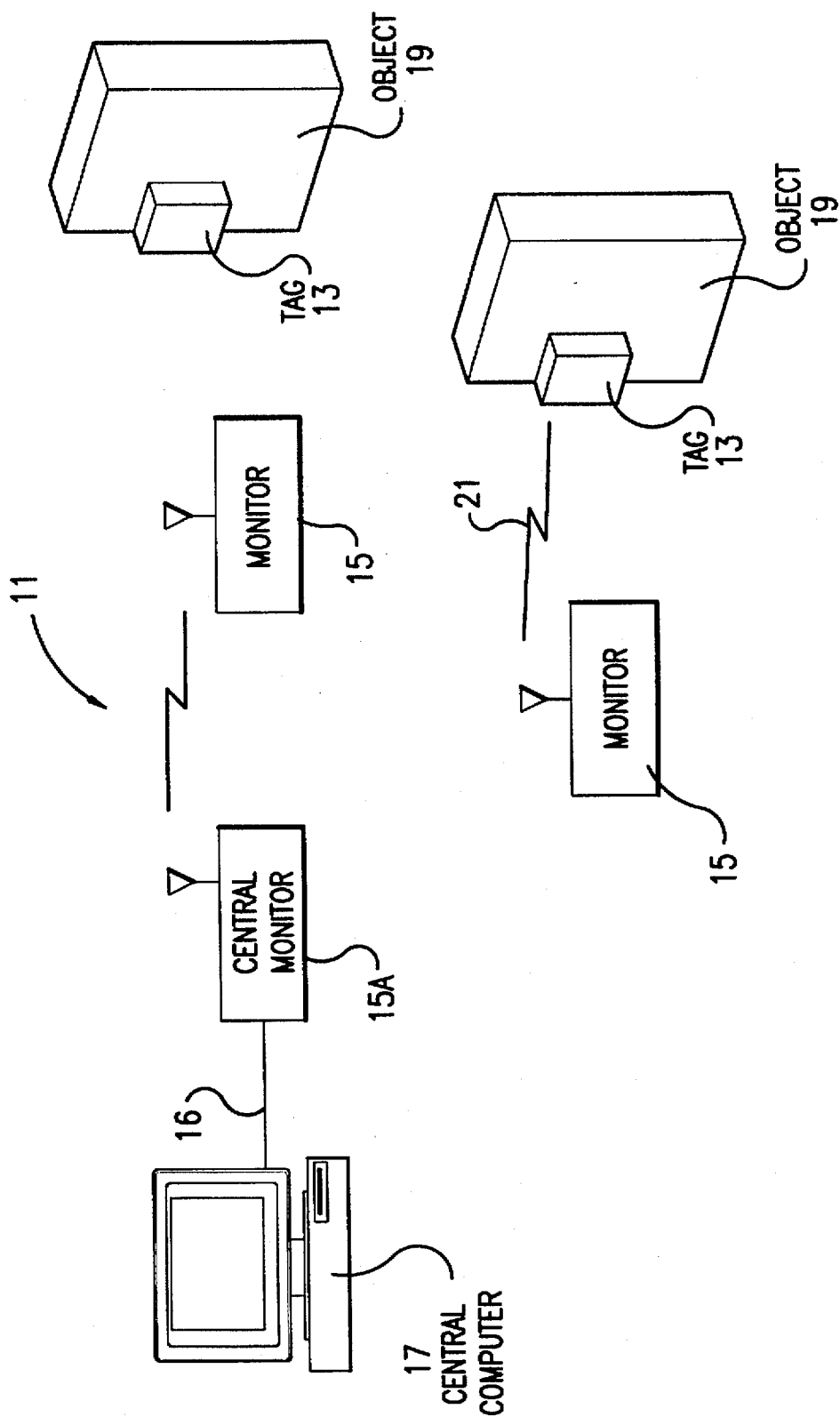

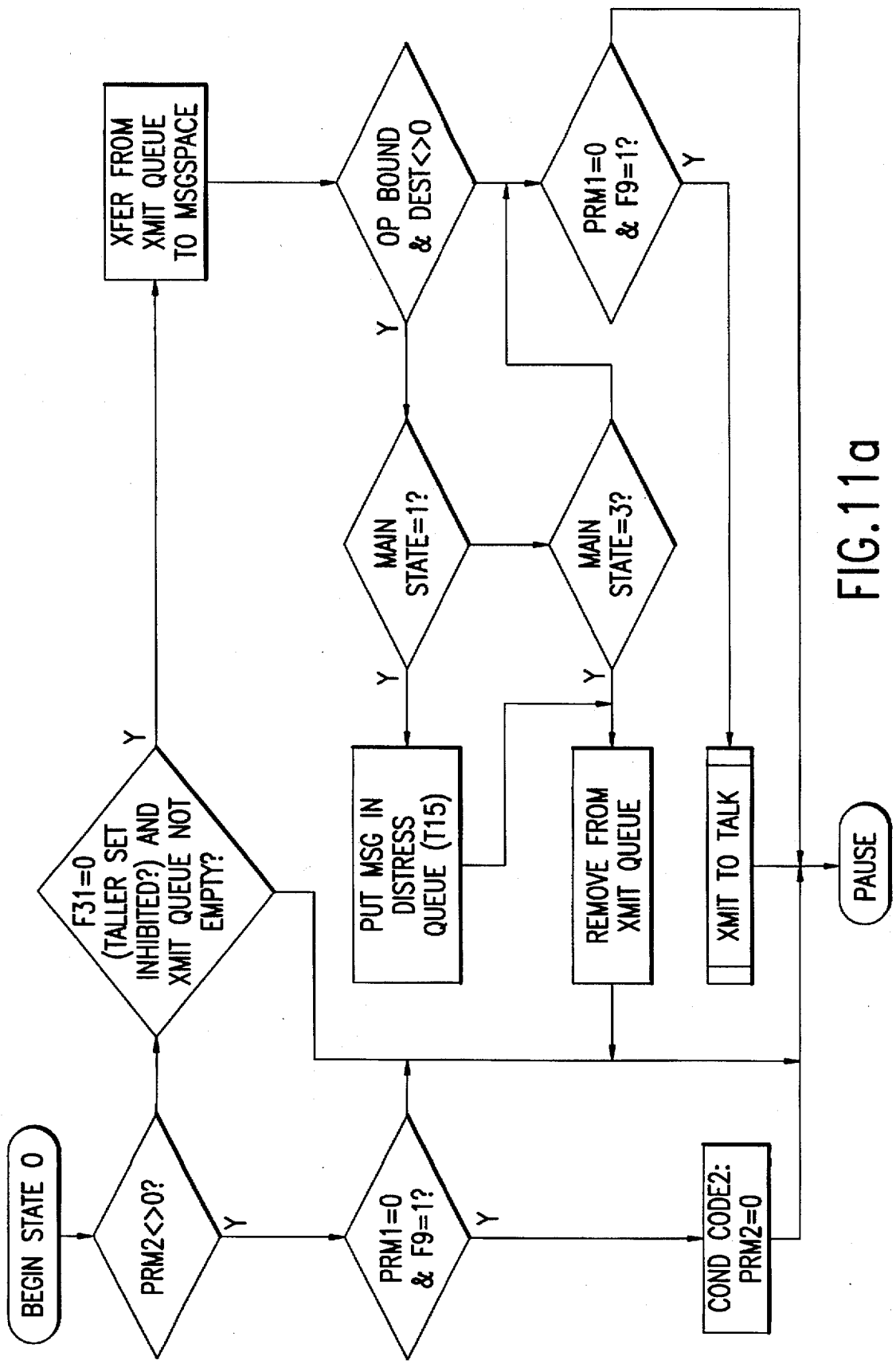

| | |
|---|---|
| p1 | Traffic (count) parameter. |
| p2 | Sensor to be sent a code 2 (0 if none) |
| f7 | We have received a request for all tags |
| f8 | Stack depth (developmental purposes only - not used in final version) |
| f9 | Receiver is quiet. |
| p0b | Output partner id |
| p10 | Stack depth (developmental purposes only - not used in final version) |
| p16 | # times we have re-transmitted current message |
| f17 | Code 2 has been received |
| p20 | Main's mode (state) of operation - initialization(0) distress(1), normal cycle(2), or central down(3) (Note: normal cycle for central is p20 = 1.) |
| p22 | Transmit's state - uncommitted(0), awaiting acknowledge(1), broadcast mode(4) |
| f23 | True if central computer is down. |
| p24 | Current time - updated by timer interrupts (low order word) |
| p25 | High order byte of current time |
| p26 | General purpose time stamp used in testing (low order) |
| p27 | General purpose time stamp used in testing (high order) |
| f28 | Set when code 9 is received from OP, cleared on entry to distress mode. |
| f29 | Set when distress situation is detected, cleared on entry to distress mode. |
| p2e | Time of next send if message is not acknowledged (low order) |
| p2f | Time of next send if message is not acknowledged (high order) |
| f31 | Talker condition is inhibited. |
| f32 | Code12 has been sent in current cycle. |
| f33 | T4 is not empty. |
| f34 | Broadcast has been sent to IP's but all of the IP's haven't acknowledged. |
| p36 | Sensor level |
| p37 | Sensor ID of sensor we are expecting an acknowledge from. |
| p38 | Sequence count |
| p39 | Normal cycle stage |
| p3a | Tag hash table high miss count |
| p3b | Last measured signal strength |
| p3c | Receiver noise level |
| p3e | Tentative op id |

FIG.17

Message Code  Meaning
- 0    Synchronization broadcast
- 1    Message from tag
- 2    Response...message was ok, Ok to talk or continue
- 9    Request partnership (always forwarded to central)
- 0a   Partnership grant - This message is always originally sent from central.
- 0d   IP added message - always forwarded to central.
- 0e   IP deleted message - always forwarded to central.

- 10   Error code (ie battery low) - always forwarded to central
- 12   "All reported" code sent to OP when all tag data has been sent.
- 14   Tag location data
- 15   Request for all tags - originally issued by central
- 16   Distress - This is a broadcast which is sent when sensor has no OP
- 18   Central down (freeze command) - This message is always sent to IP's and causes sensors to retransmit message and ignore all messages except codes 15 and 25.
- 19   Central up - This message is always sent to IP's and causes sensors to retransmit message and wait for code 21 before returning to normal cycle. This signal is always originally sent by central.
- 1a   "Can't help": issued to OP in response to code 9 (from OP) when t1 has no non-IP sensors who are not in code 9 list.
- 1b   "Go to distress mode": issued to IP and is equivalent to code 9 except that it doesn't allow destination the option of sending back a code 26. Another difference is that a code 27 always includes a complete listing of t1. This causes the destination to go into distress mode.
- 1c   Reset - always forwarded to central. This code is put into t15 during initialization. It is put into the transmit queue upon exiting from distress mode. This code tells central that any prior tag data for that sensor is invalid.

FIG.18 each element contains the following:

| cell function | # of bytes | offset within entry |
|---|---|---|
| sens id | 2 | 0 |
| *retry count | 2 | 2 |
| code9 inh flag | 2 | 4 |
| 30min flag | 2 | 6 |
| signal strgth | 2 | 8 |
| *msg# | 1 | 0a |
| *reserved | 1 | 0b | total bytes = 0c

* - not currently used

FIG.19 each element contains the following:

| cell function | # of bytes | offset within entry |
|---|---|---|
| sens id | 2 | 0 |
| ack flag | 2 | 2 |
| all tags reported flag | 2 | 4 |
| cycle count | 2 | 6 |
| sensor level | 1 | 8 |
| *reserved | 1 | 9 | total bytes = 0a

* - not currently used

FIG.20

```
cell              # of        offset
function          bytes       within entry
---------------------------------------------
tag id            6           0
---------------------------------------------
signal
strength          2           6
---------------------------------------------
count             2           8
---------------------------------------------
new flag          2           0a
---------------------------------------------
*reserved         2           0c
---------------------------------------------
total bytes  =   0e

* - not currently used
```

FIG.21

```
Each element has the following:
cell                          # of
function                      bytes
tag id                        6
sens1     id                  2
          ss                  1
          seq#                1
          time                2
sens2     id                  2
          ss                  1
          seq#                1
          time                2
sens3     id                  2
          ss                  1
          seq#                1
          time                2
---------------------------------------
total bytes                   24
```

FIG.23

| cell function | # of bytes | offset within entry |
|---|---|---|
| sensor id | 1 | 0 |
| length/ update flag/ sequence # | 1 | 1 |
| tagID 1 | 6 | 2 |
| signal strength 1 | 1 | 8 |
| tagID 2 | 6 | 9 |
| signal strength 2 | 1 | 0f |
| tagID 3 | 6 | 10 |
| signal strength 3 | 1 | 16 |
| *reserved | 1 | 17 | total bytes = 17

\* - not currently used

FIG.22

```
Each element contains the following information:
cell            # of        offset
function        bytes       within entry
-----------------------------------------------
sens id         2           0
-----------------------------------------------
reserved        1           2
-----------------------------------------------
op id           1           3
-----------------------------------------------
x coord         2           4
-----------------------------------------------
y coord         2           6
-----------------------------------------------
#handled        2           8
-----------------------------------------------
load level      2           0a
-----------------------------------------------
ip count        1           0c
-----------------------------------------------
ip list         6           0d
-----------------------------------------------
status word     2           13
-----------------------------------------------
0a issue
      timeout   2           15
-----------------------------------------
total bytes =   23 the above status word breaks down as follows
cell            # of        bit
function        bits        position (dec)
-----------------------------------------------
op not valid    1           15 (msb)
-----------------------------------------------
code9 rcv'd &
      0a issued 1           14
-----------------------------------------------
*code15 issued  1           8
-----------------------------------------------
X&Y not valid   1           7
```

*note - This bit is cleared if tag data from this sensor is received which has a cleared update flag.

FIG.24

CODE 0 – SYNCHRONIZATION BROADCAST
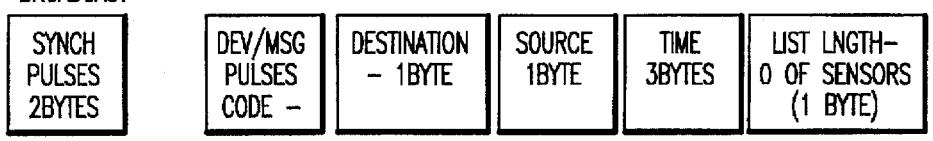
CODE 2 – ACHNOWLEDGE
CODE 9 – REQUEST PARTNERSHIP (FORWARDED TO CENTRAL)
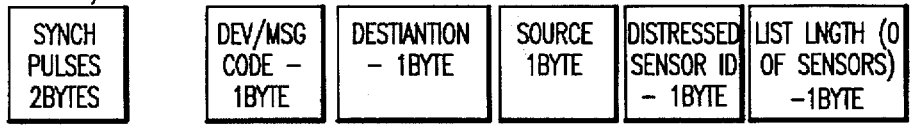
CODE 0a – PARTNERSHIP GRANT
CODE 0d – IP ADDED (ALWAYS FORWARDED TO CENTRAL)
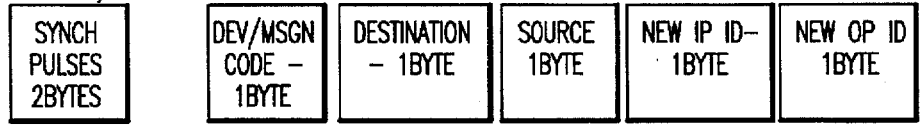
CODE 0e – IP DETECTED (ALWAYS FORWARDED TO CENTRAL)
CODE 10 – ERROR CODE (ALWAYS FORWARDED TO CENTRAL)
CODE 12 – ALL TAGS REPORTED
CONT. ON FIG.25C
CONT. ON FIG.25B
FIG.25A CODE 1 TAG MESAGE
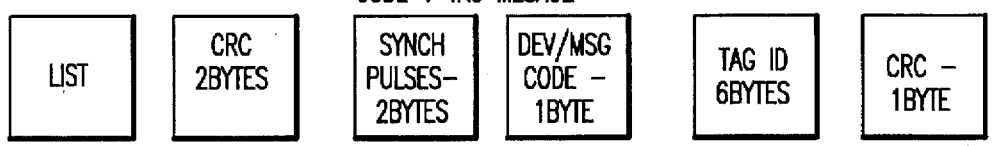
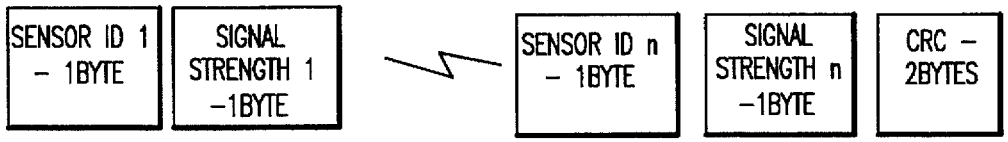
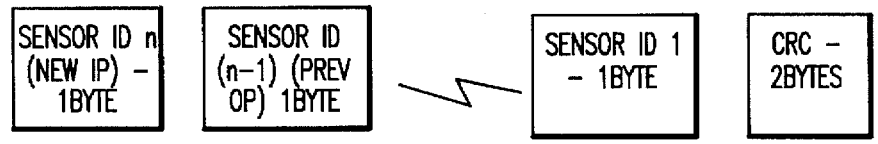
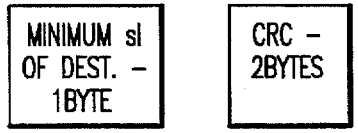
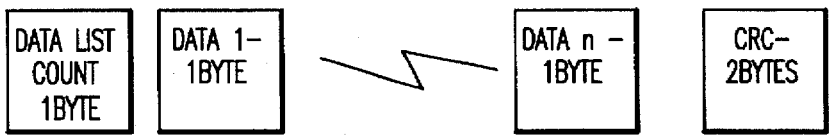
CONT. ON FIG.25D
FIG.25B

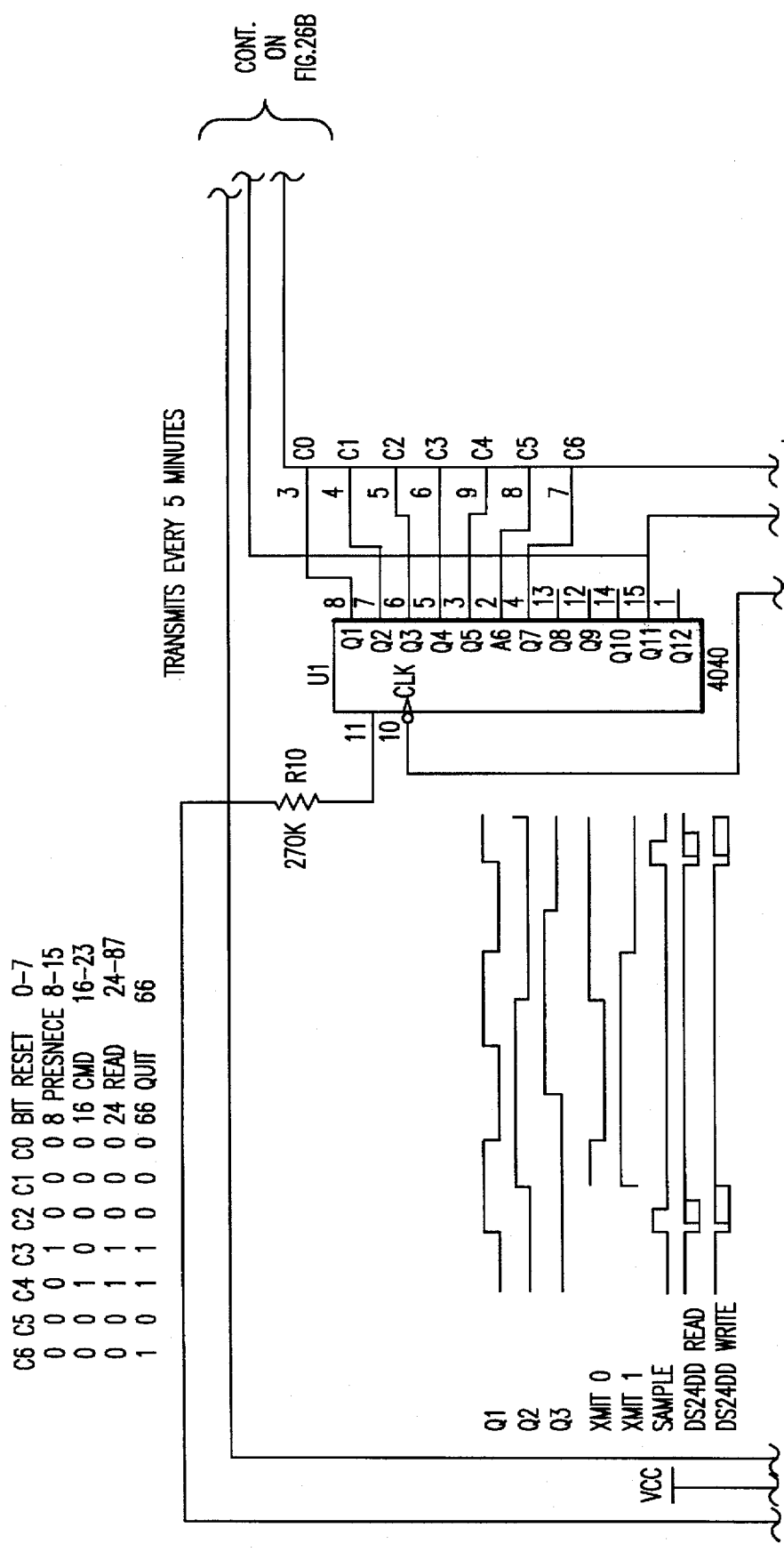

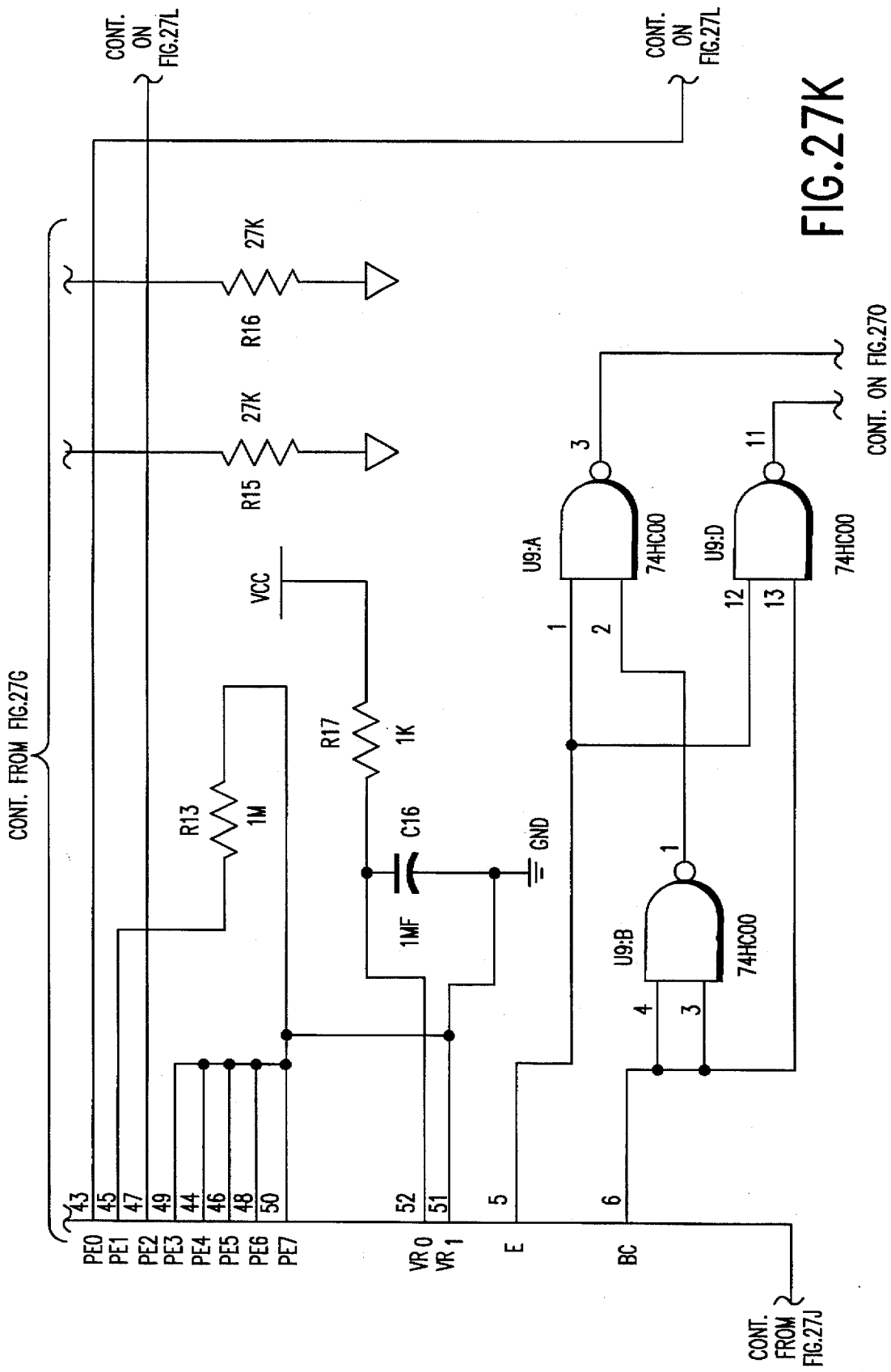

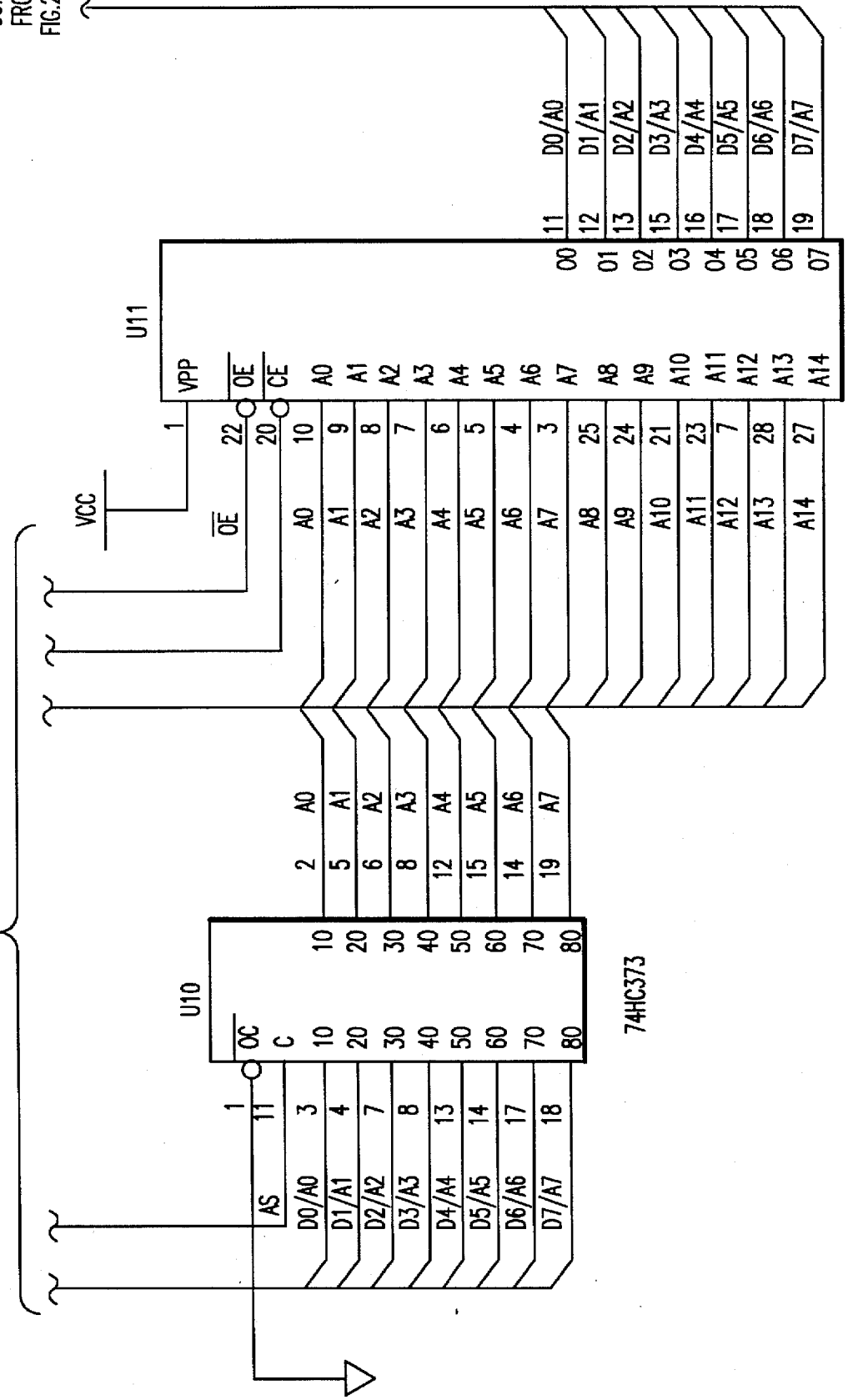

TAG LOCATION MONITOR

BACKGROUND OF THE INVENTION

1. Field of the Invention

The present invention generally relates to a tag location system for tracking the location of items marked with a tag without the requirement that the tags be polled by an interrogator, and more particularly, to a dynamic and adaptive monitor for a communication network which receives and forwards tag information to a central station.

2. Background Discussion

Manufacturing plants, particularly aircraft manufacturing facilities, encompass large physical areas. During manufacture, items within the manufacturing facility, such as tooling as well as work in progress or "jobs", are moved around during the normal course of the manufacture cycle, sometimes without coordination, resulting in the misplacement of items within the manufacturing plant. Consequently, it is a major struggle for the manufacturing industry to keep track of the location of certain items and to find items which have been misplaced.

In order to track the location of items within a manufacturing plant, it is known to use shop orders, which are bar coded paper documents that direct the routing of a job or tool and are typically physically attached to the item or job throughout the fabrication cycle. Routings include both "cost center" movements and the more detailed "load center" steps in each cost center. Using such an arrangement, tracking the progress of jobs during manufacture becomes a matter of tracking shop orders.

Typically, jobs are monitored only at incoming and outgoing areas of cost centers. A multitude of production control workers periodically swarm these areas brandishing portable bar code guns which read and store reference numbers of jobs changing location. Once an hour, the information stored in each of the portable bar code guns is downloaded into a plant-wide data collection system. In this way, labor costs are recorded and new job locations are updated.

In a large facility, over a hundred workers can be employed to operate the bar code readers virtually full-time. In addition, several dozen more workers are employed full-time to find lost items. Unfortunately, none of these costs contribute directly to the production of parts.

With the increasing use of "lean production" techniques by manufacturing facilities, production span times are being reduced from as long as thirty days to as little as only a few days. The use of bar coded shop orders to track items within the manufacturing facility, as described above, results in sufficient time lag between the reported location and the actual location of a specific job to become prohibitive in addition to being costly, and prone to error.

In some manufacturing facilities, the bar code labels are read automatically by scanners placed along the expected path of the moving items to be tracked. These systems reduce the labor costs and give instant response, but are only suitable in situations where the items to be tracked are mechanically required to travel a narrowly confined and predetermined path such as provided by a conveyor belt.

It is also known to use cooperative electronic identification systems, such as disclosed by U.S. Pat. No. 4,242,663 to Slobodin, in which the incidence of any element of a population bearing an electronic inquiry sensing and responding circuit, known as a "tag", is sensed by way of an interrogator positioned within the area of the population so that tagged equipment can be identified. Typically, the interrogator issues a generalized polling signal which triggers any tag in the immediate vicinity to emit a radio signal containing its "name".

Systems as described above have had certain difficulties. One difficulty with known tag systems involves the inability of handling multiple tags in range of the same interrogator at the same time, particularly where the interrogator transmits a generalized polling signal which results in a simultaneous response from all the tags receiving such a signal.

A further problem of known tag systems is that installation creates problems because the interrogator is typically hard wired to the central computer for communication purposes. Additionally, once the interrogator network is in place, it cannot be easily reconfigured.

SUMMARY OF THE INVENTION

Accordingly, it is an object of the present invention to provide a monitor of a communication network for a tag location system which employs tags that transmit data without being polled by an interrogator.

Another object of the present invention is to provide a monitor of an adaptive and intelligent network of monitors, which forwards tag information from one monitor to the next until the information is received by a central station to determine the location of the tag based on the information received.

It is a further object of the present invention to provide a monitor of a communications network which is economical, easy to install and reconfigure.

One particularly advantageous feature of the present invention is the ability to handle over 10,000 tags within range of the same monitor at substantially the same time in a typical application. This is in contrast to most systems, which can handle only one. The large number of tags is made possible by the fact that each tag transmits its ID at random time relative to other tags, transmits only a few milliseconds, and in a typical application transmits only once per 5 minutes, so that the likelihood of two tag transmissions overlapping is very low unless the number of tags is huge. Also, in the event of overlap, the only consequence is usually just a possible 5 minutes delay in noticing that a tag has moved, since in the preferred embodiment, transmissions include a crc code for error checking. This multi-tag capability combined with the relatively long range of the tag transmission, allows the monitor network of the present invention to provide complete coverage of a given area in an economical manner by tremendously reducing the number of monitors required for such coverage.

These and other objects, advantages and features of the present invention are achieved, according to one embodiment thereof, by a monitor of a communication network of a tag location system, the monitor being provided for transmitting and receiving messages from a central computer of the system, as well as neighboring monitors and tags within communication range of a given monitor.

Also provided in each monitor is section of memory elements for storing such fixed things as: the controlling software, and a unique identity of the monitor. The memory elements also store such dynamically varying quantities as the identity of neighboring monitors with which the monitor can communicate directly; the neighboring monitor selected to provide a two-way communication link to the central computer via a central monitor (such neighboring monitor being called the output partner); the neighboring monitors that depend on this monitor to provide them a communication link to the central computer (input partners); and a list of tags in the vicinity of the monitor, including the identification and signal strength of each.

Further the monitor is provided with a computer, which, by executing software programs and interfacing with other monitor circuitry such as the transceiver, is able to achieve all functions of the monitor. The software includes the means for generating and interpreting communication messages that allow each monitor to: 1) participate as one member of a network or grid of monitors that can convey, in bucket brigade fashion, messages between each monitor and a central monitor; 2) gather the identity and signal strength of tags in its vicinity; send changes in tag status to the central monitor; and 3) reestablish a new communication link to the central computer if the previous link was lost or if a better link becomes available.

The central monitor(s) communicate (generally by wire) with the central computer of the tag location system. The overall objective of the monitor network is to keep the central computer of the tag location system informed of each tag that can be detected by the monitor network, and to specify which monitors have recently detected that tag, and how strong the signal from that tag was (an indication of how close the tag is to the monitor). The central computer of the system then makes use of this data as needed by the particular application, and may include more exact calculation of the tag coordinates based upon triangulation computations in cases where coordinates of the monitor locations are known to the central computer.

Kindly note that the thing that distinguishes input partners from output partners is that the output partner is one step closer to the central computer than the given monitor whereas the input partners are one step farther from the central computer than the given monitor. Therefore, messages headed for the central computer come from input partners and go to output partners, but not all messages fit into that category.

Messages are sent and received from all neighboring monitors. Also, signals are not stored in memory, only received messages are stored. Messages to be transmitted are formulated in real time to express the dynamically changing information that needs to be conveyed.

Tag messages issued by tags and received by the monitor directly from tags within range of the monitor or from input partner monitors are transmitted to the output partner monitor for forwarding to the central computer or central station, and monitor messages issued by the central station and received from output monitors are transmitted, if required, to one or more of the input monitors.

BRIEF DESCRIPTION OF THE DRAWINGS

FIG. 1 schematically illustrates the various elements of a tag location system according to one embodiment of the present invention;

FIGS. 11A–11G are flow diagrams illustrating the monitor transmit arrangement;

FIG. 17 illustrates flags (parameters) and their meaning;

FIG. 18 illustrates message code meaning;

FIG. 19 provides details about T1 (neighbor list);

FIG. 20 illustrates T2 which is the input partner list;

FIG. 21 illustrates T3 which is the tag table;

FIG. 22 illustrates Monitor T4 which contains the "residual" code14 data;

FIG. 23 illustrates Central T3 which is the actual tag location data maintained by the central computer;

FIG. 24 illustrates Central T4 which, in the central computer software, makes up the monitor tree structure;

DETAILED DESCRIPTION OF THE PREFERRED EMBODIMENT(S)

TAG LOCATION SYSTEM—GENERAL DESCRIPTION

Figure 2A:
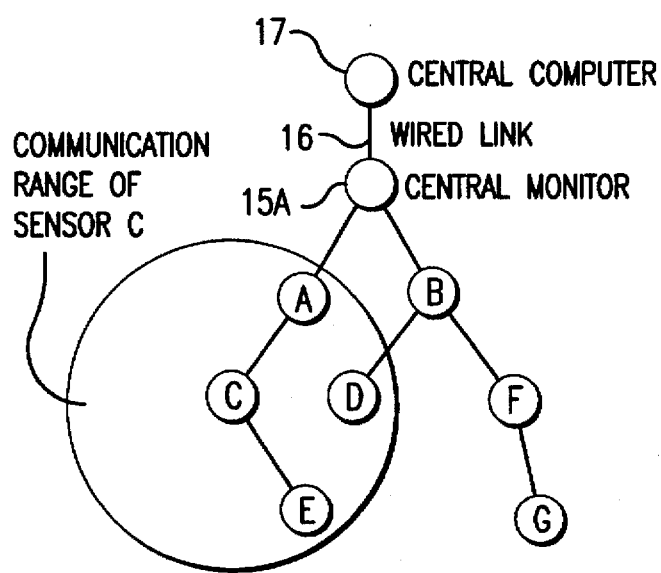
FIGS. 2A–2C are typical tree structures illustrating the communication modes of the tag location system of the present invention as well as the tag location function of the central computer of the present invention.

Referring to FIG. 1, the tag location system of the present invention, generally indicated at 11, comprises three basic components: at least one tag 13 for attachment to an object 19 to be tracked, a network of monitors 15, positioned at the space to be monitored, and a central computer 17 in communication with the network of monitors 15. The network of monitors 15 are of sufficient number and distribution as to achieve coverage of an entire area of interest and to achieve the desired degree of location accuracy.

According to one embodiment of the present invention, the preferred communication mode between each of the components of the tag location system 11 is wireless, i.e., using electromagnetic or radiant energy. However, the communication link 16 between the central computer 17 and the monitor which reports directly to the computer 17 (such monitor hereinafter being referred to as the central monitor 15A) is preferably a hardwire communication link, such as, for example, a coaxial (RS232) cable.

In operation, the tag 13 is attached to an object 19 whose location is to be monitored or tracked. One or more of the plurality of monitors 15 detects periodic, identifying transmissions which are issued automatically from the tag 13 in order to determine the current location of the object 19 as will be more fully described hereinafter. The central computer 17 collects the tag locations from the network of monitors 15, interfaces with the user, and controls the communication links between the monitors 15.

The monitors 15 can be arranged within the space to be monitored in a grid-like pattern or even in a random manner. In this regard, the configuration requirements for the monitors 15 include: 1) all monitors 15 in the network must be within communication range of at least one other monitor 15, 2) at least one monitor 15 in the network must be within range of the central computer 17, and 3) all monitors 15 must be linked to the central computer 17 either directly or indirectly through other monitors 15 of the network.

More specifically, the tags 13, automatically transmit, on a periodic or random basis, a relatively short duration radio signal 21 that is modulated with a signal containing a unique identifier for each tag 13. Even when the transmissions are periodic for a given tag 13 or monitor 15, the transmissions are more or less random with respect to other tags 13 or monitors 15 since the tags 13 have periodic rates that slightly differ from each other due to component tolerances.

The random and infrequent short duration nature of the transmissions makes overlapping of transmissions rare, and thus makes it possible for the system 11 to operate successfully with large numbers of tags 13 simultaneously within range of a given monitor 15. This is herein referred to as simultaneous multi-tag capability. The rarity of overlapping transmissions also allows all tags 13 and monitors 15 to operate on a single radio frequency. On the rare occasions where overlapping occurs, little harm results since all transmissions are validated with a cyclical redundancy check (CRC). Also, monitor transmissions are acknowledged if good, and retransmitted if not acknowledged.

The tags 13 have a relatively small size, low cost, long range, and long battery life. This is made possible by elimination of the requirement that each tag 13 have a receiver for receiving an interrogation signal from an interrogator, as is required by nearly all known systems. Because long range receivers are generally more complex than long range transmitters, and require a much larger antenna, the absence of a receiver typically reduces the size and cost of the tag 13 to much less than half the size of tags requiring a long range (>10 feet) receiver. The battery life is increased several fold by the absence of a receiver. This is because the arrival time of a received signal is more or less unpredictable, necessitating the receiver to stay on a large fraction of the time in order to not miss a message. In contrast, the transmitter only needs to stay on for 10 milliseconds out of 5 minutes (i.e. it is off 30,000 times as long as it is on) in a typical application, (reporting its ID every 5 minutes) and thus uses very little energy. The long range capability just described, the simultaneous multi-tag capability described before that, and the wireless nature of the monitors 15, all combine to make it possible to provide complete area coverage with a practical and economical number of monitors that are easily installed.

By demodulating the received radio signals 21, each monitor 15 of the network is able to determine the identity of those tags 13 which are within the receiving range of that particular monitor 15.

If the environmental background noise is low enough, the level of the transmitted radio signal 21 can be sufficiently low that no FCC site license is necessary for the individual tags 13 or monitors 15, although one-time FCC approval is required for their designs. However, in some environments where there is a high level of interference, it may be necessary to use licensed power levels or use spread spectrum or settle or shorter range.

The radiation level of a radio signal 21 of a particular tag 13 is also chosen low enough that the radio signal 21 of that particular tag 13 will only be received by those monitors 15 which are closest to that tag. The preferred range of the radio signal 21 is therefore dependent on the spacing of the monitors 15.

Many radio receivers in the marketplace provide a dc received signal strength indicator (RSSI) signal that could be measured by an analog to digital converter on the monitor. In this particular embodiment, the signal strength is instead determined in the software by measuring the change in width of the average narrow pulse entering U8 on the RDATA signal line. The pulses become more narrow as the signal strength decreases. The relationship of pulse width to distance is determined experimentally and stored either in the monitor or central computer memory to convert from signal strength to distance.

Each individual monitor 15 can get a rough idea of how far away a particular tag 13 is by the strength of the received radio signal 21. By calculating the distance of a tag from three or more monitors, the central computer 17 can determine, by triangulation, the approximate location of each tag 13.

Even if the tag is only "heard" by one monitor 15, the tag's location is then known to be within the general vicinity of that particular lone receiving monitor 15, i.e., within about 100 feet. Therefore, tags 13 can be moved anywhere within the area covered by the system 11 and still be tracked by the central computer 17 as long as the tag 13 is within range of at least one monitor 15.

According to one embodiment of the present invention, the central computer 17 must know the precise location of each monitor of the network of monitors 15 in the form of X & Y coordinates in order to pin-point the location of tags 13. When any one or more of the monitors 15 are moved, the system 11 is adapted to automatically adjust itself providing that the moved or new monitor 15 is in range of at least three other monitors 15 that have valid X & Y coordinates; the only user requirement is that the monitor's reset button be pressed, as will be more fully described hereinafter. The user may also be prompted by the central computer 15 to enter specific monitor location information.

The tags 13 and monitors 15 don't have to be associated with a precise X & Y coordinate location in alternative embodiments of the present invention where just knowing which monitor 15 has detected a signal 21 from a particular tag 13 may be enough information. In such cases the user may be prompted for an area name (dept., cost center, etc.) instead of coordinates. If the monitor id will suffice as location data, the user prompt for location can be disabled.

THE MONITOR NETWORK—
COMMUNICATION REQUIREMENTS

All tag data is forwarded to central computer 17 by the monitors 15 so that the flow of information forms a tree structure as best seen in FIG. 2A. All links shown are wireless except for the wired link 16 between the central computer 17 and the central monitor 15A. Tags are not shown in FIG. 2A.

As a system requirement, each monitor 15 is required to be in communication range of at least one other monitor 15, but in most cases it will be in range of more than one other monitor 15, for example, from 2 to 10 other monitors 15. All monitors 15 that are within a given monitor's range are called its "neighbors". In FIG. 2A, monitors A, D, and E are the neighbors of monitor C; therefore they would be included in monitor C's T1 (neighbor list) as is best understood with quick reference to FIG. 19 which provides details about T1 (neighbor list). For a more complete understanding of T1 (neighbor list) please refer to the Descriptions of Tables Found in Monitors, found below.

These neighboring monitors can be classified as input partners (ip's), output partner (op), or neither. Each monitor 15 has to have one (and only one) op in order to forward data to the central computer 17. In FIG. 2A, the op of monitor C is monitor A. Each monitor can have none or more ip's. For example, in FIG. 2A, monitor B has two ip's: D and F. Typically, one monitor (the central monitor 15A) in the network will have the central computer 17 as its op. The central computer 17 dictates how the tree is configured based on information received from the network of monitors 15.

Monitor-to-monitor and monitor-to-central computer communication can occur in two ways: 1) broadcast with acknowledges, i.e., one monitor sends out a broadcast and multiple monitors send back acknowledges (code2's) in a time-staggered manner; all broadcast type messages (except code 16's) are sent from an op to its ip(s), or 2) single destination with acknowledge, i.e., one monitor sends a message to another monitor who sends back an acknowledge. Tag-to-monitor communications consist only of code01 broadcasts from the tags to the monitors. (Note: Refer to FIG. 18 for code meanings and to FIG. 25 for the content of each message type, i.e., code.)

Figure 2B:
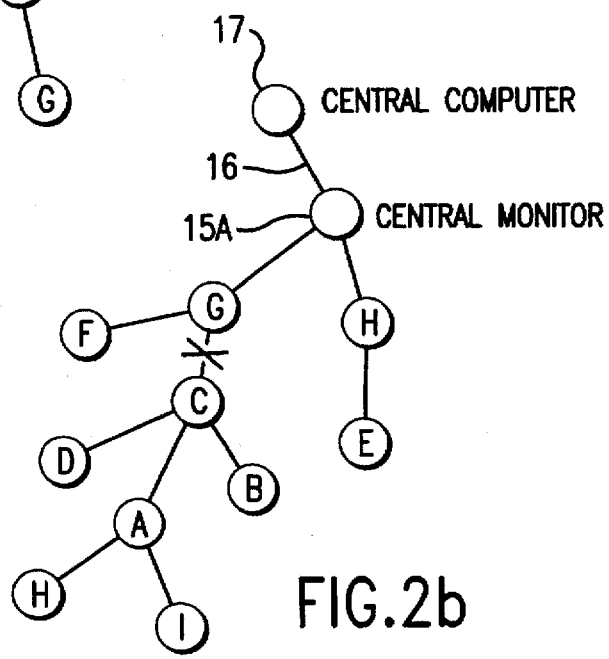

When a monitor sends a message and the destination monitor does not send back an acknowledge, the monitor will retransmit the message. If the destination monitor continually fails to send back an acknowledge, the monitor will stop trying to send the message. Depending on the situation, this could trigger other events. In FIG. 2B for example, monitor G would notify the central computer 17 of the communication failure with monitor C. Monitor C would go into distress mode (to be discussed later).

MONITOR SOFTWARE ORGANIZATION

The following software discussion makes many references to message codes, tables, parameters, and flags. Before proceeding with the discussion, it is appropriate to become somewhat familiar with the messages, tables and parameters, and to make frequent reference to their descriptions as one proceeds through the remaining text.

Figure 25C:
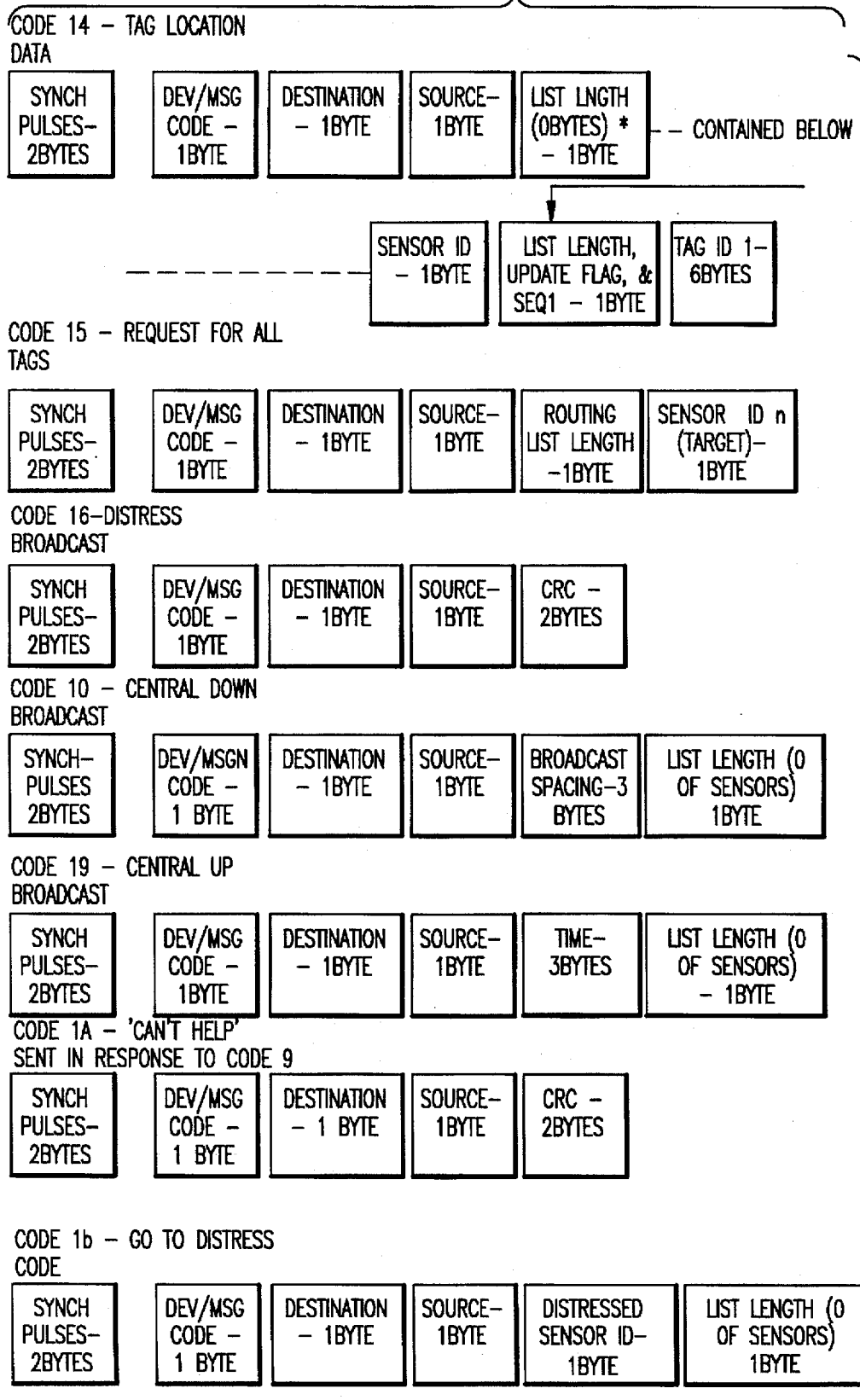
FIG. 25 illustrates the construction and contents of every type of transmitted message.
Figure 25D:
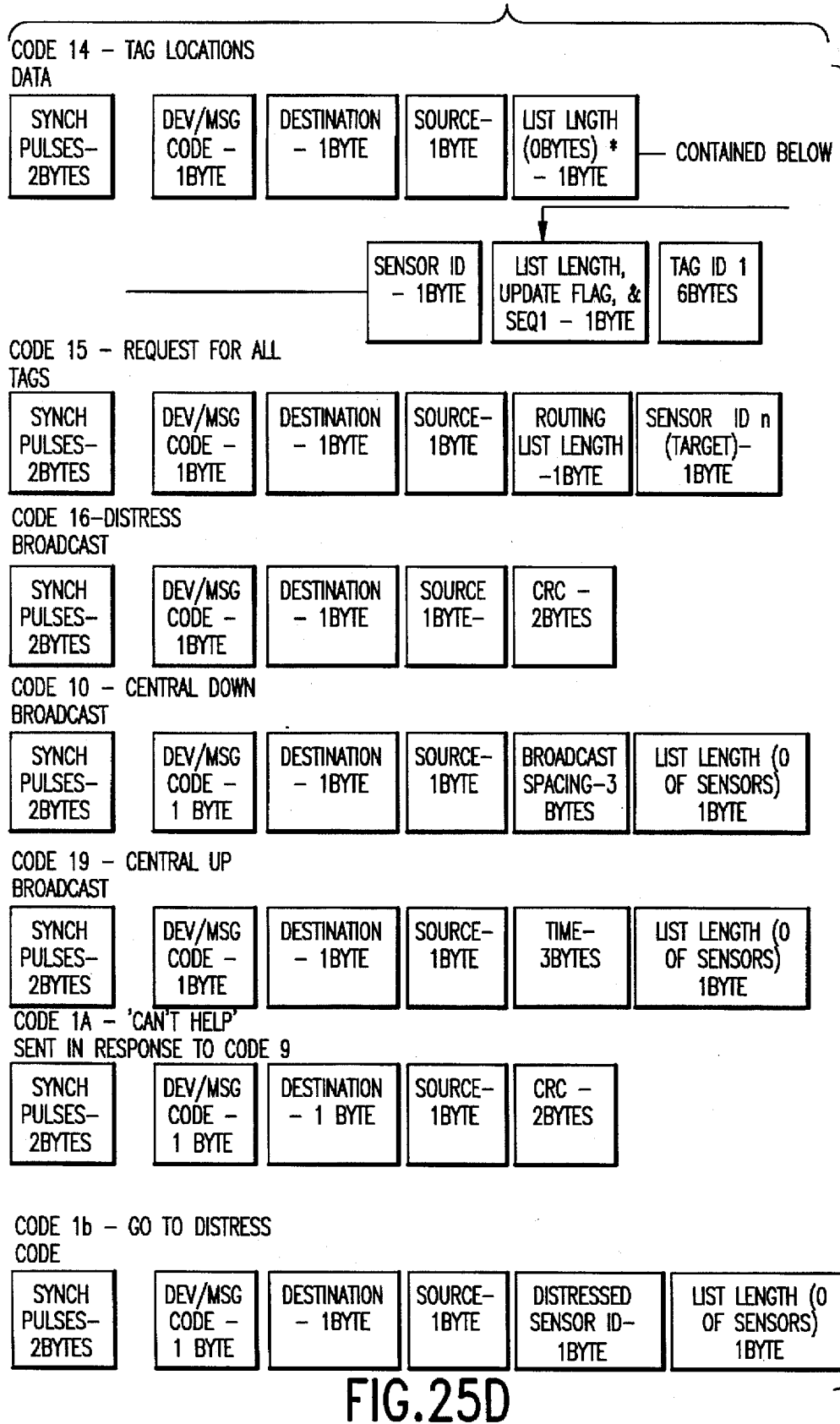
Figure 25E:
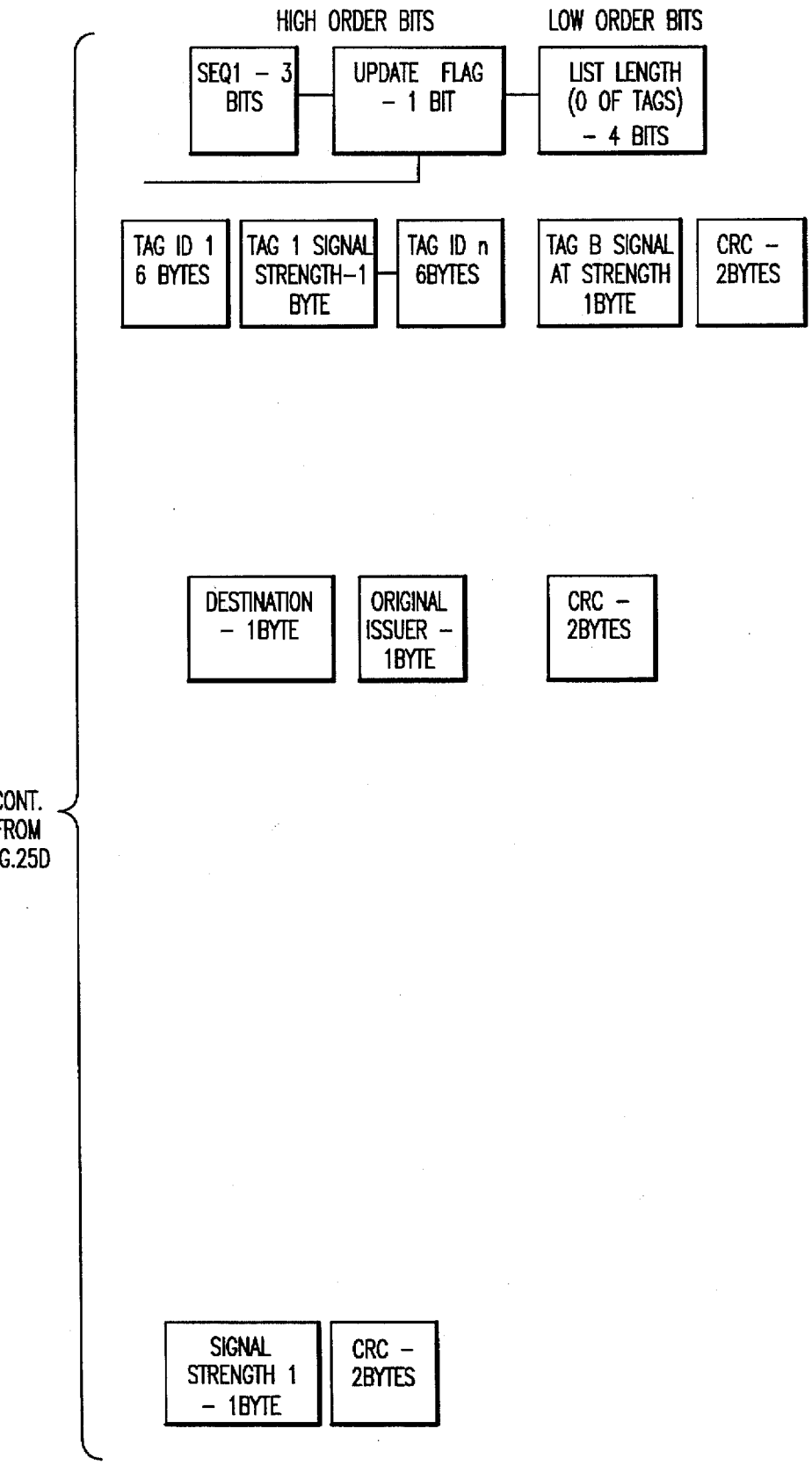

FIGS. 18 and 25 show the meanings and contents of the various messages, and FIG. 17 shows the meanings of the flags and parameters. The tables and their content are shown in FIGS. 19 through 24 and are described in the following discussion below.

Descriptions of Tables Found in Monitors:

- T1 List of neighboring monitor addresses. For each entry, the monitor information is recorded in this order: monitor ID, retry count, code 9 inhibit flag, 30 minute flag, and signal strength.
- T2 List of IP addresses (1 byte each) followed by a status byte which contains: a 2 bit count indicating whether that IP has reported in the last 2 cycles, a flag which indicates whether that IP has sent all of its tag data for the current cycle; and a flag which indicates whether or not an acknowledge of a code0 is expected from this IP.
- T3 Table of tags (also referred to as T12)—consists of tag ID's, signal strength, and status byte. The LSB of the status byte is the new flag which indicates that the tag is new to area or the signal strength has changed drastically. If the new flag is set then the tag should be included in an outgoing code 14. The next 2 bytes are used for a count which is decremented once per 7 minute cycle. Every time the tag is detected, this count is set to 3. If this count is ever decremented all the way to zero, it should be removed from the table by the tag processing routine.
- T4 (also referred to as T16) This table contains data from incoming partial code 14's. Each entry begins with a monitor ID which is followed by a tag count and a list of tag ID's. If another short code 14 is encountered, it should be combined with data from one of these entries. If a message of optimum length can be constructed from the partial code 14 that has just been received and an entry from t16, the two should be combined and placed in the transmit queue; the associated entry in t16 should be erased.
- T5 (also referred to as T17) This is a buffer used to store a code 9 message sent to us from our OP.
- T15 Distress queue—Temporary storage of xmit messages to OP while in distress mode.

Figure 3:
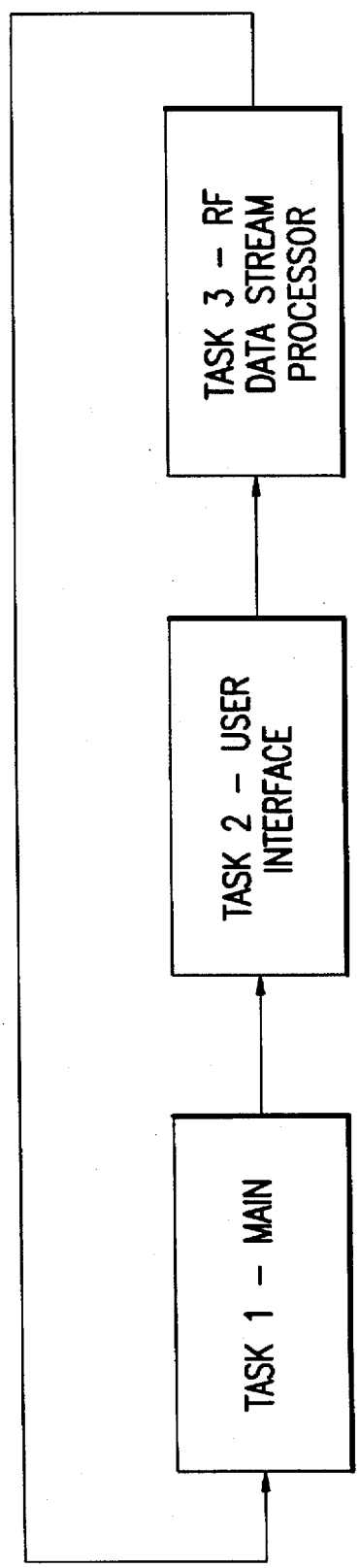
FIG. 3 illustrates the round-robin multi-tasking organization of the monitor software in accordance with one embodiment thereof.

FIG. 3 illustrates the round-robin multi-tasking organization of the monitor software. Task1 (main) includes the higher level functions of the monitor software as will be more fully discussed hereinafter with particular reference to FIG. 4A. Task2 is a foreground task which allows user some diagnostic functions. In the central monitor 15A, task2 also is used to process tag related messages sent to it from central (ie, codes 2, 0a, 15, and 19). Task3 processes the data stream received from the RF antenna and puts any viable messages in the receive queue.

Figure 4A:
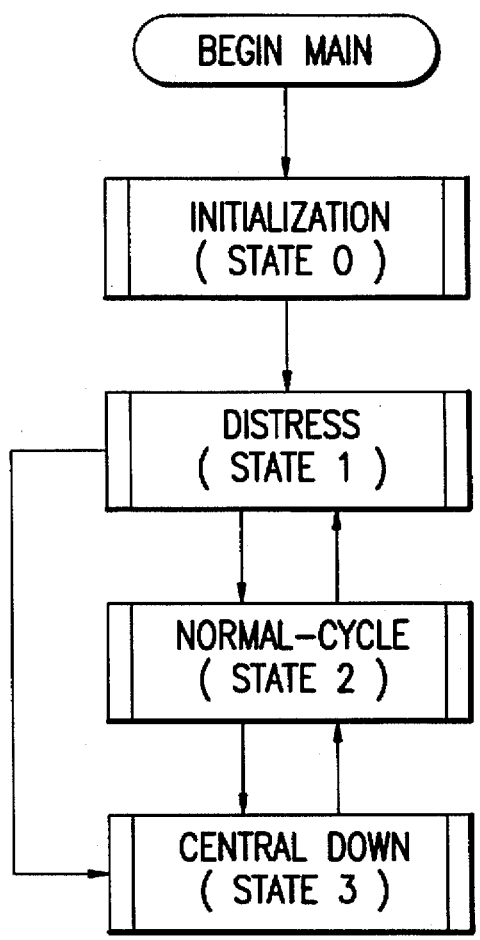
FIGS. 4A–4B are flow diagrams respectively illustrating the four modes of operation for the monitors and the monitor software organization.
Figure 4B:
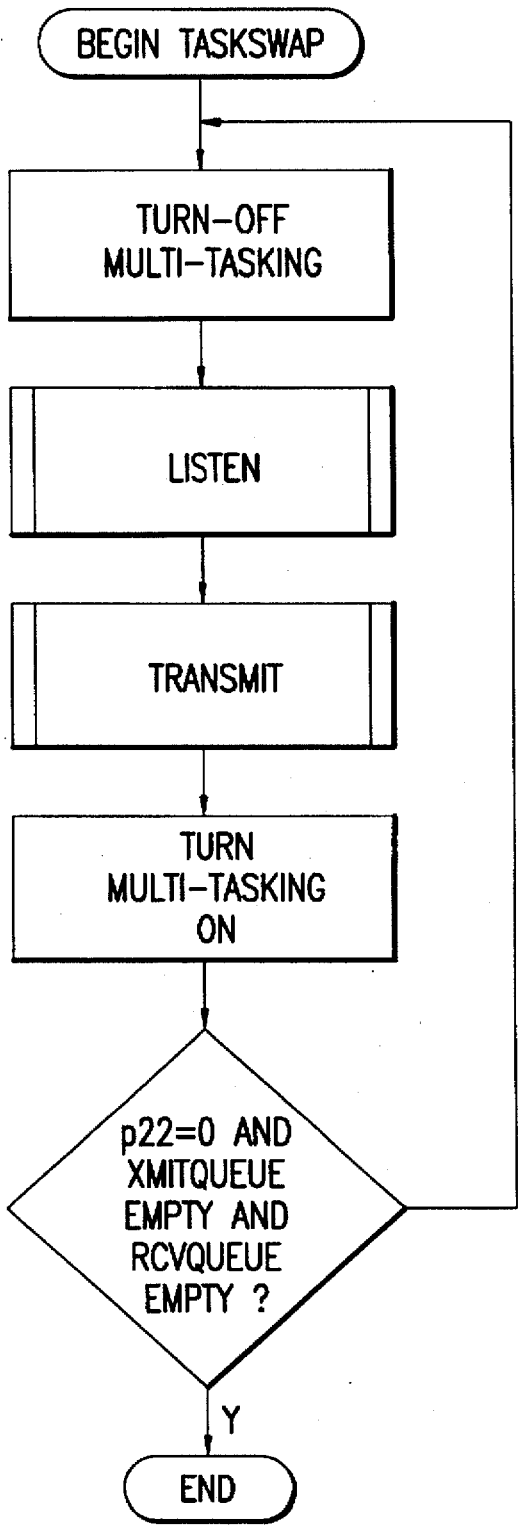

Referring to FIG. 4B, Taskswap is commonly used by many other routines so it is shown here for ease of reference. Taskswap is a misnomer caused by design changes; task-swapping is actually handled by interrupts. Taskswap does temporarily turn off multi-tasking to prevent corruption of shared resources used by listen and transmit. Taskswap is used by distress, normalcycle, and central down as described below.

The function of taskswap is to allow any messages in the receive or transmit queues to be processed until both those queues are empty and the transmit state (p22) is zero. The transmit state is zero when a monitor 15 is not engaged in a communication session with another monitor 15. A session includes any and all messages between multiple monitors 15 necessary to make up a logical transfer of information.

In general, when taskswap is called, it will execute until the airwaves in a monitor's vicinity become quiet and all of that monitor's sessions have ended.

MONITOR OPERATION MODES

Referring to FIG. 4A, there are four modes of operation for the monitors 15: 1) initialization (entered on power up or reset), 2) distress (involves communication failure with op), 3) normalcycle (tag data forwarding mode), and 4) central down (central computer failure).

When a monitor 15 is initially installed in the system 11, the monitor 15 will go from the initialization mode to the distress mode to the normal mode. From the normal mode, the monitor 15 is adapted to go to either central down nor distress. From central down, the monitor 15 is adapted to go only to normal. From distress, the monitor 15 is adapted to enter either normal or central down. The only way a monitor 15 can go to initialization is by being reset.

Initialization Mode

Figure 5:
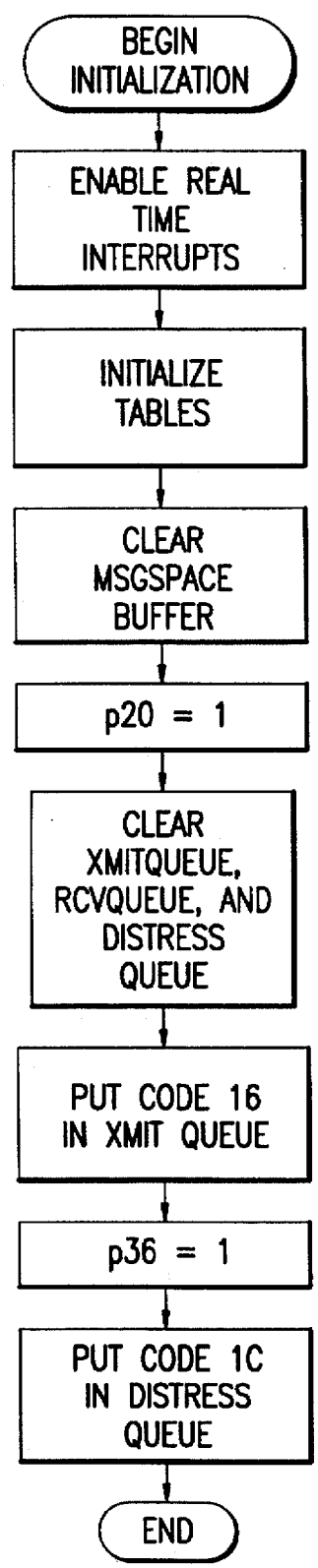
FIG. 5 is a flow diagram illustrating the operational steps of the initialization mode of the monitors.
Figure 6A:
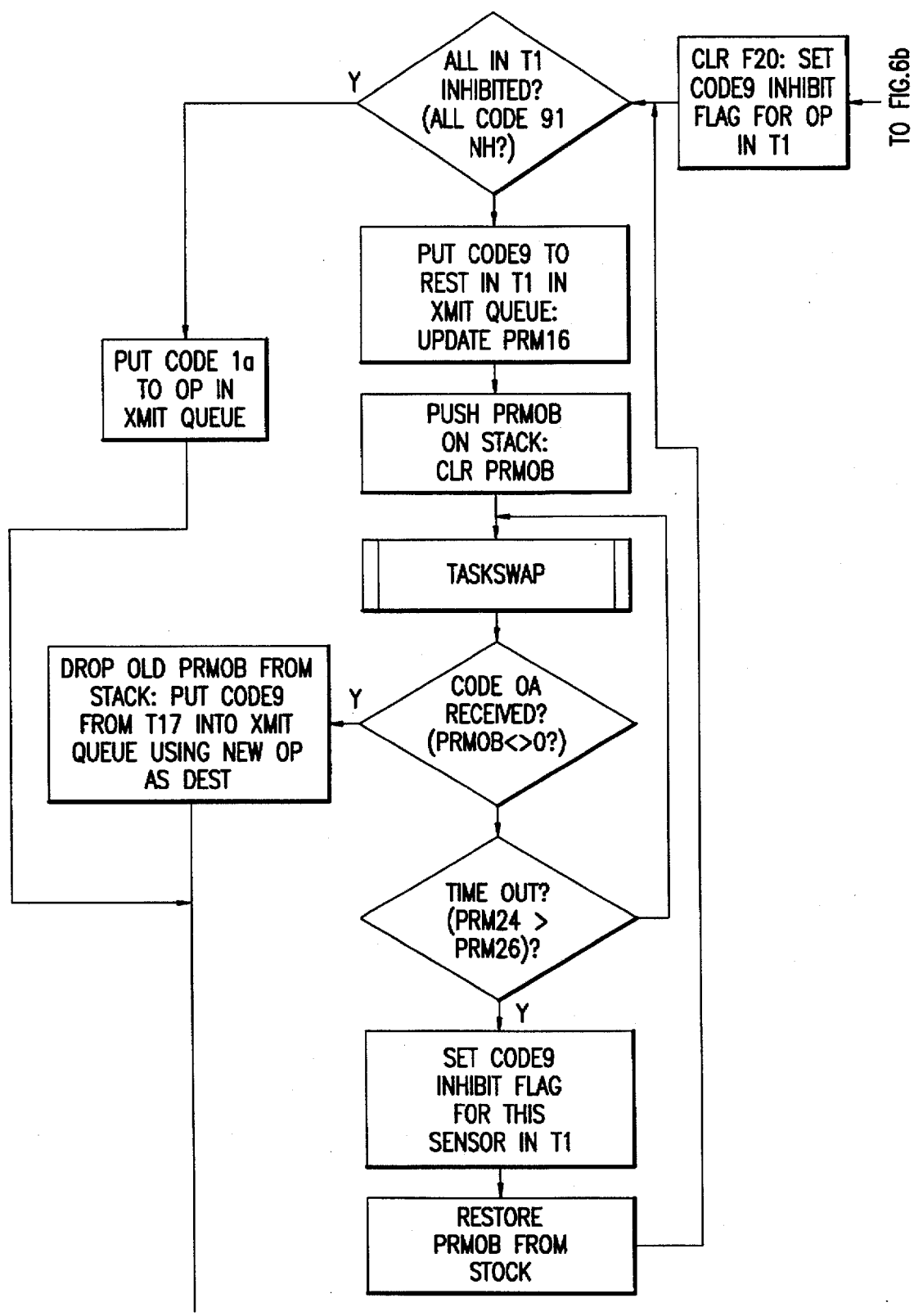
FIG. 6 is a flow diagram illustrating the operational steps of the distress mode of the monitors.
Figure 6B:
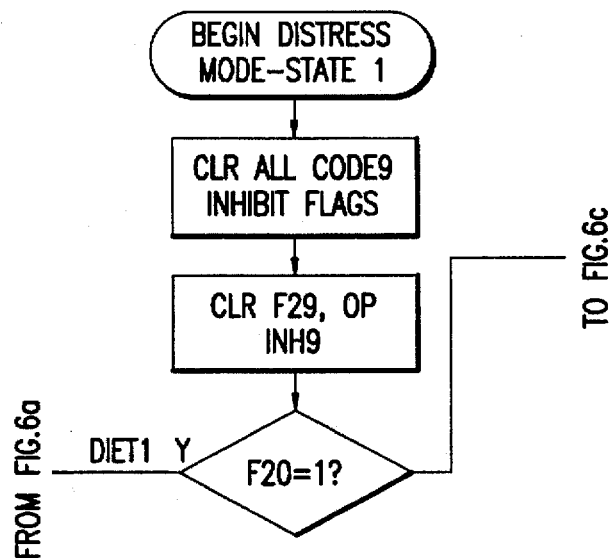
Figure 6E:
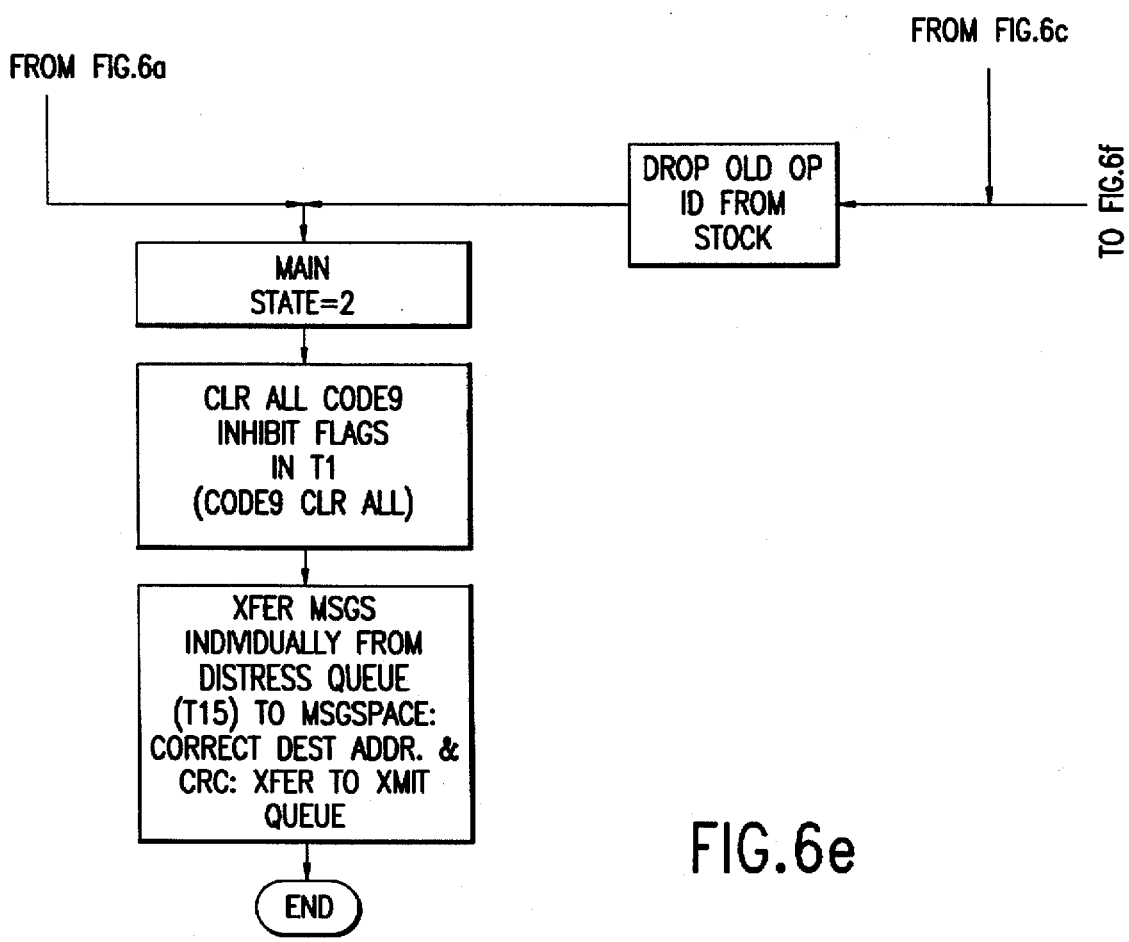
Figure 6C:
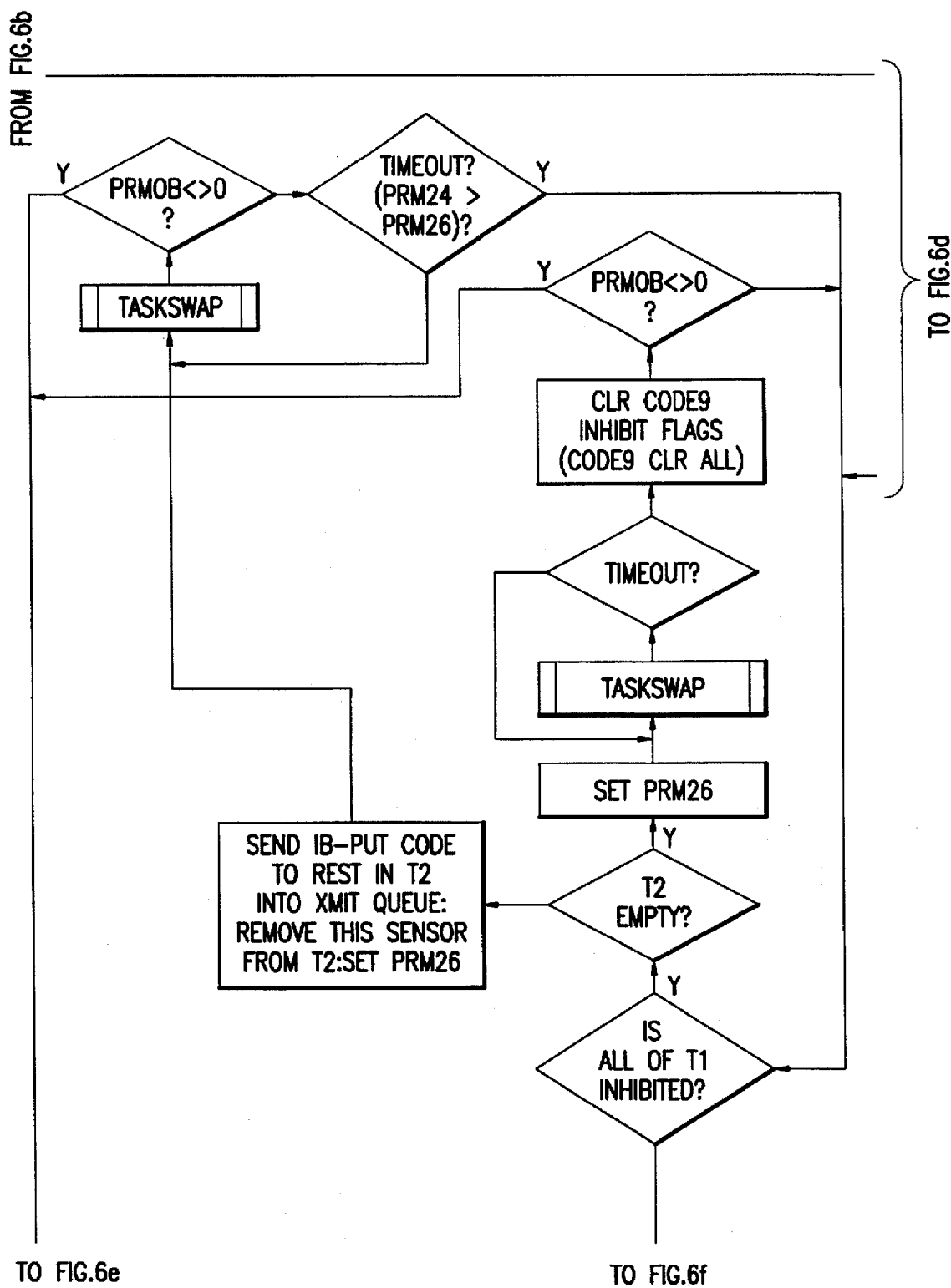
Figure 6D:
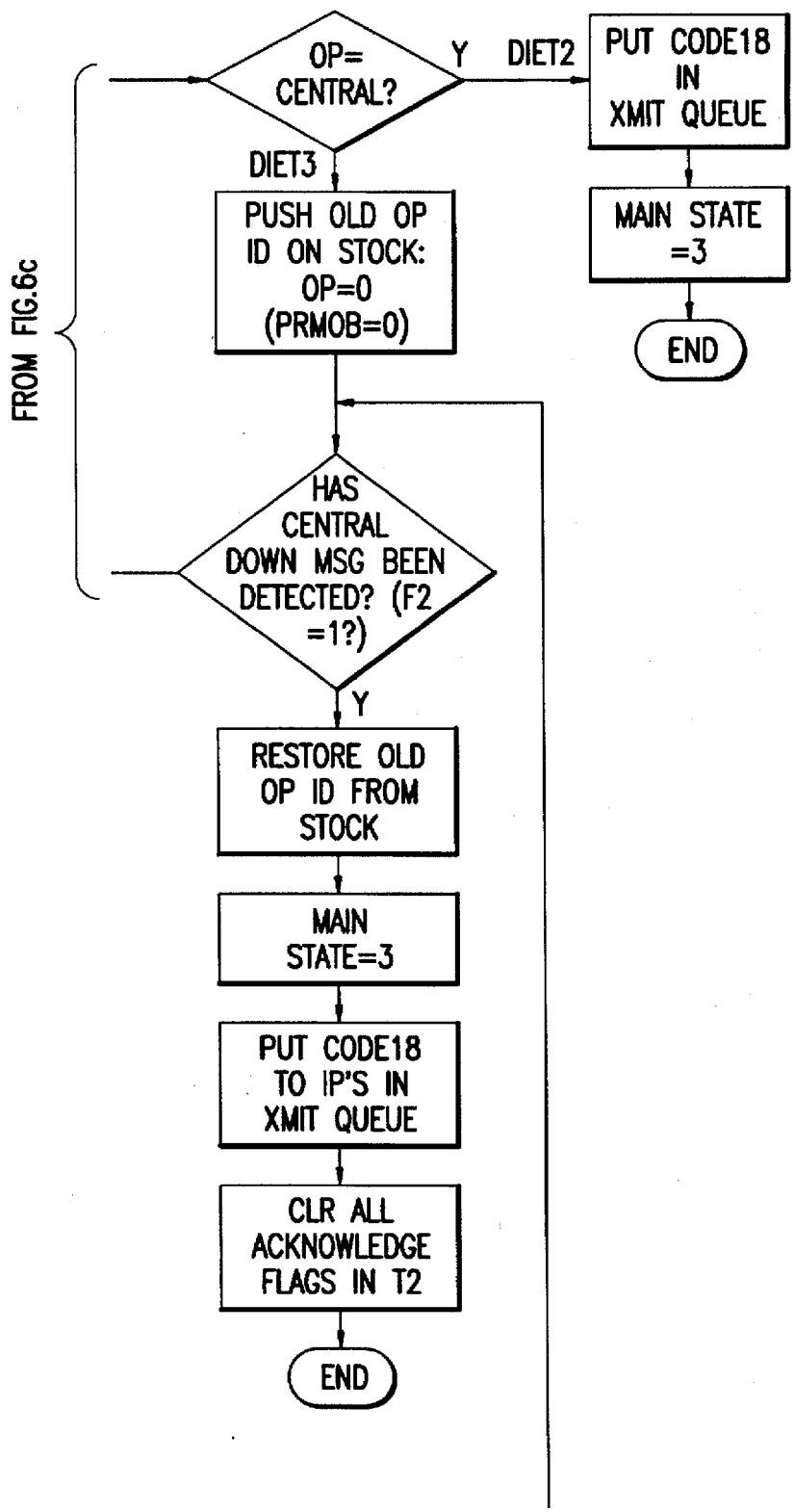
Figure 6F:
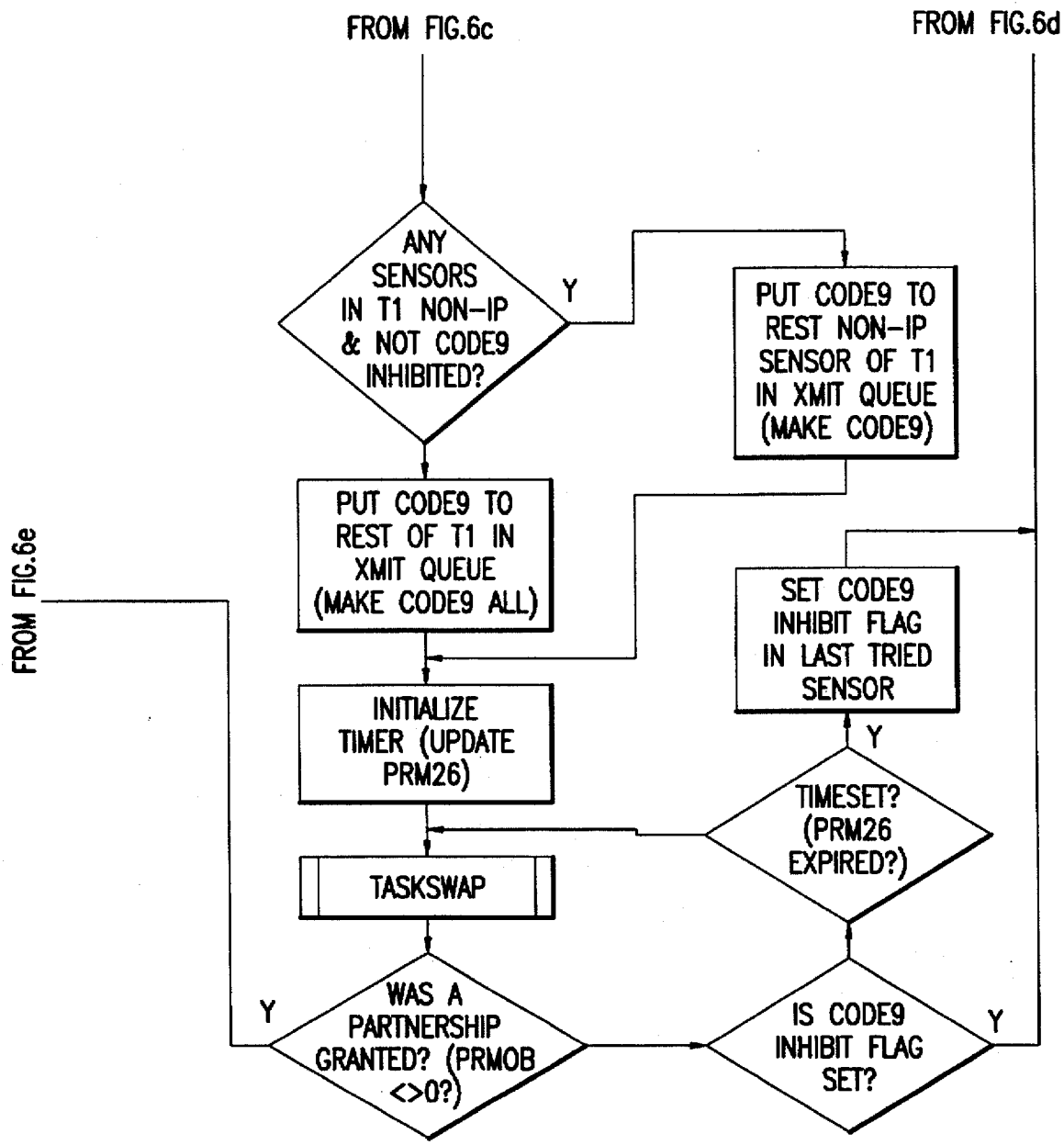

Referring to FIG. 5, upon power up or reset, the initialization mode is entered. Monitor initialization (Main state 0) performs the following key functions: 1) turns on system clock (real time interrupts); 2) initializes (empties) tables and queues; 3) puts code16 (distress msg) in xmit queue; 4) puts code1c (reset msg) in distress queue; and 5) causes main to go into distress mode.

In the initialization mode, all low level initialization as well as the clearing of system parameters & data structures takes place. Also a code16 (distress broadcast signal) is put into the transmit queue of the monitor and a code1c (reset signal) is put into the distress queue (for later transmission). Now the monitor 15 enters the distress mode.

Distress Mode

FIG. 6 is a flow diagram illustrating the operational steps of the distress mode (Main state 1). The purpose of the distress mode is to handle situations in which a monitor 15 has no way of forwarding its data or its descendants' data to the central computer 17. Descendants of a monitor 15 include all the monitors who's data must travel through it in order to reach central. This includes the monitor's ip's, their ip's, and so on. In FIG. 2A, for example, monitors D, F, and G are all descendants of monitor B.

A monitor 15 in distress mode lets the central computer 17 know of its situation by sending it a distress signal. The distress signal is sent to the central computer via the other monitors that are in the vicinity of the monitor that is in distress mode. There are two types of distress signals: a code9 (partnership request) and a code16 (distress broadcast). The code9 is sent to a single destination while the code16 is a broadcast type message.

There is a code9 inhibit flag associated with each neighboring monitor listed in a monitor's T1 (neighbor list). A cleared code9 inhibit flag indicates that the associated neighbor is a candidate for sending a code9 to. In response, the central computer is programmed to determine which monitor would be the best op for the monitor in distress. Then the central computer sends a code0a (partnership grant) to the distressed monitor via the proposed op.

There are 3 "sub-modes" within the distress mode. When a code9 (partnership request) is sent from an op to its ip, the ip enters Dist1. Dist2 is entered if communication with op has failed and the op happened to be central; this can only happen for central monitor. Dist3 is entered in all other cases when a monitor loses communication with its op.

Dist1 is a special case of distress mode in that it may allow the monitor to return to normalcycle without getting a new partnership grant. An op will only send a code9 to an ip if the op has unsuccessfully attempted to obtain a partnership grant by sending code9's to all of its non-ip neighbors first.

Referring to FIG. 2B, the monitor who's perspective is being described (monitor who received a code9 from op) will be monitor A. Monitor C (op of monitor A) has gone into distress because it lost communication with its op (monitor G). The type of distress which monitor C is in is dist3. Monitor C first sends a code9 to the first non-ip monitor (monitor F) in its T1. If a timeout condition occurs with no partnership grant occurring, monitor C will set the code9 inhibit flag for that tried monitor and monitor C will send a code9 to its next non-ip neighbor listed in T1 which would be monitor E.

So far the code9's that have been issued contain lists of neighboring id's excluding the op and ip's. When another timeout occurs with no partnership grant occurring, monitor C will start sending code9's to ip's. (This is assuming all non-ip monitors have been tried.) This is how we get to a situation where a code9 is received by an ip (monitor A) from an op (monitor C). The code9 will contain a complete listing of all monitors from monitor C's neighbor list.

Upon receipt, monitor A will set the code9 inhibit flags in its neighbor list for all monitors whose id's are also found in the code9 list and then it will enter dist1 of distress mode. The setting of these flags prevents monitor A from sending code9's on routes which have already been tried and who failed to yield a partnership grant. Monitor A will also set the code9 inhibit flags that correspond to its own ip's (H and I).

Now monitor A will attempt to send its own code9 to monitors in T1 that still have their code9 inhibit flags clear. The code9 which was received from monitor C will be temporarily stored in T17. Every time a timeout occurs with no partnership occurring, monitor A will set the code9 inhibit flag for the tried monitor in T1.

If a partnership grant results, monitor A will send the code9 it received from monitor C (now residing in t17) to its new op. If, on the other hand, all code9 inhibit flags in t1 of monitor A become set without a partnership grant occurring, monitor A will send a code1A back to monitor C. Then monitor A will return to normalcycle as will be more fully described with particular reference to FIGS. 7a–7g.

When monitor C receives the code1A, it will set the code9 inhibit flag for monitor A in its neighbor list. Monitor C will then attempt to get a partnership grant by sending the code9 to monitor D. If that fails it will try monitor B. If all of the code9 inhibit flags in t1 of monitor C become set with no partnership grant occurring, monitor C will simply start the polling process over by clearing all code9 inhibit flags in its T1.

Figure 2C:
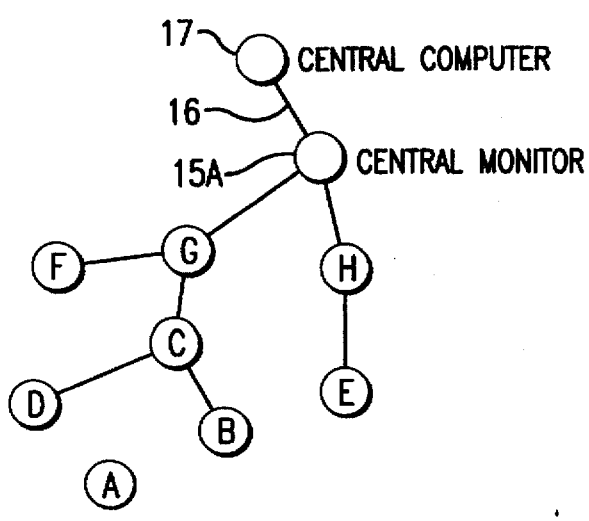

When distress is entered from initialization and the monitor is not the central monitor 15A, dist3 will be executed. To simplify discussion, the monitor who's perspective is being described will be called monitor A as seen in FIG. 2C.

The first event will be the transmission of the distress broadcast message which was placed in the transmit queue during initialization. All monitors who are in range will detect this message and will send a code2 (acknowledge) back to monitor A. Those monitors will send code2's in a time-staggered fashion as to avoid collisions. As monitor A detects these messages being sent to it, it begins recording the senders' id's and signal strengths in the neighbor list (T1). (Actually, any transmissions that a monitor "hears", at any time, causes it to record the sender's id & signal strength into its neighbor list regardless of who the message was addressed to.

The main purpose of the neighbor list is so that a monitor can keep track of all other monitors that it is in range of. This table is occasionally cleared of monitors who are no longer being heard from.)

After monitor A has collected data into its neighbor list, it will send out a code9 (partnership request) to one of the newly detected neighbors (monitor B for example). This message will contain a list of monitor A's neighbors along with their signal strengths. Normally ip's are excluded from the list but at this point monitor A has no ip's anyway. It is the job of monitor B to forward the code9 to its op who will send it to its op until ultimately it reaches central.

The central computer 17 will then choose one of the monitors listed in the message as an op for monitor A.

Central computer 17 bases this decision on which one of the monitors 15 can most easily take on additional tag data traffic. For this example, lets say central computer 17 decides that monitor C is the best choice to become the op of monitor A.

Central computer 17 informs the pair of monitors via a code0a (partnership grant). This message will be sent to monitor C via monitor C's op and other parents. (Parents of a monitor include all monitors which link it to central including the op. For example, the parents of monitor B include monitors C, G, and central monitor.) Monitor C will then send the code0a to monitor A. Now monitor A is officially the ip of monitor C and monitor C is officially the op of monitor A.

Although this relationship is established among monitors A & C, central computer 17 does not know if the partnership grant it issued ever successfully reached monitors A & C. Monitor A must verify the partnership by sending a code0d (ip added) back to central computer 17 through monitor C and its parents. When the code0d is received by central computer 17, central computer 17 records the partnership into its data structure.

Now that monitor A has an op, it will leave distress mode and enter normalcycle mode. Monitor A will then be able to process and forward tag data. Monitor A will also be able to take on ip's of its own.

As monitor A is leaving distress, all messages in the distress queue are transferred into the transmit queue. In this scenario, this means the code1c (reset) placed in the distress queue during initialization is now eligible for transmission. This message is sent to central computer 17. When central computer 17 receives this message, it will prompt the user for X & Y coordinates if necessary.

If this is not a new monitor but instead one which has just been moved, central computer is programmed to purge its tag data base of all references to this monitor. Because the monitor has probably been moved, the tags which used to be in its vicinity must be disassociated from it. The dist2 mode of distress will be entered if communication fails with the op and the op happens to be central computer 17.

As previously noted, there is typically only one monitor in the system 11 which has central computer 17 as its op, although there can be more than one if desired. Such monitors are referred to as central monitors 15A. Each central monitor 15A communicates with its op (central computer 17) through a serial communications port instead of airwaves. This means that collisions with other messages are not possible so all messages between the central monitor 15A and central computer 17 should be successfully transferred. If they are not, it is assumed that there is some problem with central computer 17 or the communications link itself.

This type of failure will cause the central monitor 15A to enter dist2 which simply puts a code18 (central down broadcast) in the transmit queue. Central down mode is then immediately entered.

Normal Cycle

Referring to FIGS. 7a–g, the main purpose of normal cycle (Main state 2) is to collect and forward tag data. Other functions include ip list and neighbor list maintenance and providing a link by which more remote monitors can communicate with central.

Figure 7A:
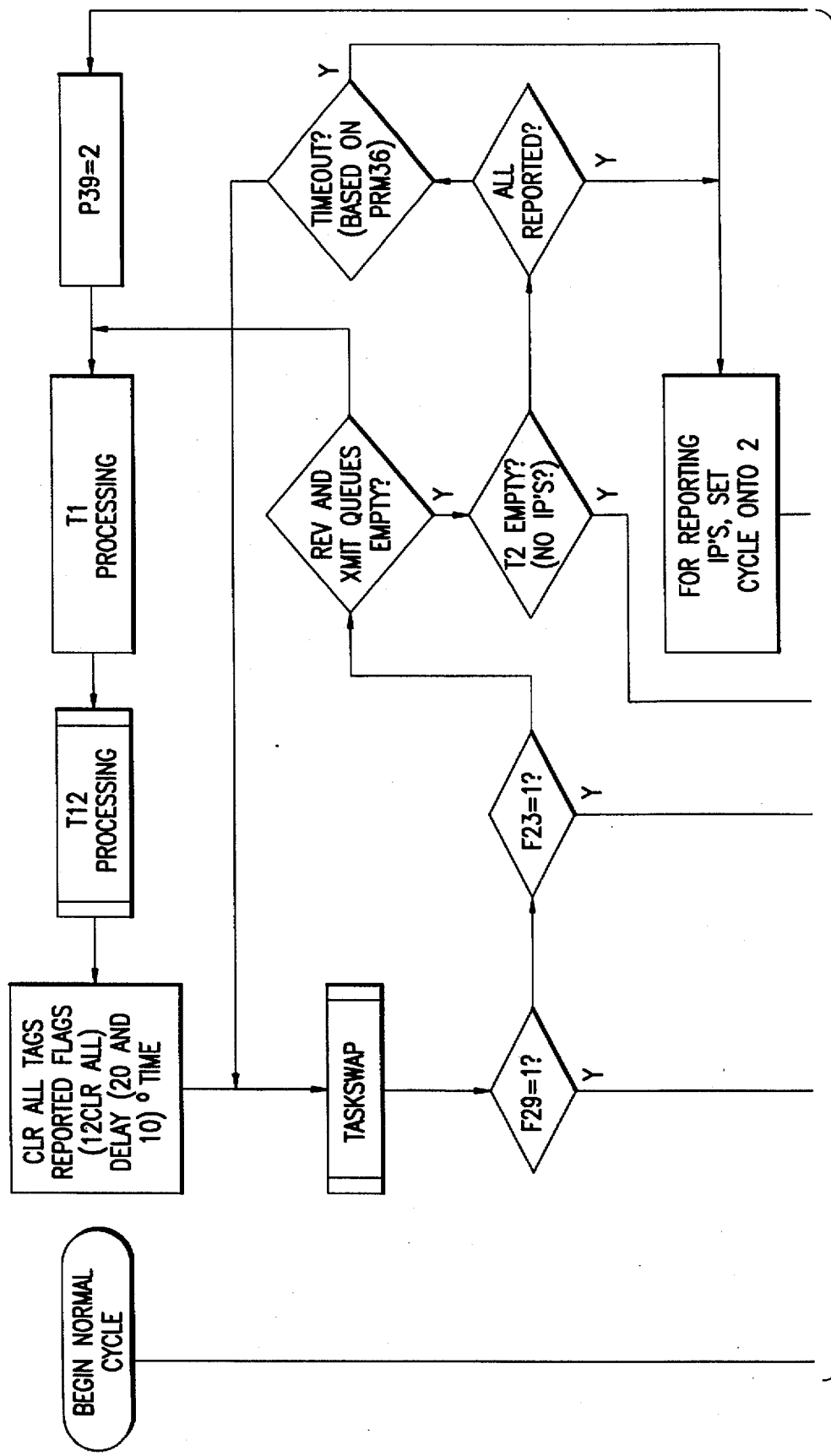
FIGS. 7a–7g are flow diagrams illustrating the operational steps of the normal cycle mode of the monitors.

As can be best seen in FIG. 7a, once entered, normalcycle will synchronize itself with other monitors using p24 and p26. Then a period will occur (just under 5 minutes) where the monitor 15 will primarily be listening for tag transmissions 21. After this time is up (p24>p26), T1 will be processed.

Figure 7B:
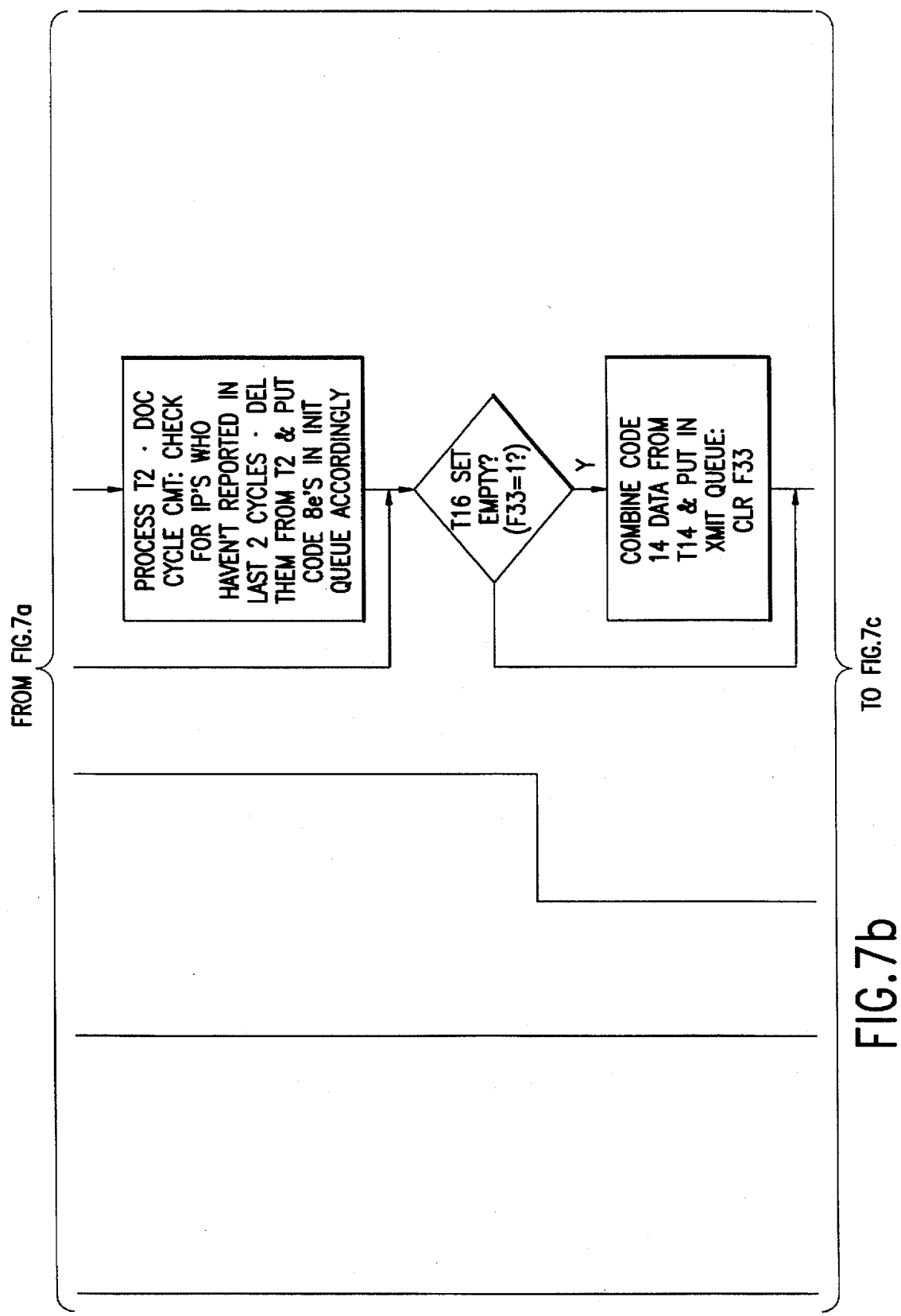
Figure 7C:
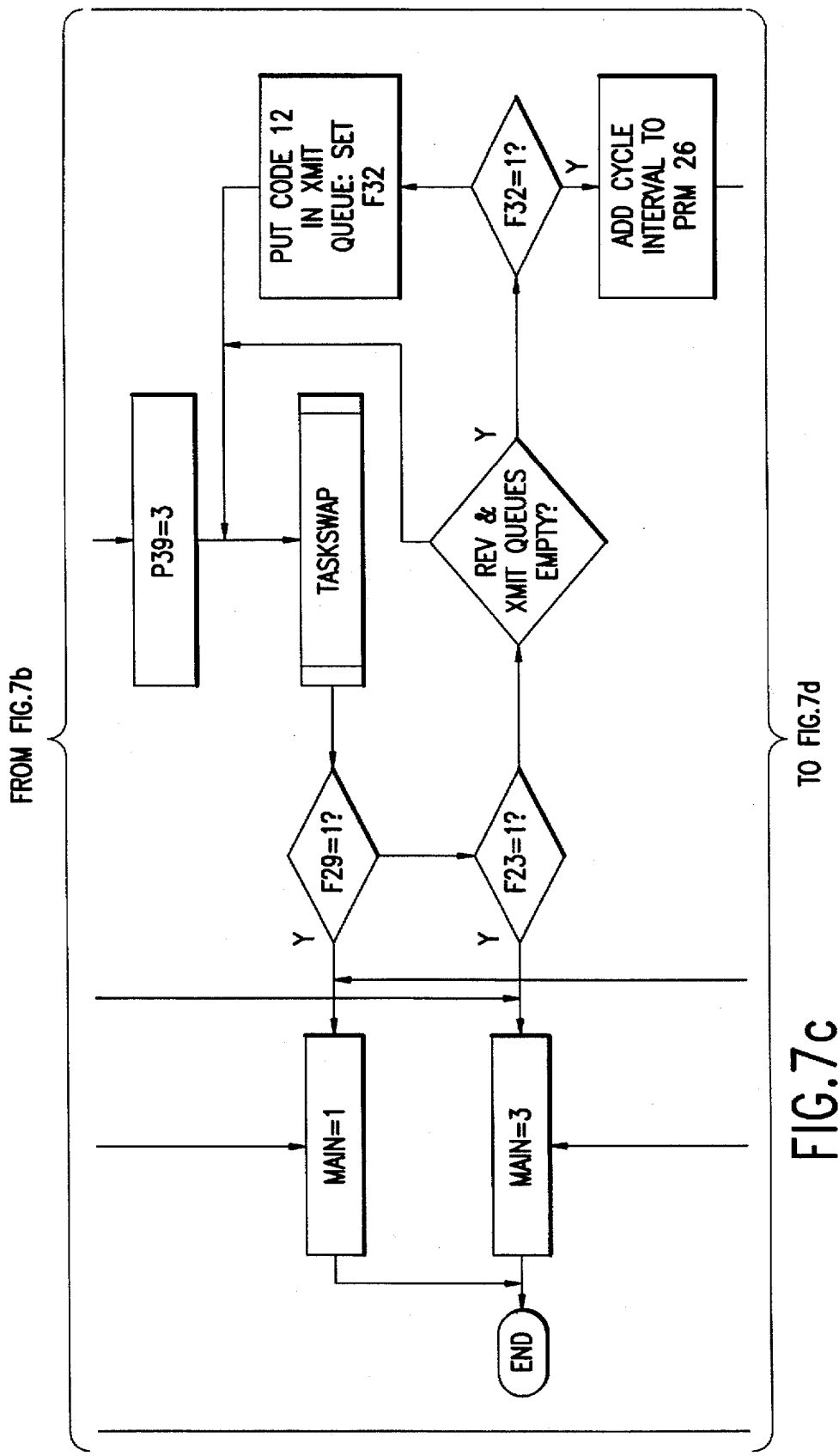
Figure 7D:
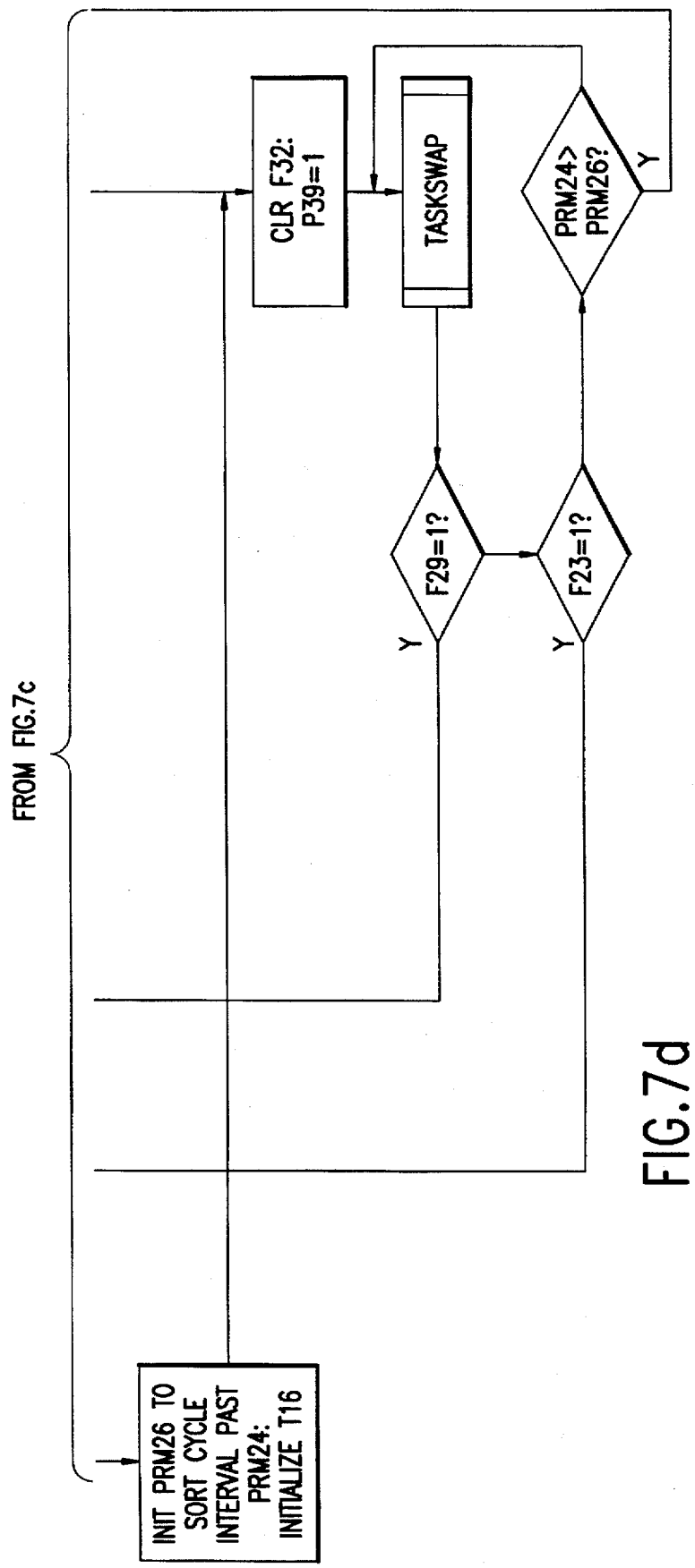
Figure 7E:
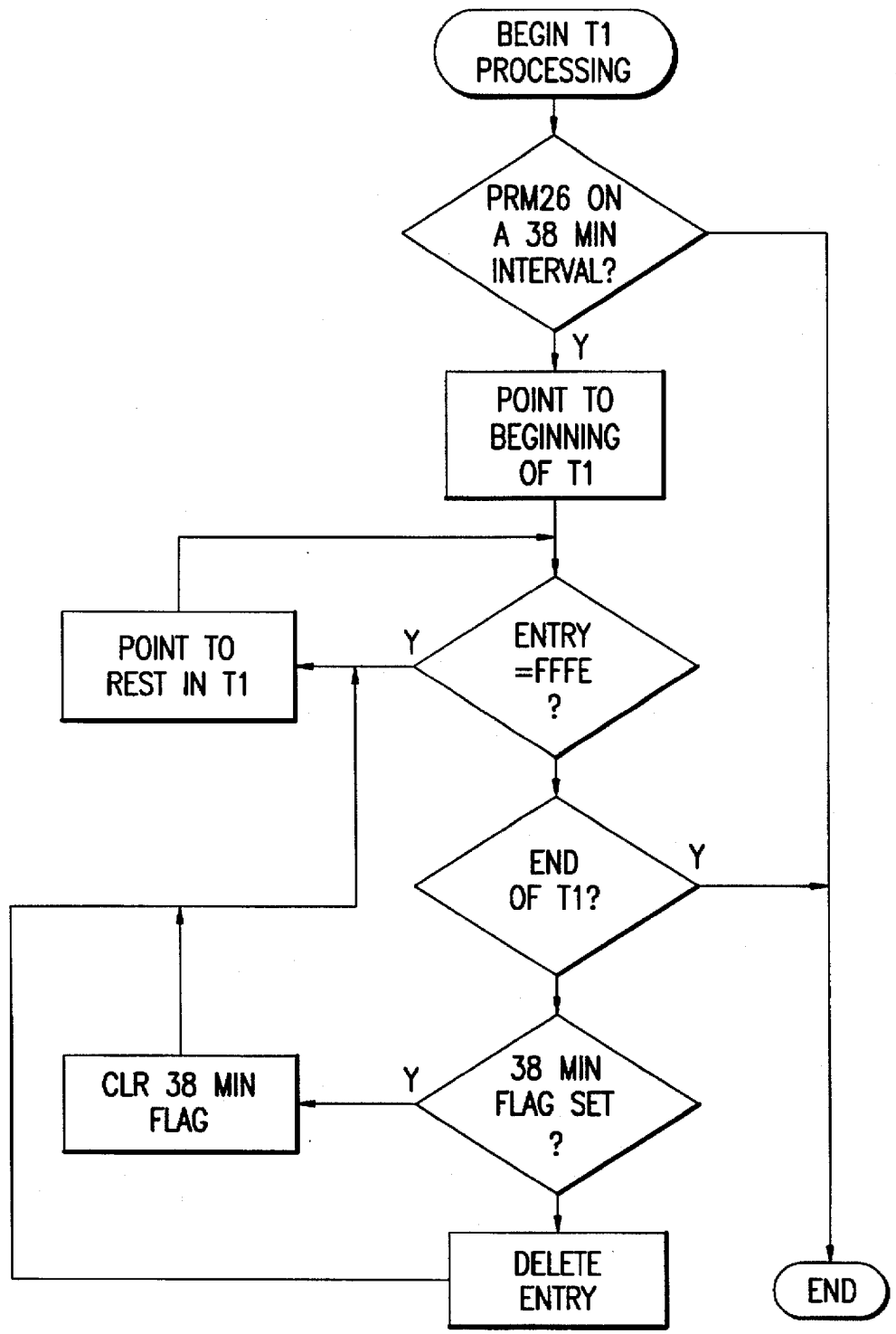
Figure 7F:
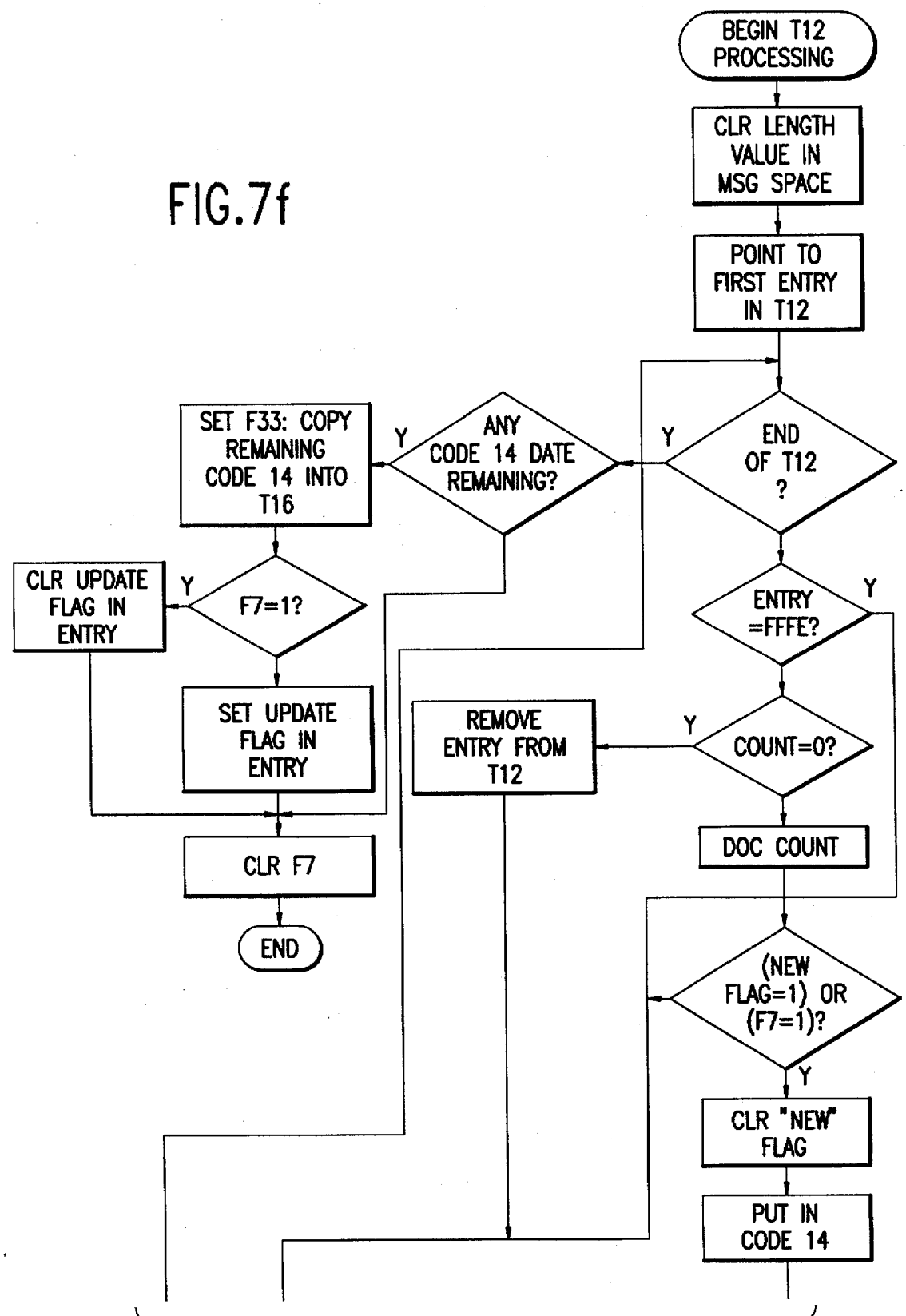
Figure 7G:
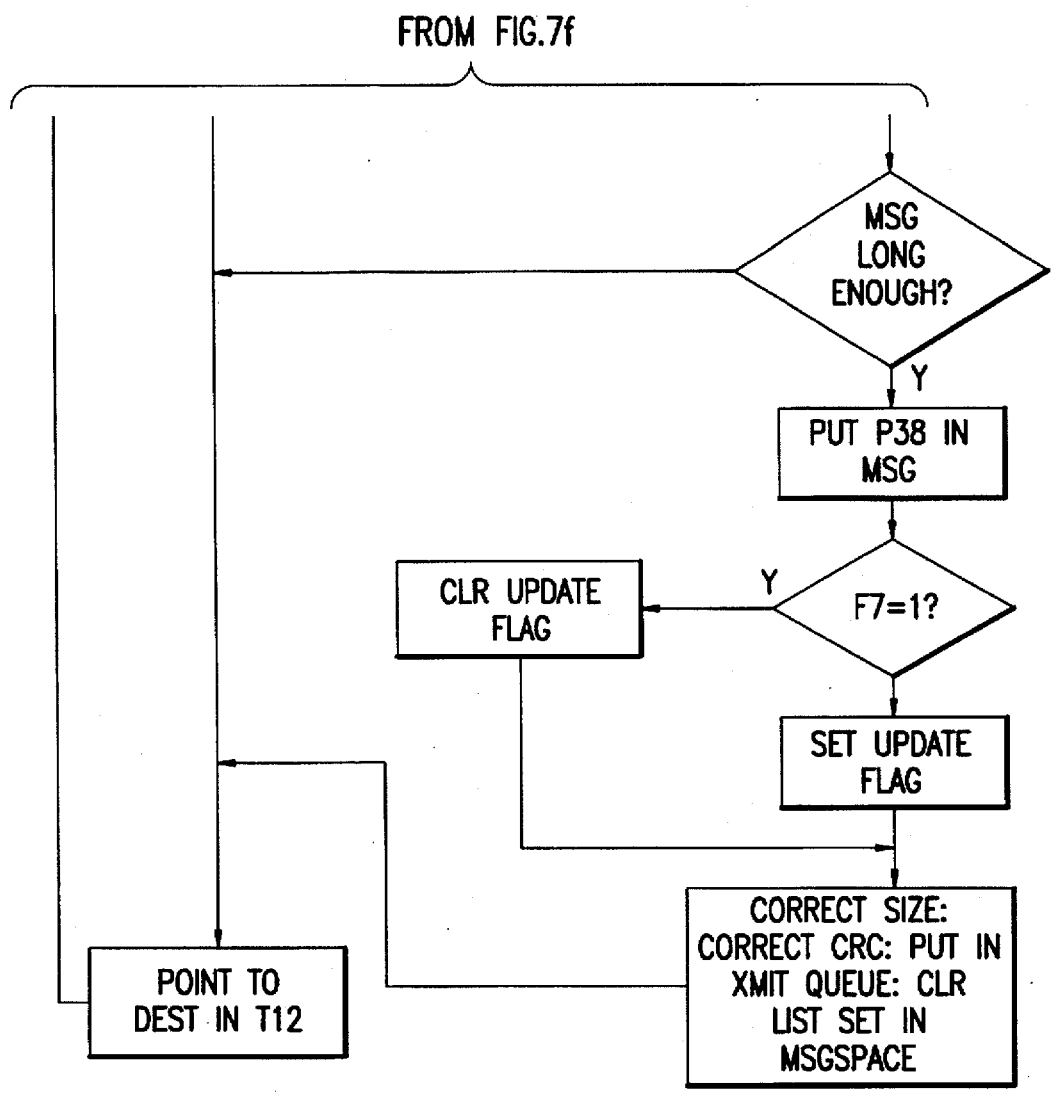

FIG. 7B shows how t1 will be processed only every 30 minutes. If p24 is on a 30 minute interval, t1 processing will search for and delete any monitors 15 in T1 which have not been detected in the last 30 minutes. This is determined by whether or not the 30 minute flag in the t1 entry for a given neighboring monitor is set.

Next, T12 processing will occur. This is shown broken down in FIG. 7c. T12 contains tag information on tags 13 which have been detected in the given monitor's vicinity. New tags 13 (or old tags 13 whose signal strength has changed, i.e., which have moved significantly) are included in a code14(s) which will be constructed to an optimum length. If flag7 is set, all tags in the vicinity will be included in code14(s). Any residual tag data remaining will be left in code14 format and will be stored into t16.

The next major function of normalcycle will be to send its accumulated tag data (now in xmit queue) to its op. At approximately the same time it will be receiving tag data from its ip's. Once all ip's have reported (sent in their code12's) or a timeout occurs, residual tag data (if any) from t16 will be combined into a code14 and sent to op. Then the monitor 15 will send its own code12 to its op. Then another tag transmission reception period of approximately 5 minutes will occur.

As noted above, tag data is forwarded to central computer 17 in a code14 which tells the central computer 17 which tags 13 are being detected by which monitors and at what signal strengths. Signal strength indicates the distance a tag 13 is from the associated monitor 15 receiving a radio signal 21 from the tag 13.

A monitor 15 will send in data to the central computer 17 for a given tag 13 in four cases: 1) a tag 13 first enters the vicinity (communication range) of that monitor; 2) a tag 13 moves significantly within that monitor's vicinity (indicated by a significant change in signal strength); 3) a code15 (request for all tags 13) is issued to that monitor from the central computer 17; or 4) a tag 13 leaves a monitor's vicinity (optional—depends on application).

A monitor 15 will send its own tag data every cycle that the above criteria is met. In the present system 11, the cycle will be approximately five minutes and all monitors 15 will be synchronized so that their cycles always begin at the same time. When a monitor 15 along with all of its descendants has sent all of its tag data, it will issue a code12 (all tags 13 reported message) to its op. If a monitor 15 and its descendants have no tag data to report, it still sends a code12 to its op.

When an op has sent all of its own tag data along with its ips' tag data and received code12's from all of its ip's, it will send any "residual" tag data it may have accumulated followed by a code12 to its op and so on until the central computer 17 receives all of the tag data. The monitors attempt to send code14's of an optimum length; this creates residual tag data which is temporarily stored. When more residual tag data is encountered (ie. from ip's), a monitor 15 will attempt to combine this data with the stored residual tag data to create a code14 of optimum length. However, if code12's are received from all ip's, the monitor 15 will send its residual tag data "as is" followed by a code12 to its op. This is because at the point when code12's have been received from all ip's, no other tag data will be received from ip's until the next cycle.

If all of a monitor's ip's haven't sent in their code12's, a timeout condition will occur and the monitor will give up on those ip's for the current cycle.

If an ip fails for 3 consecutive cycles to send a code12 to its op, that op will assume that the partnership has ended and will send a code0e (ip deleted) to the central computer 17. If the former ip has been re-routed (another op assigned to it), the central computer 17 will ignore this code0e. If the former ip hasn't been re-routed, the central computer 17 will expect to receive a code9 (distress signal) from the former ip. If the code9 is not received in a certain amount of time, the central computer 17 will attempt to assign the former ip a new op based on information it already has. If these measures continue to fail and a code9 is never received, the central computer 17 will assume that the monitor is malfunctioning and will inform the user of the situation.

Periodically (perhaps every 2 days), the central computer 17 will issue a code15 (request for all tags 13) to all monitors 15 in the network. By doing so, all tags 13 in the system 11 can be accounted for. If a tag 13 is not reported, as in the case of a destroyed or missing tag, the central computer 17 will notify the user of the situation.

CENTRAL DOWN MODE

Figure 8:
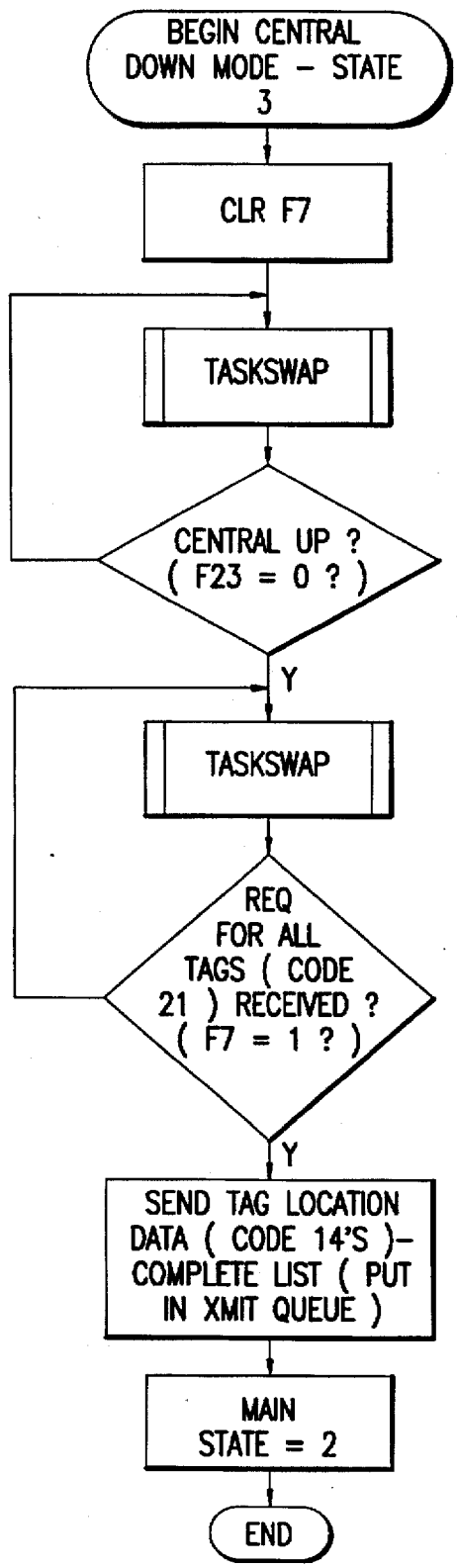
FIG. 8 is a flow diagram illustrating the central down mode of the monitors.
Figure 9A:
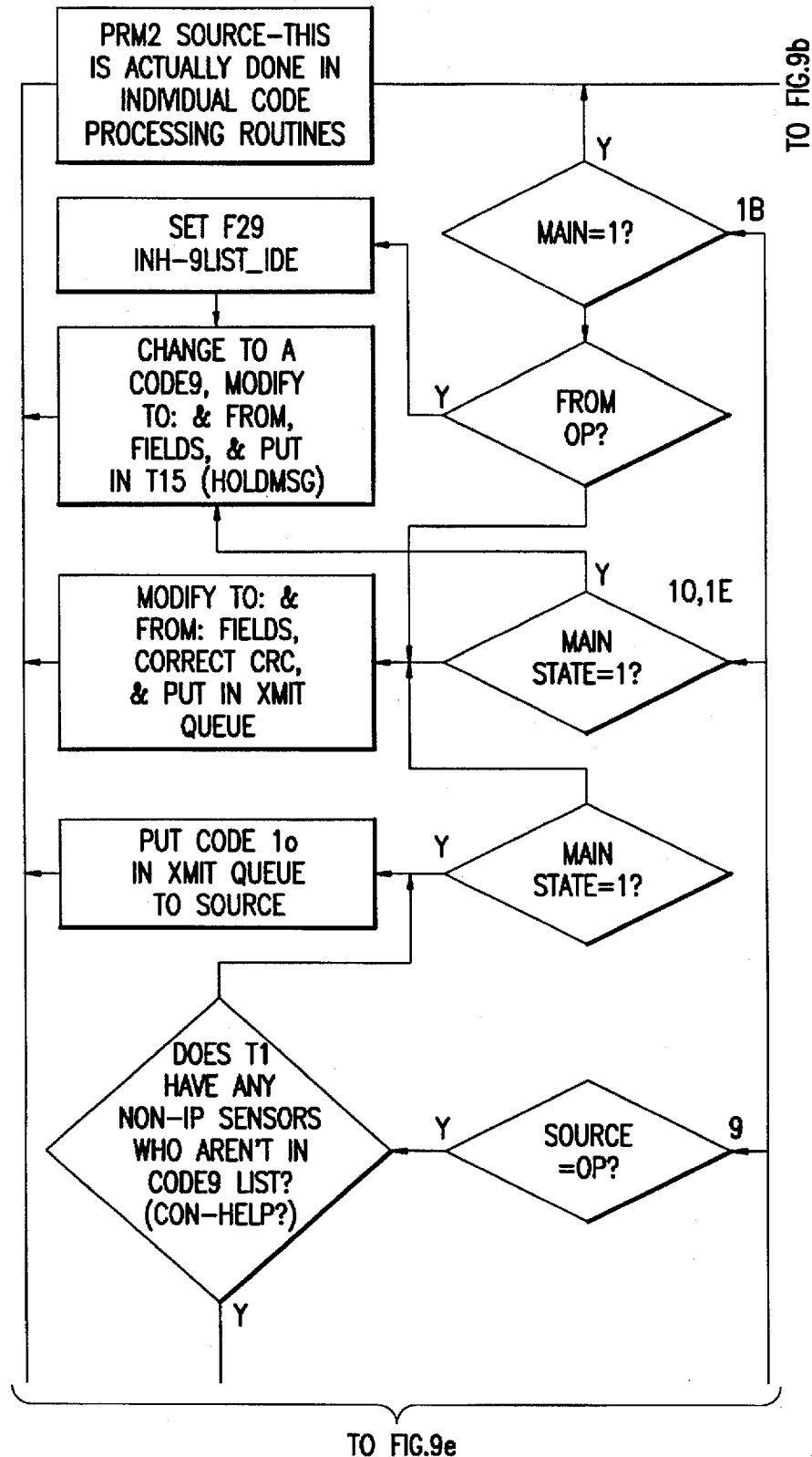
FIG. 9 is a flow diagram illustrating the listening mode of the monitors.
Figure 9B:
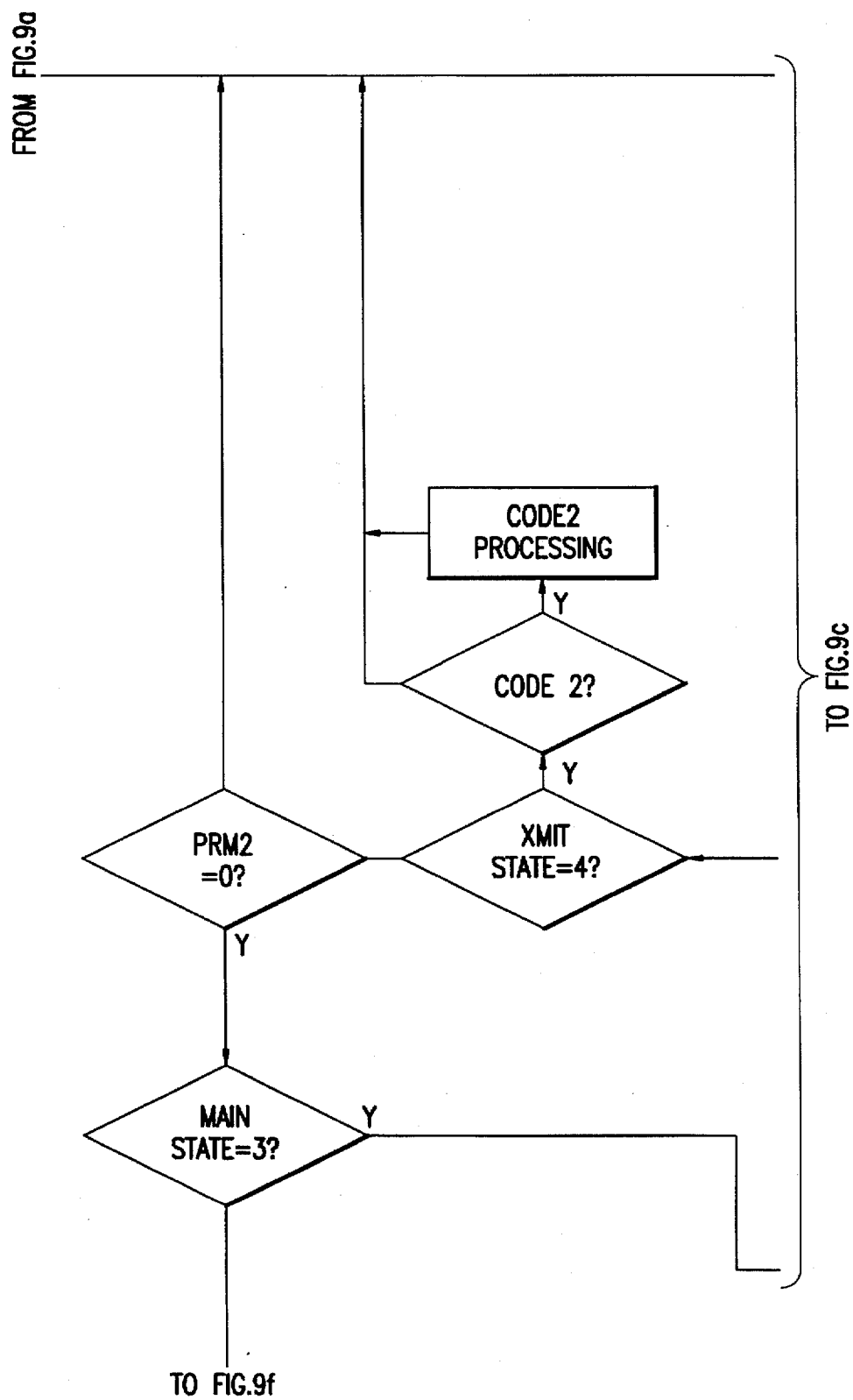
Figure 9C:
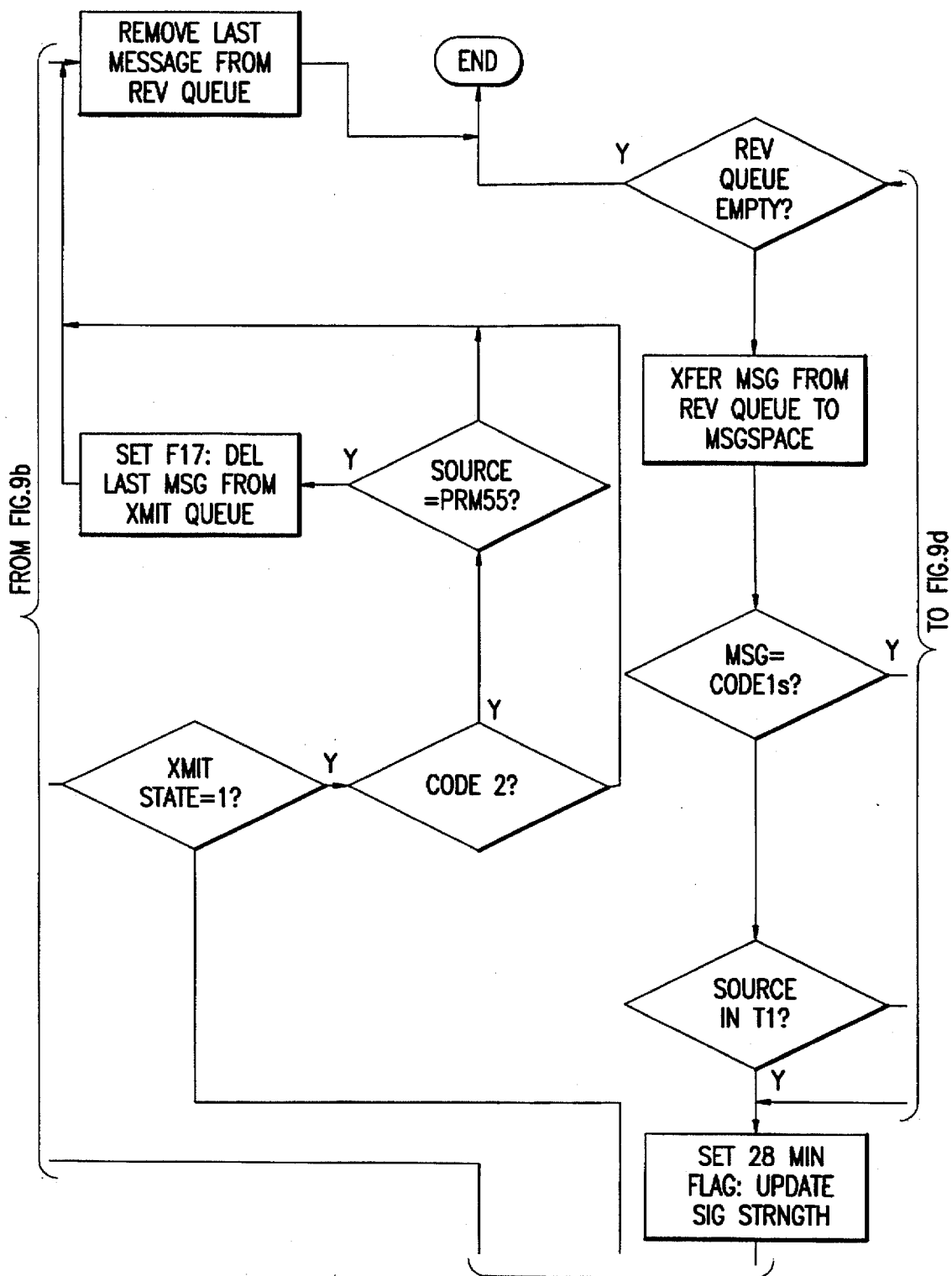
Figure 9D:
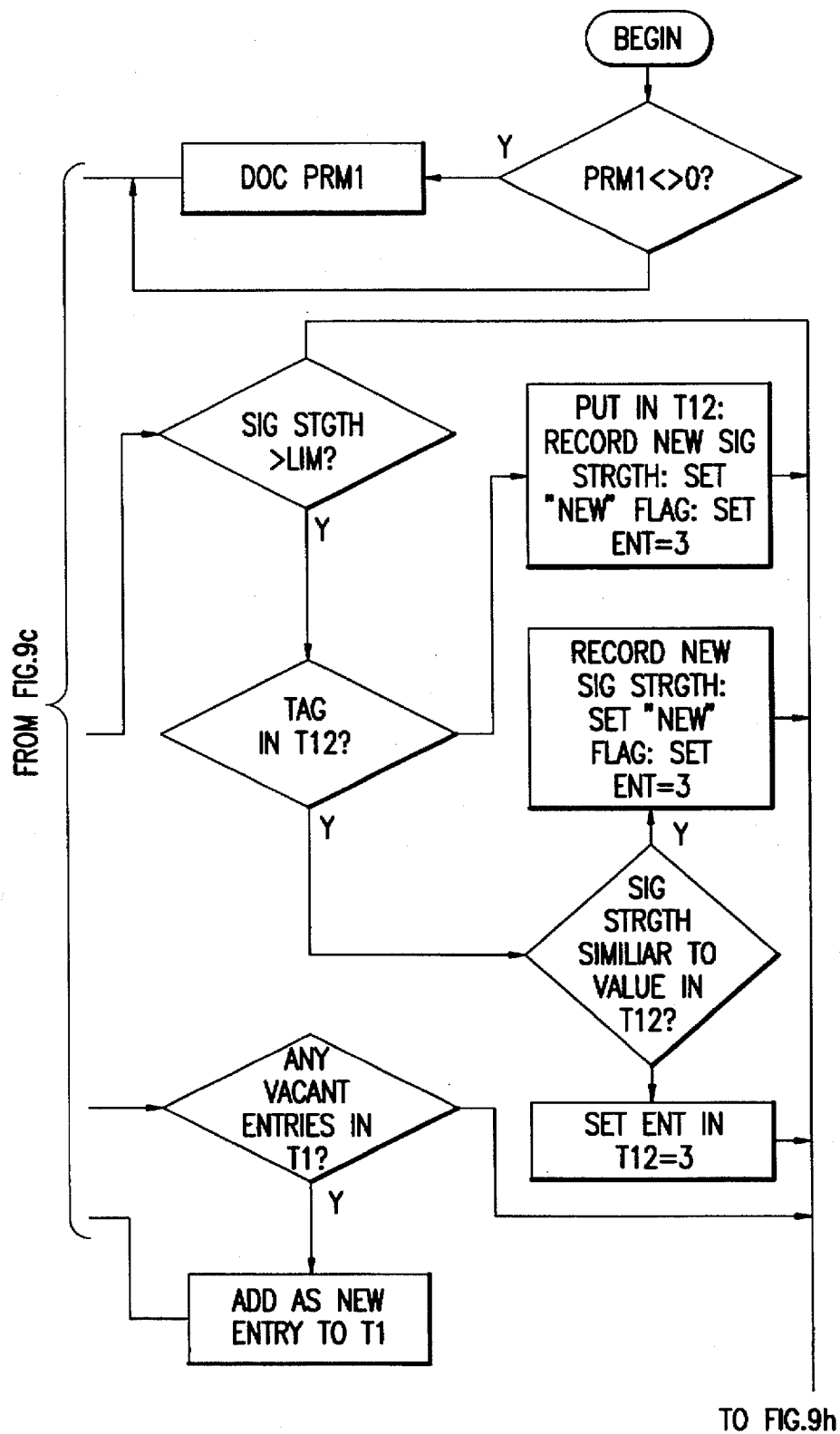
Figure 9E:
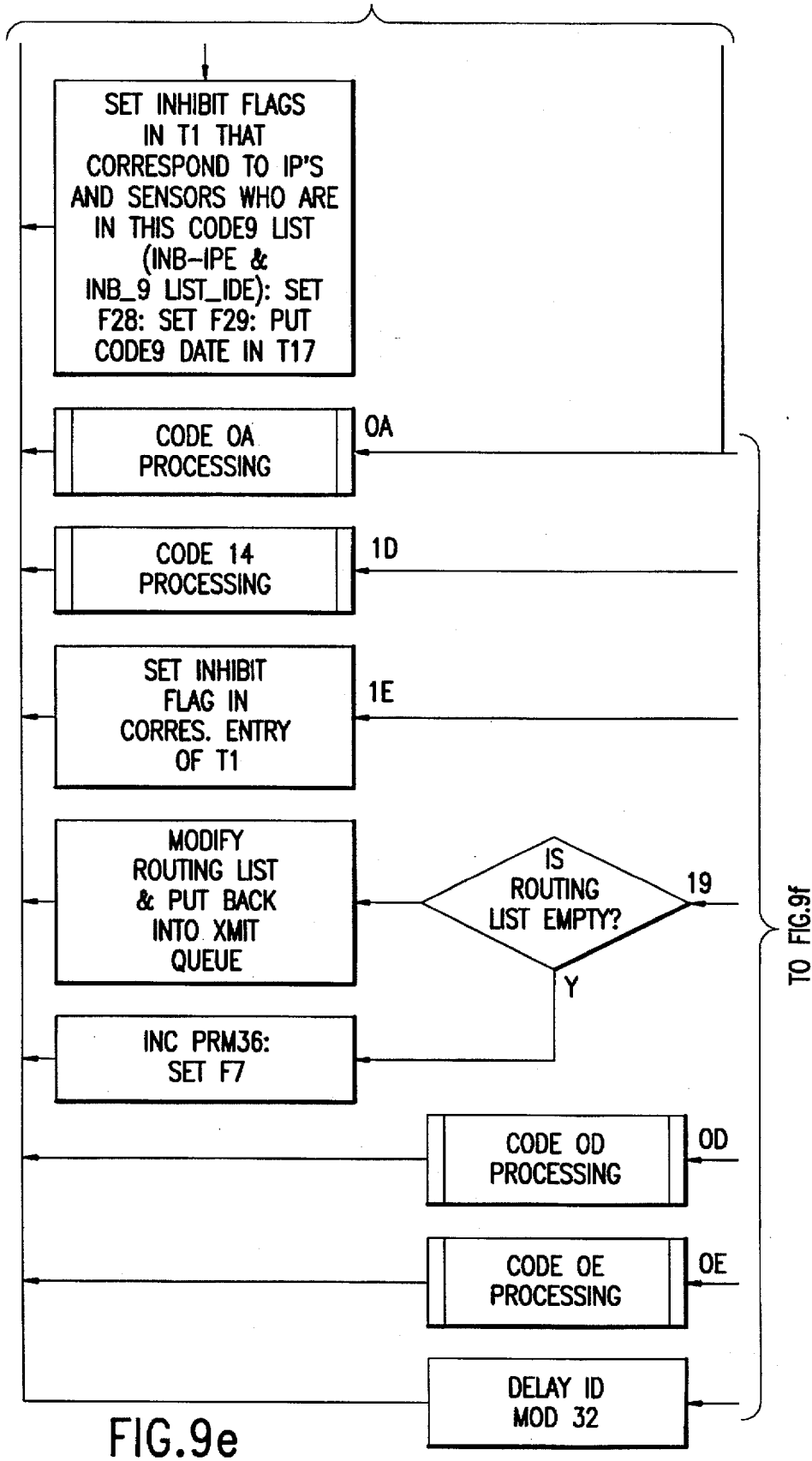
Figure 9F:
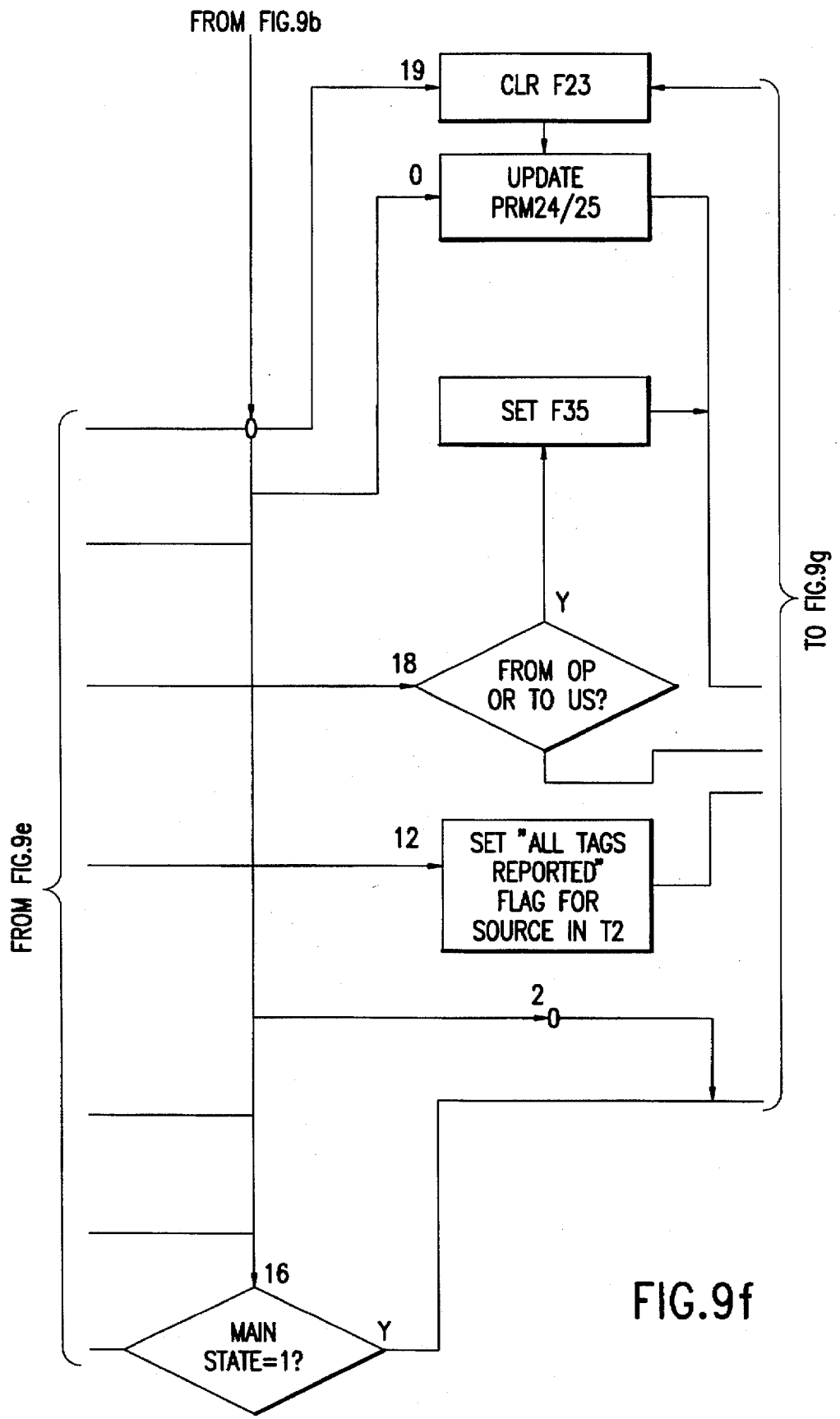
Figure 9G:
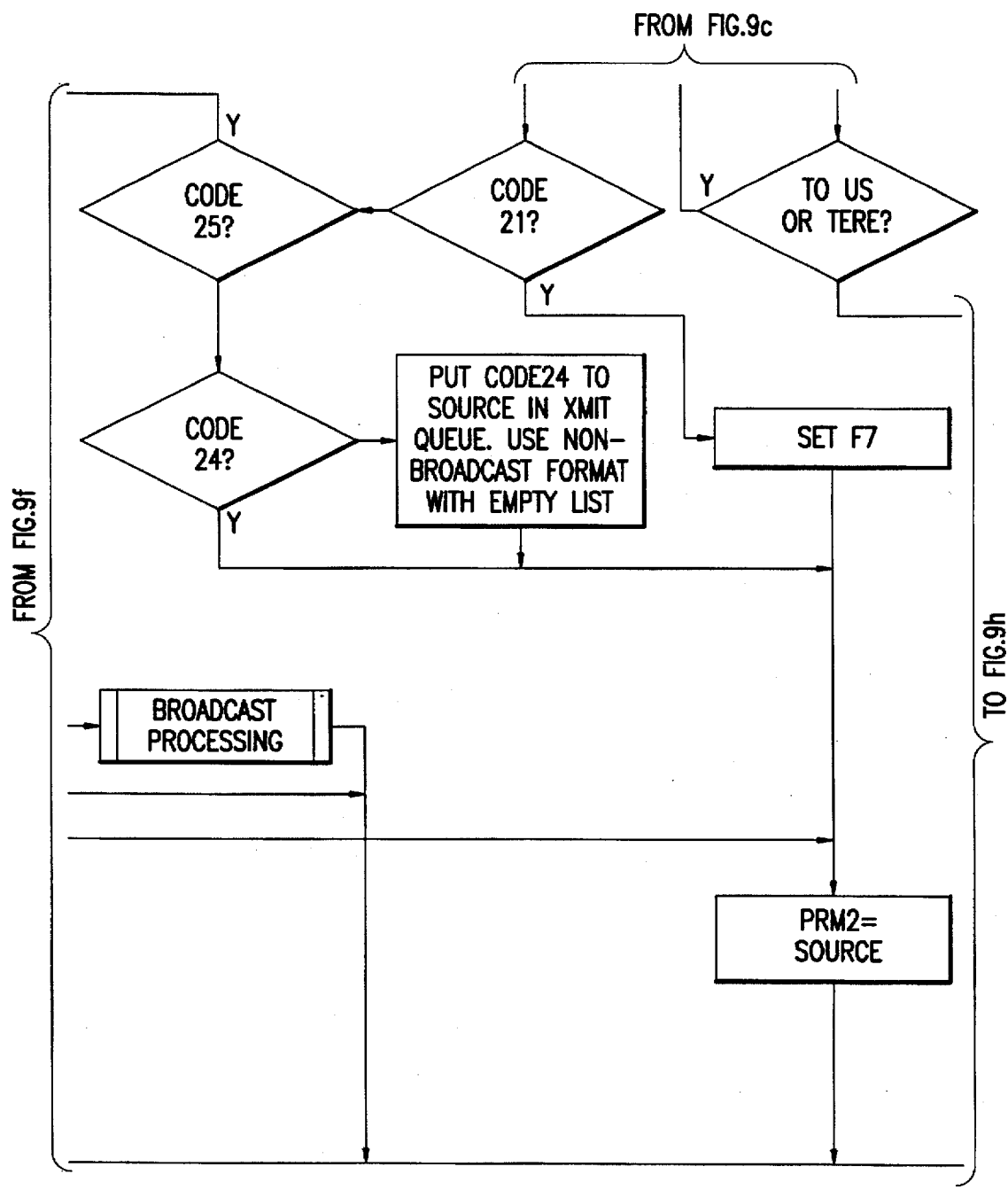
Figure 9H:
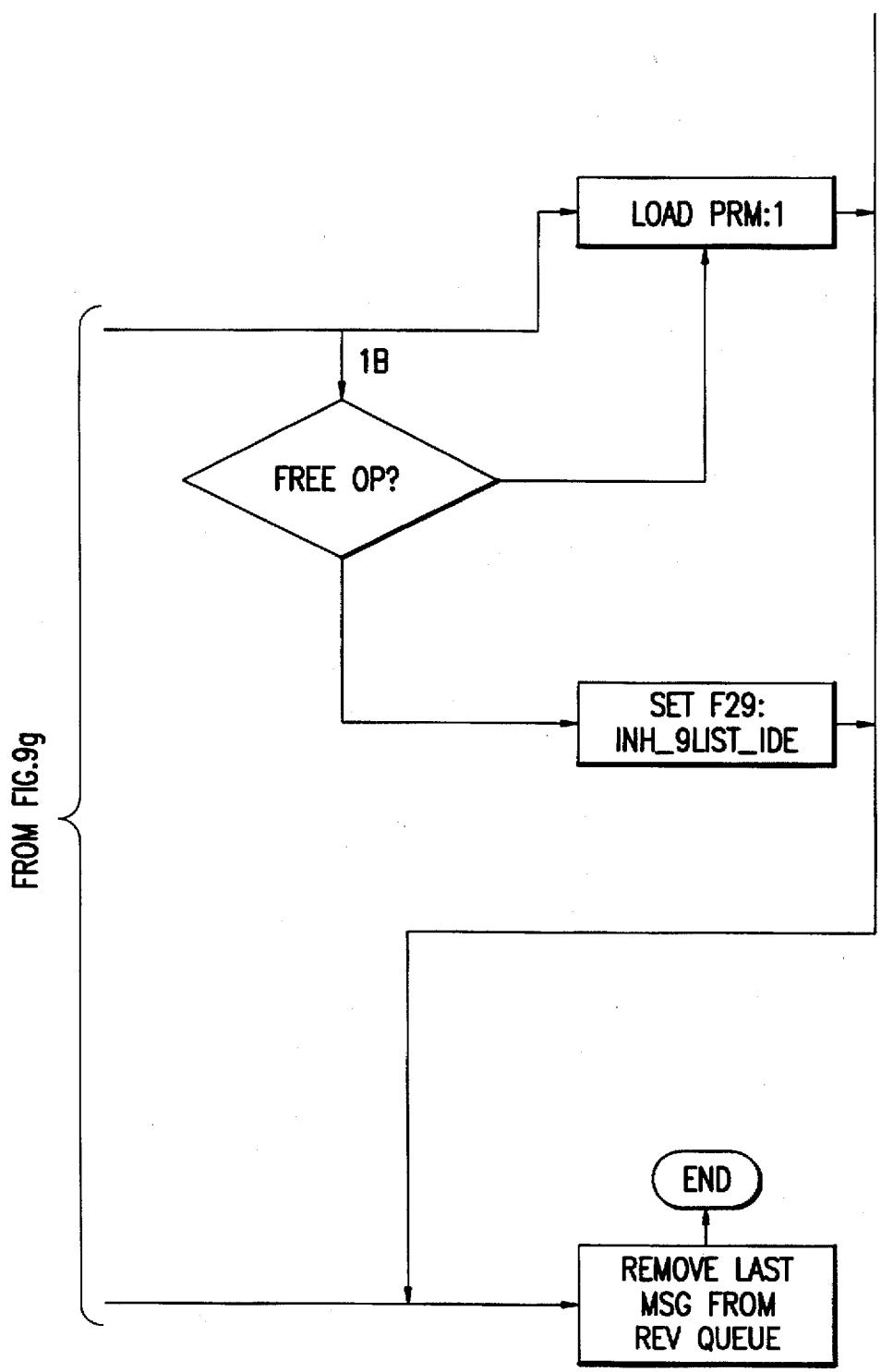

When central down is entered, the airwaves will be monitored until a central up broadcast is detected. This is done by repeatedly calling taskswap until f23=0 as best seen in FIG. 8. Next taskswap will be repeatedly called until a request for all tags is detected. When f7=1, all tags will be included in code14(s) and placed in the transmit queue. The control will be passed back to normalcycle.

Referring to FIG. 8, when a central monitor 15A loses communication with the central computer 17, the monitor 15A will first enter dist2 and then go into central down mode (Main state 3). The central monitor will broadcast a code18 to ip's who will then broadcast code18's to their ip's and so on until all descendants have received the code18. This causes all monitors 15 in the tree to go into central down mode.

While in central down mode the monitors 15 don't initiate communication with their op's but will acknowledge messages sent to them from their op's.

When the central computer 17 is re-booted, it will issue the central-up message (code 19) to its IP(s) (central monitor 15A). The central monitor(s) 15A will then retransmit the message to its IP's and so on. After some delay, the central computer 17 will begin polling monitors 15 individually with code15's (requests for all tags). Monitors 15 must hear and respond to this code15 before they go back to the normal cycle mode.

The central computer 17 retains knowledge of the network tree by saving a copy of it to disk every time it is modified. Partnership grant messages (code 0a's) and request for all tags (code 15's) are stored in an unverified command message queue. This queue is saved to disk every time a message is added to it and before a message is actually issued.

When a partnership grant is verified, the tree is modified accordingly (which causes the tree to be copied to disk). Then that message is removed from the unverified command message queue (which causes the queue to be saved to disk). Partnership grants are considered verified when a corresponding code0d (ip added) is received by the central computer 17. Also, the central computer 17 knows when a code15 reaches its destination because it will receive a code14 from that monitor 15.

This code14 will be different than the usual code14 in that it will have a cleared flag in its status byte (See the code14 breakdown in FIG. 25). This cleared flag will indicate to the central computer 17 that the code14 is in response to a code15 (request for all tags message).

These measures allow the system 11 to be restored to conditions which are exactly the same as they were before the central computer 17 failed.

SYSTEM OPERATION

Referring to FIG. 9, after initialization, the monitors 15 are programmed to listen. The first action of listen is to decrement the traffic parameter (p1) if it is not already zero. The traffic parameter (sometimes called "busy" parameter) is loaded with a count when a message destined to another monitor 15 is found in the receive queue. Theoretically, when the traffic parameter reaches zero, that particular session should be over. When p1=0, transmit is allowed to send out messages.

The primary function of listen is to retrieve the next message from the receive queue and process it. As can be seen, many conditions may affect the way a message is processed. Once a message is processed, it is removed from the receive queue. If it is a message that requires an acknowledge to be sent back, the other monitor's ID is placed in p2. This will cause transmit to send an acknowledge to that monitor 15.

Figure 10A:
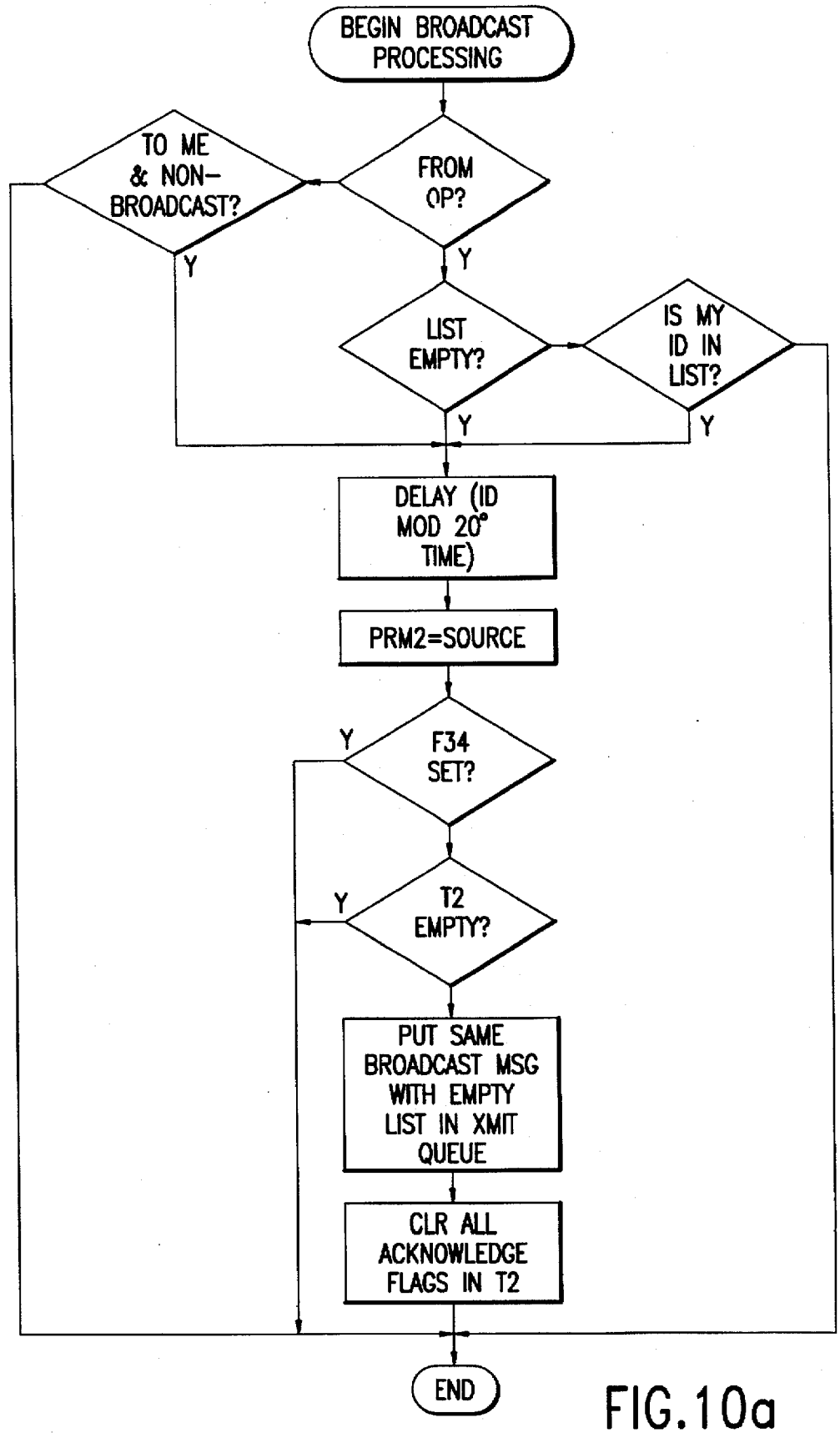
FIGS. 10a–10g are flow diagrams illustrating monitor code processing.

Some of the code-processing subroutines shown in FIG. 9 are shown broken down into detail in FIGS. 10A–10F in which monitor code processing is shown. FIG. 10A depicts the operation of broadcast processing. The purpose of this routine is to relay to the ip's any broadcast messages received from the op. As with all acknowledgeable codes, the id of the source is copied to p2. This allows transmit to acknowledge the broadcast which was just received.

After this occurs, transmit will send out the broadcast to the ip's. Notice that all acknowledge flags in T2 are cleared in this routine. This allows the monitor to keep track of which ip's have acknowledged if a retransmit is necessary.

Figure 10B:
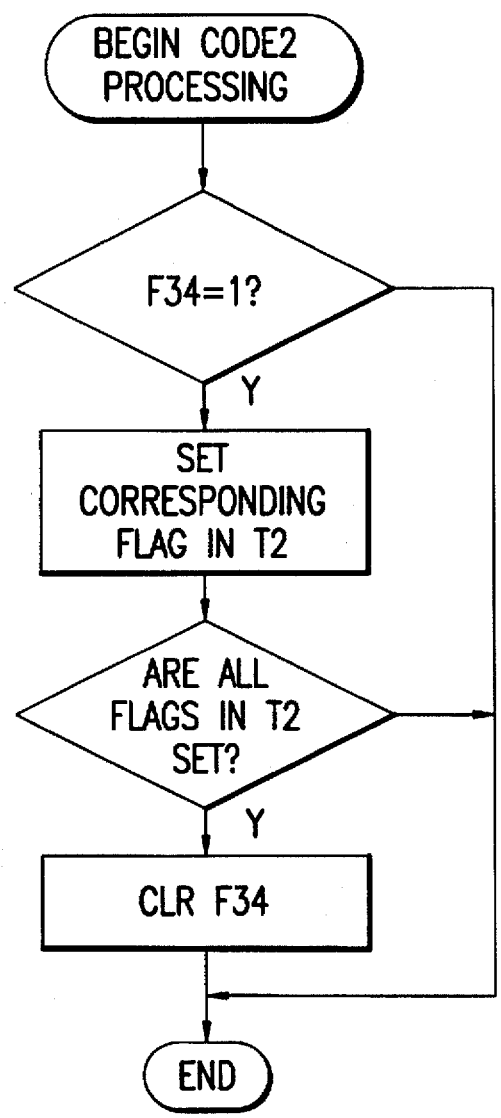

FIG. 10B shows code2 processing. This is related to broadcast processing in that it sets and examines the acknowledge flags which were cleared in broadcast processing. If no acknowledges are expected however, no actions are performed and the routine terminates.

Figure 10C:
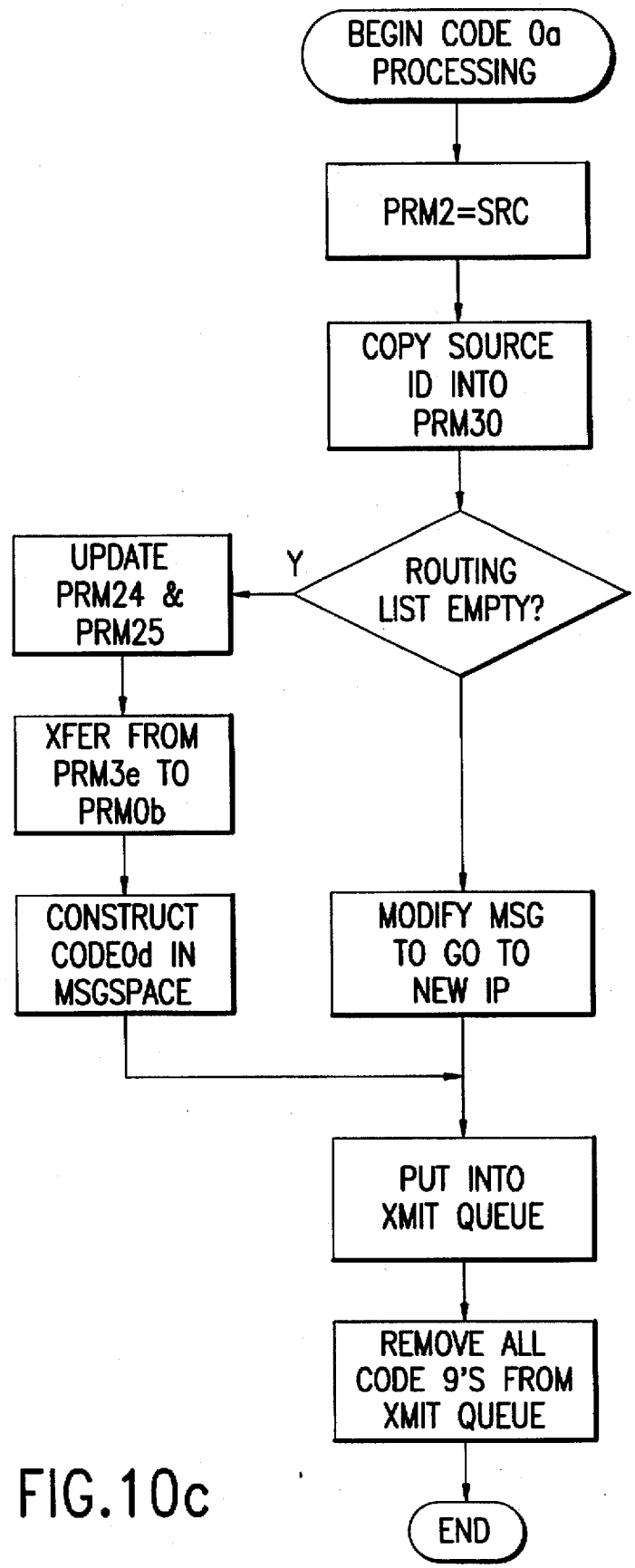

Code0a processing is shown in FIG. 10C. If this message relates to a partnership not concerning us, it is simply passed on to the next monitor 15 in the routing list. (The routing list is a listing of monitor ID's through which a message must pass in order to get to its destination. Routing lists are used in non-broadcast messages which are sent in a direction away from the central computer 17. This routing list is modified every time the message is passed to the next monitor.) Notice that whether or not the routing list is empty, the source of the message is copied to p3e. This is because if a code0d results from this code0a, then the monitor who originally sent the code0a shall be the op.

If the message has a specific monitor 15 listed as the destination address and only one ID in the routing list, then the message specifies the specific monitor 15 as the new op of the monitor who's ID is in the routing list.

If the message has the specific monitor 15 as the destination address and an empty routing list, then the specific monitor 15 is the target of the partnership grant. When this happens the specific monitor records the source address (sending monitor's ID) as the new op. The specific monitor 15 then places a code0d to the new op in the transmit queue.

Figure 10D:
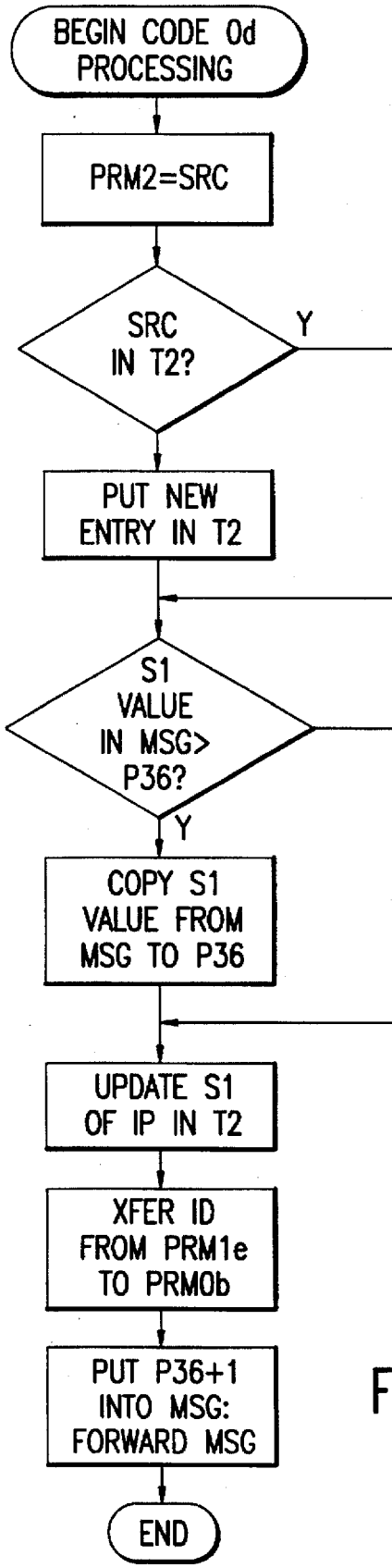

Code0d's occur as a result of code0a's. FIG. 10D illustrates how a code0d is processed. If the source of the message is not an ip (listed in T2), then it is added to T2. The monitor level (called sensor level in FIGS. 19-24) for a given monitor 15 is defined as the number of "generations" descended from that monitor. If it has no input partners, its level is 1. Otherwise, its level is 1 higher than the highest level of any of its input partners.

If the monitor level (s1), which is in the message is greater than p36, then it is copied into p36. This value minus one is then copied into this monitor's entry in T2. P36 plus one is then placed into the code0d which is to be sent to our op. The monitor level of a monitor 15 is a scale factor used to determine how long it can wait on its ip's to send their code12's before it must give up on them and send its own code12 to its own op.

This mechanism is necessary to insure that all tag data is reported to the central computer 17 in the same cycle that it originated.

Notice that p3e is copied to p0b near the end of this routine. This allows for cases when multiple partnerships are granted by a single code0a issued from the central computer 17. The central computer 17 considers the partnership grant verified only when it receives the resulting code0d. The code0d always originates from the last monitor to receive the code0a. Therefore, if the code0d never returns back through the same path of the code0a (which would be the only path logically possible), then the grant has failed and the monitors who didn't receive the code0d will keep using their old op's if they had one. This will cause the central computer 17 to reissue a partnership grant.

Figure 10E:
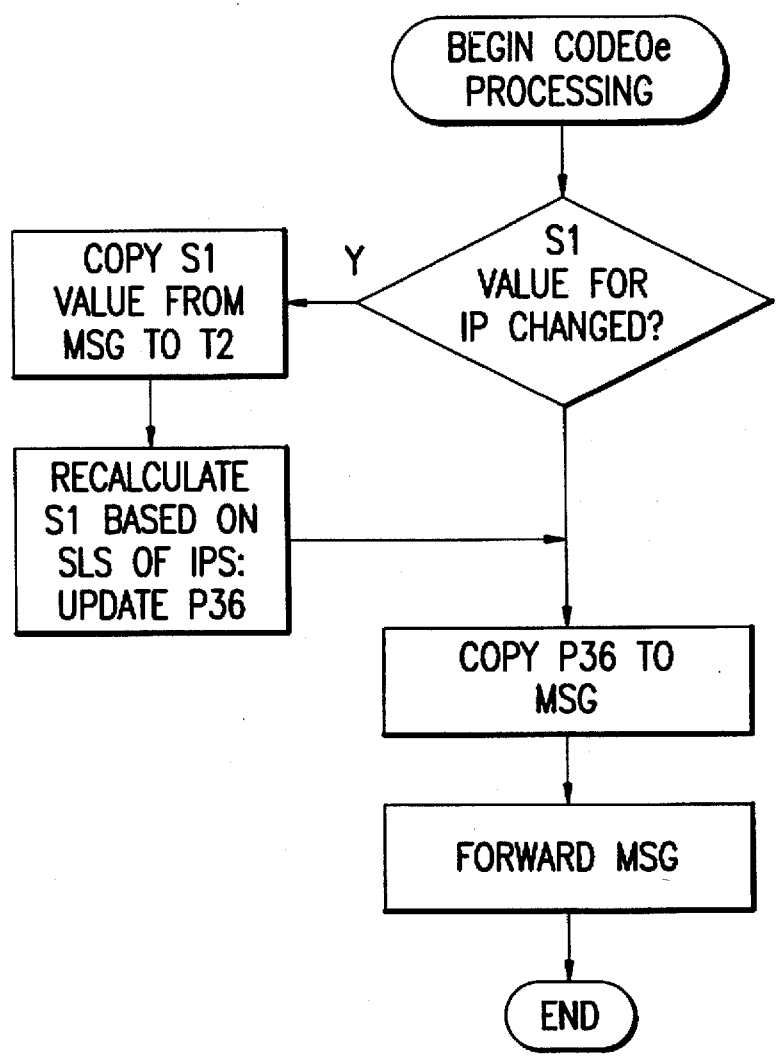

Code0e processing is shown in FIG. 10E. There are two purposes of the code0e. One is for the updating of monitor level values. A value that may be updated is the receiving monitor's p36. Another value that may be updated is the monitor level value of the sender as listed in T2 of the receiving monitor. This allows monitor levels to be reduced whenever possible which allows for more efficient operation. The second purpose of the code0e is to inform the central computer 17 that a partnership has been broken and what two monitors 15 are involved.

Figure 10F:
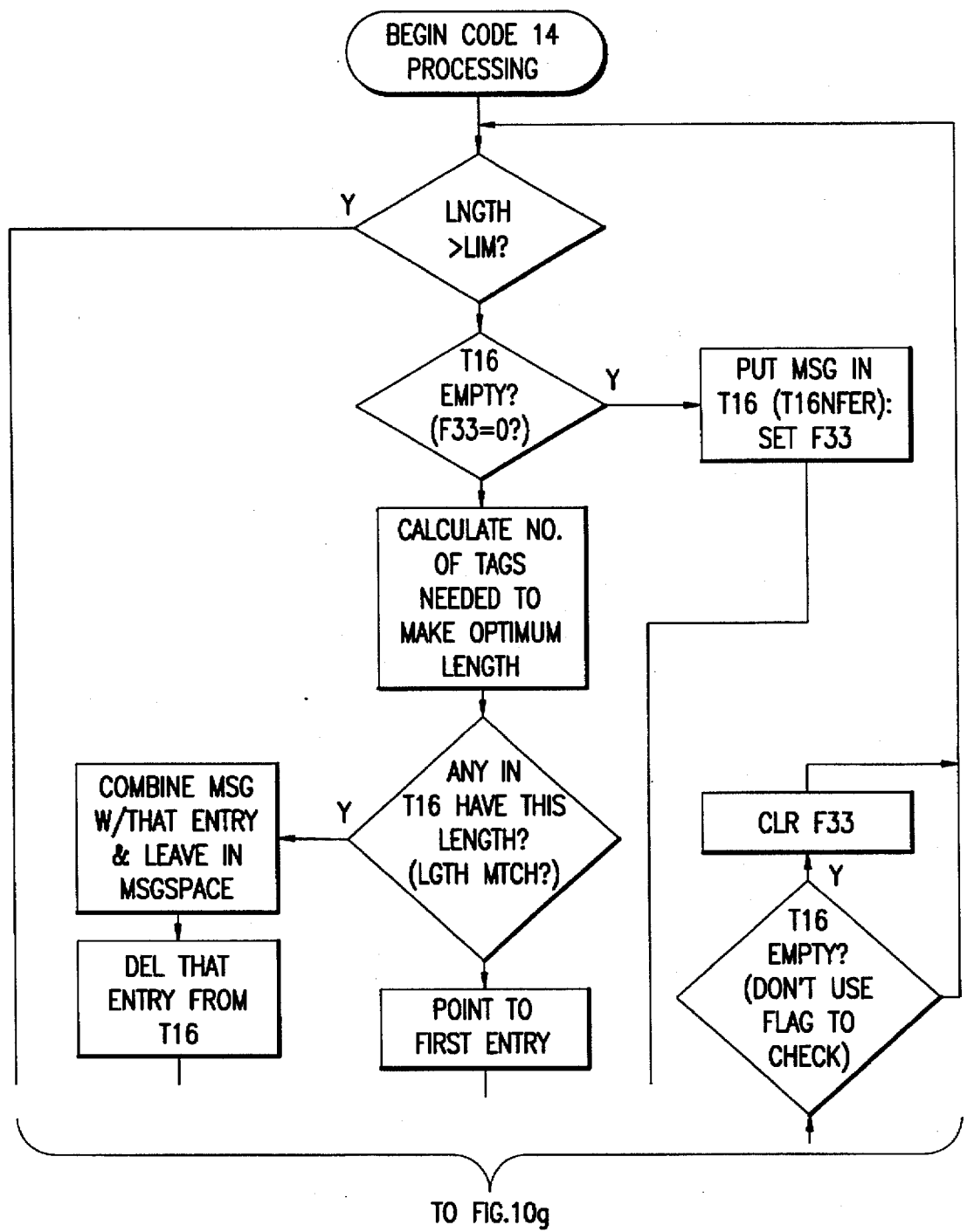
Figure 10G:
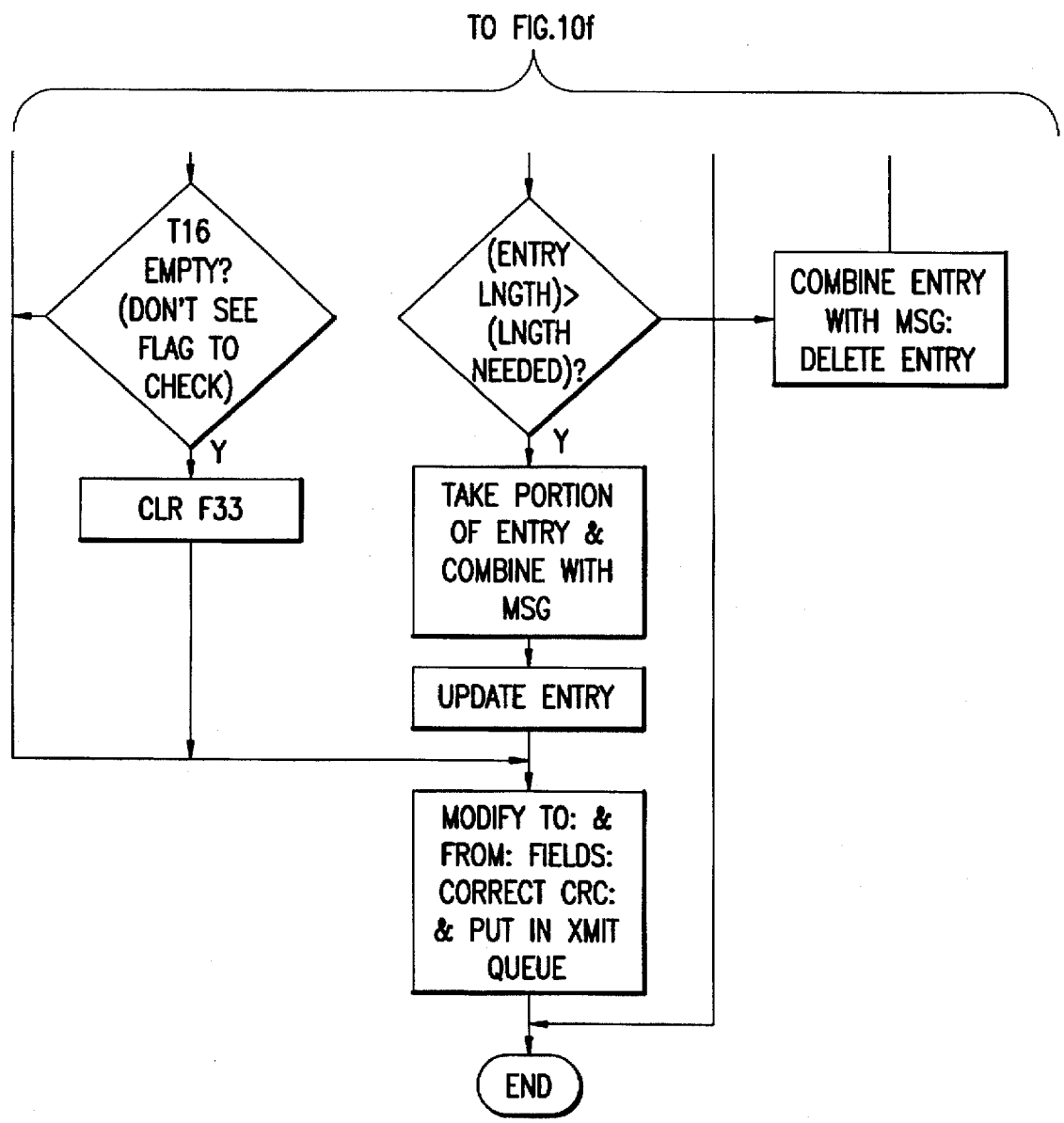

Code14 processing is shown in FIG. 10F. Most of the time when a code14 is received from an ip, it is already of optimum length so it will simply be forwarded to the next monitor. If it is shorter than the optimum length, this routine will attempt to lengthen it to the optimum length using residual code14 data from T16. If a resulting message of optimum length is not possible, then the code14 just received will be stored into T16.

If it is stored into T16, it may not be stored as it was received; instead it may be combined with another partial code14 which was already in t16. If a timeout occurs as dictated by p36, all data from t16 will be combined into a code14 and sent out even though it will be shorter than the optimum length.

Referring to FIGS. 11A-11G, flow diagrams are provided illustrating the monitor transmit arrangement. Monitor transmit has three different states: 1) state 0—uncommitted (not waiting on an acknowledge); 2) state 1—awaiting acknowledge (also known as retry); and 3) state 4—broadcast mode (awaiting acknowledges from multiple sources).

State 0 is shown in FIG. 11A. While in this state, the monitor can initiate a session by sending a message (xmit0talk) or it can close a session by sending a code2. Sending a code2 is the highest priority when state0 is entered; note that p2 is checked immediately upon entry. Also note that f9 and p1 must be checked first to avoid collisions with transmissions from other devices.

Figure 11B:
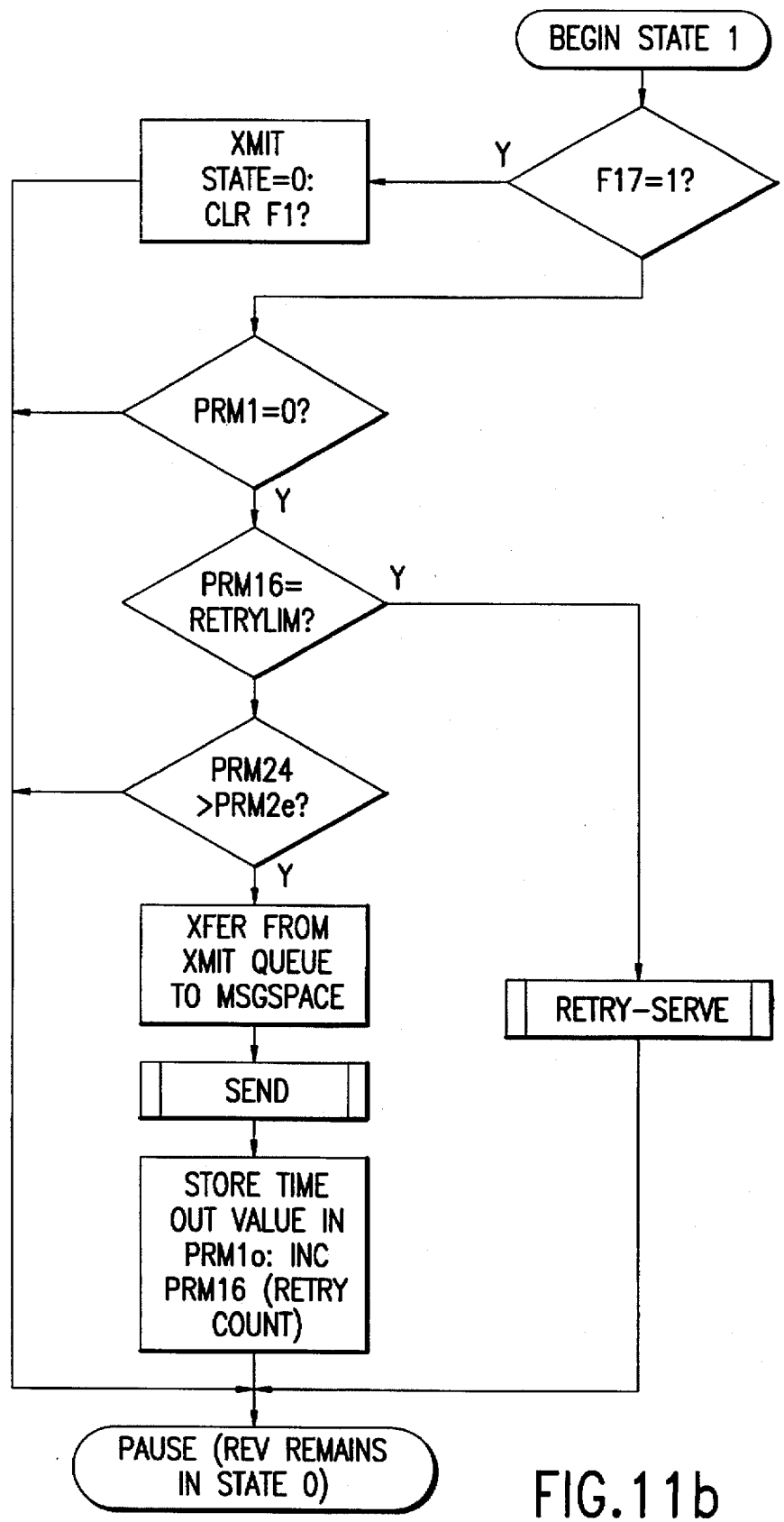
Figure 11C:
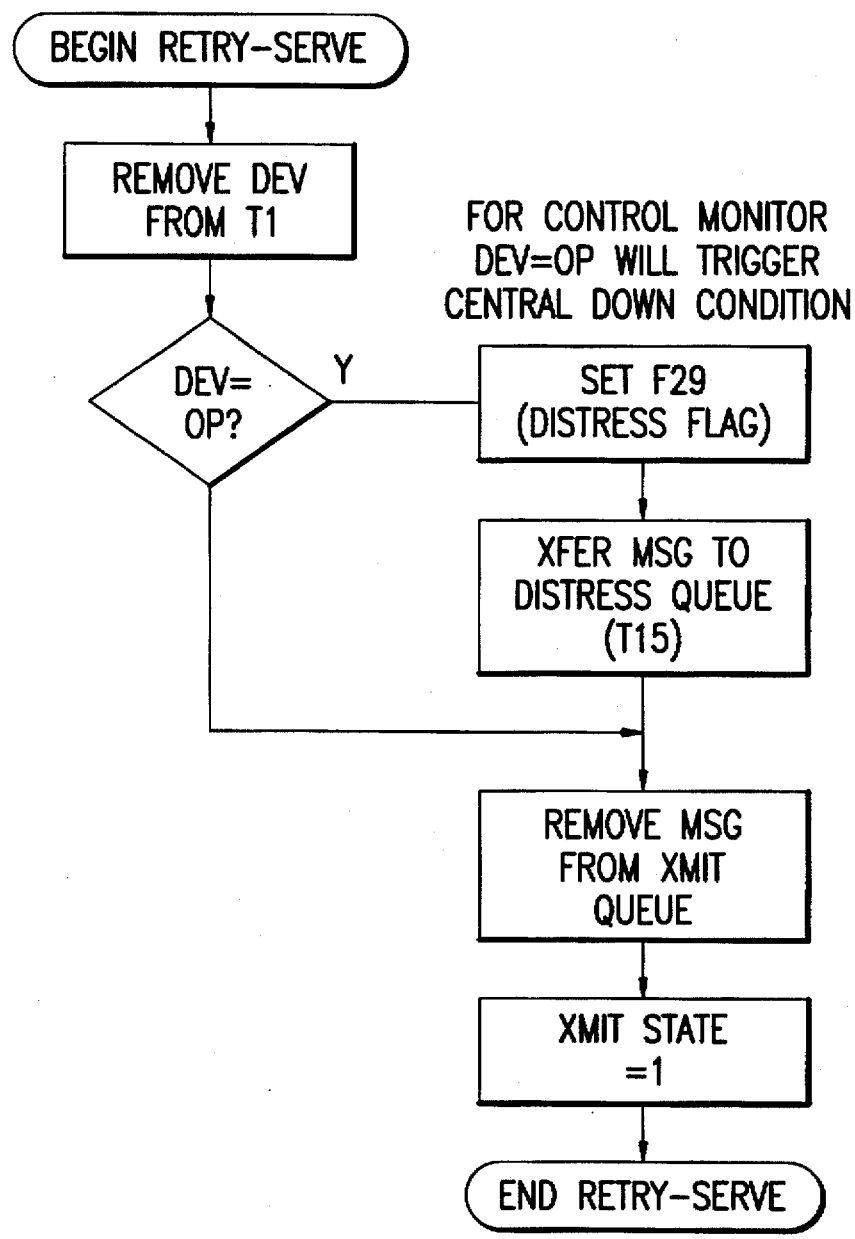
Figure 11D:
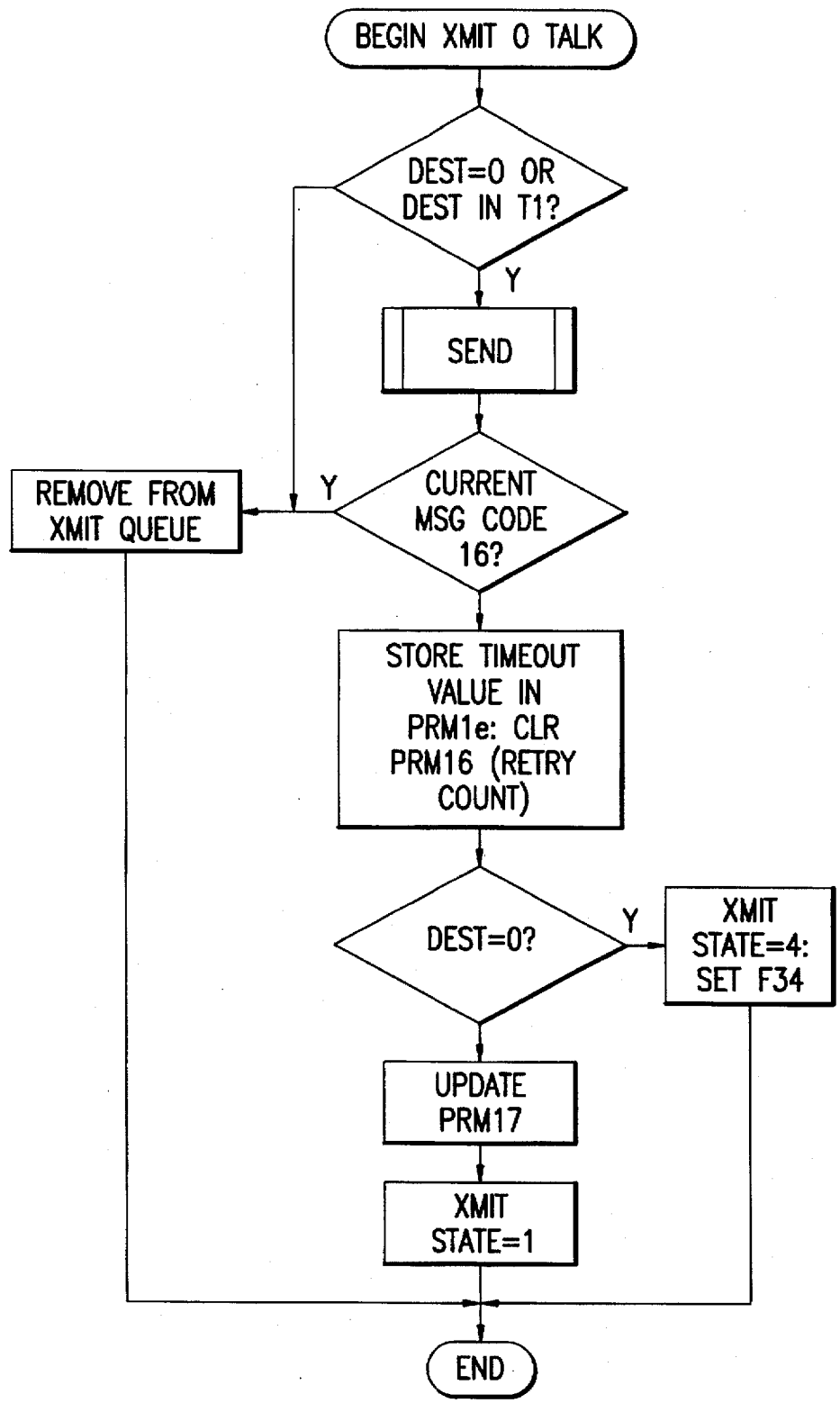
Figure 11E:
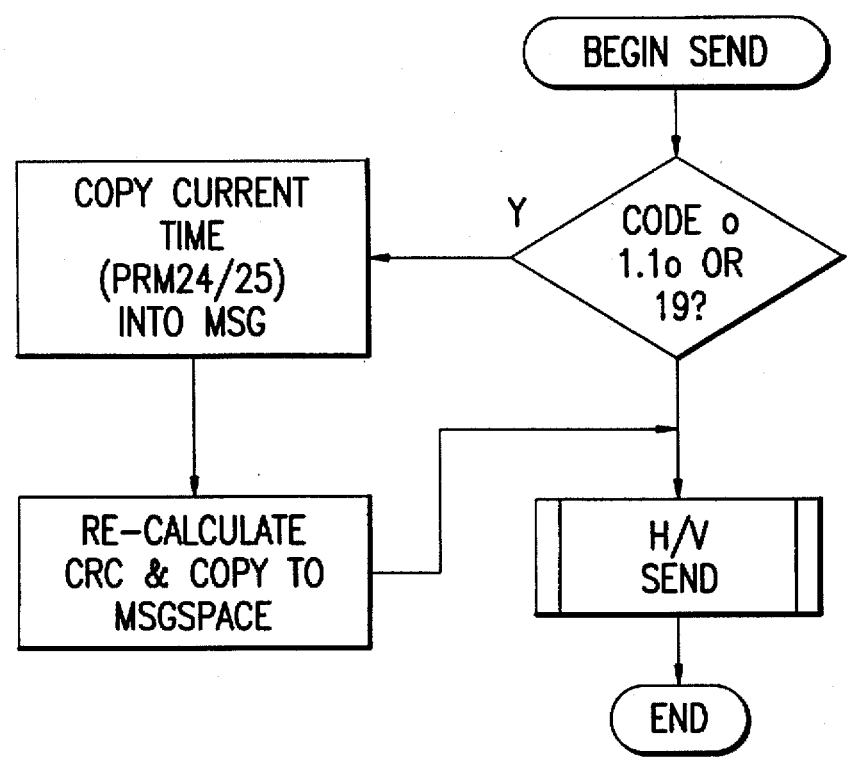
Figure 11F:
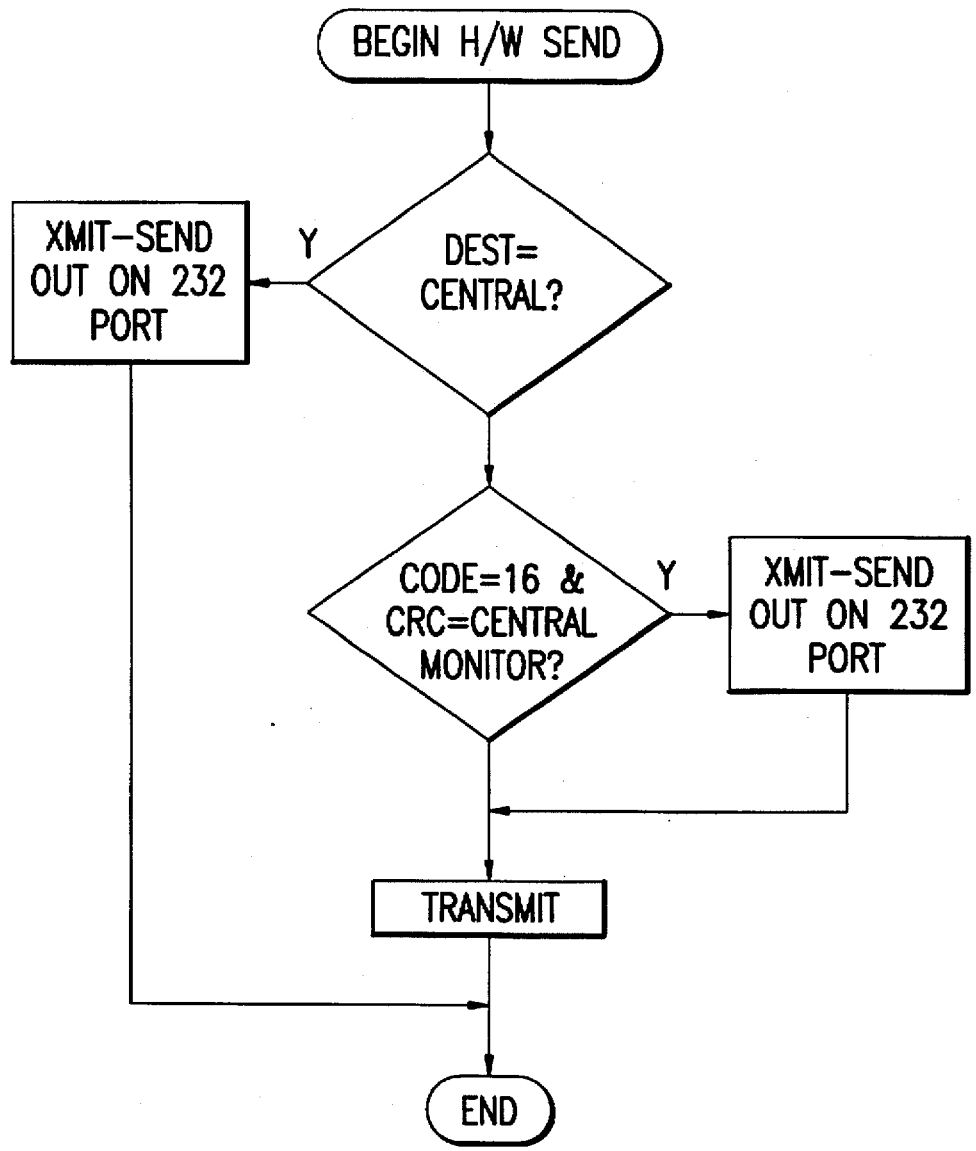

State 1 is shown in FIG. 11B. This state is entered from state 0 after an acknowledgeable message is sent out. Transmit will remain in this state as it waits for the destination device to acknowledge the message that was just sent to it. When a certain time elapses with no acknowledge occurring (p24>p2e), the message will be retransmitted. After the message has been retransmitted a certain number of times (retrylim), the monitor 15 will assume the communication path to that device to be unusable.

At this point, the retrymaxsrvc subroutine will be executed. First the ID of the destination monitor 15 will be removed from T1. If the destination ID equals the op ID, the state of main will be set to 1 (distress mode) and the message will be put into the distress queue. Finally, the message will be removed from the xmit queue and transmit will be returned to state 0.

If on the other hand, the destination device does send back an acknowledge, listen will remove the message from the transmit queue and set f17. As can be seen at the top of transmit state 1, this will cause transmit to change back to state 0.

Figure 11G:
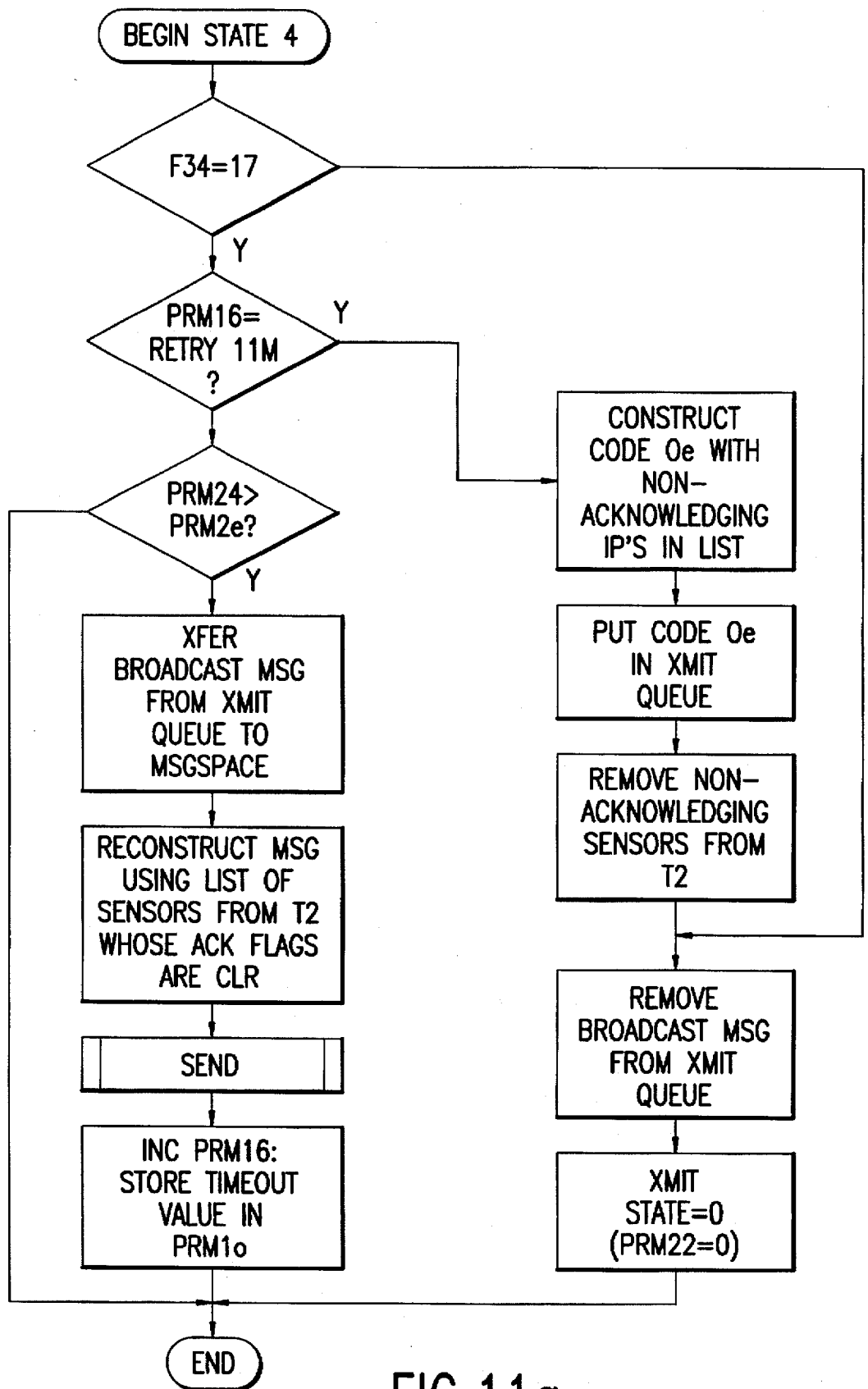

If while in transmit state 0, xmit0talk is entered and the destination device is 0 (meaning a broadcast message), transmit will go into state 4. State 4 is shown in FIG. 11G. Broadcast messages are handled differently when they are re-transmitted. An example of a broadcast message is code0 in FIG. 25. As can be seen, there is a list length and monitor ID list in the message.

When the first message is transmitted, the list length is zero. This lets all ip's know that they each must send back an acknowledge. If all ip's don't acknowledge, the monitor will reconstruct the message using a list length and a list of ID's who didn't acknowledge the first broadcast.

When this message is transmitted, only the monitors listed in the list will send back acknowledges. As is the case with state 1, state 4 will stop trying after a retry count maximum has been reached.

CENTRAL COMPUTER SOFTWARE ORGANIZATION

Figure 12A:
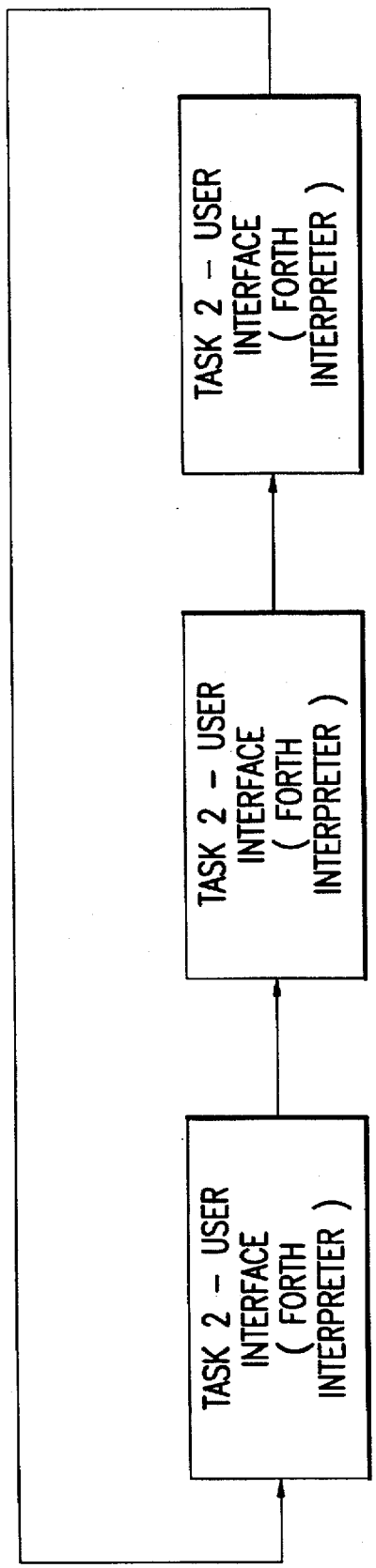
FIGS. 12A–12C are flow diagrams illustrating the software organization of the central computer.
Figure 12B:
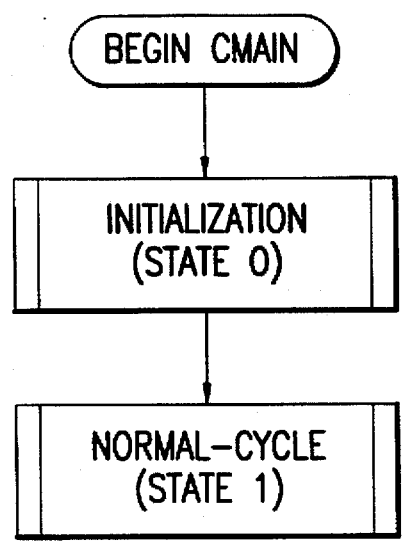
Figure 12C:
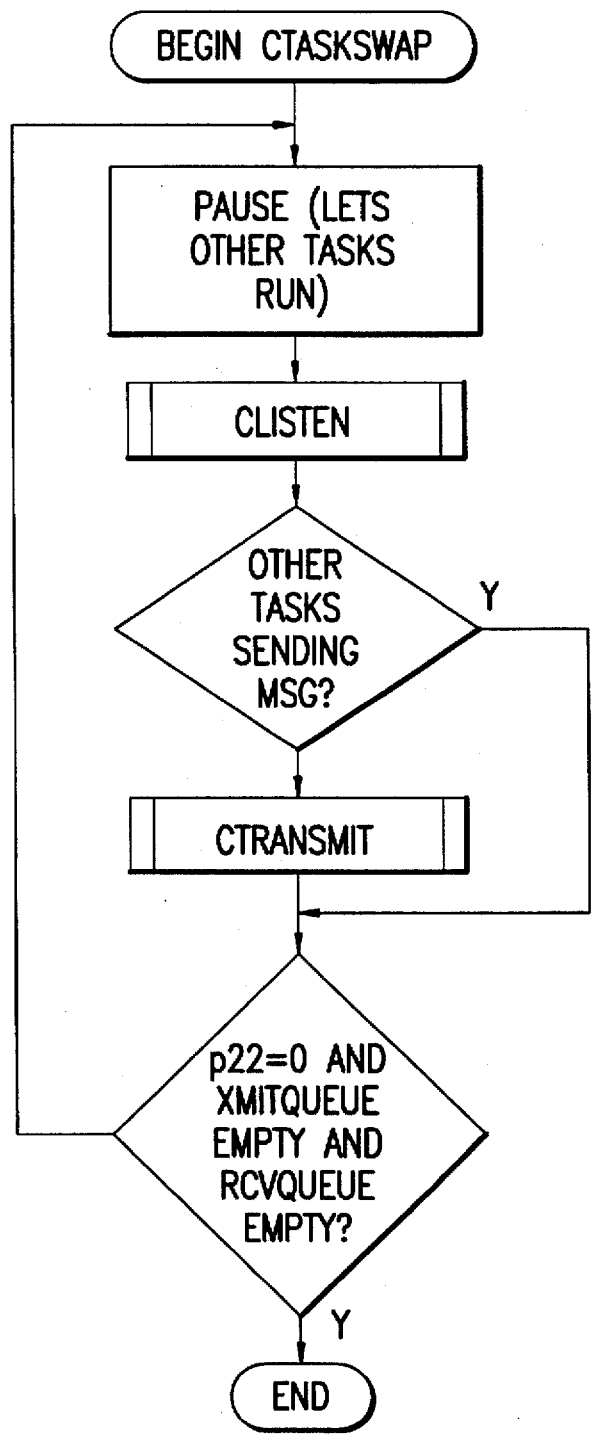

FIG. 12A shows the round-robin multi-tasking organization of the central software. Task1 (cmain) includes the higher level functions of the monitor software as mentioned in this document. The "c" in cmain and other central words is used to draw a distinction between similar central and monitor words. Task1 is shown broken down in FIG. 12-b. Task2 is the forth interpreter. Task3 monitors the rs232 port. Task3 puts tag related messages in the receive queue and displays others to the CRT.

Tasks 2 and 3 are not illustrated here because knowledge of them is not necessary for a system level understanding; documentation on these tasks can be made available however if needed.

Ctaskswap (FIG. 12C) is commonly used by many other routines so it is shown here for ease of reference. Unlike the taskswap used in the monitor software, ctaskswap actually performs task swapping. This occurs when the word "pause" is executed. The function of taskswap is to allow any messages in the receive or transmit queues to be processed until both those queues are empty and the transmit state (p22) is zero. The transmit state is zero when the monitor is not engaged in a communication session with the central monitor 15A.

CENTRAL COMPUTER NORMAL CYCLE (CMAIN STATE 1)

Figure 13A:
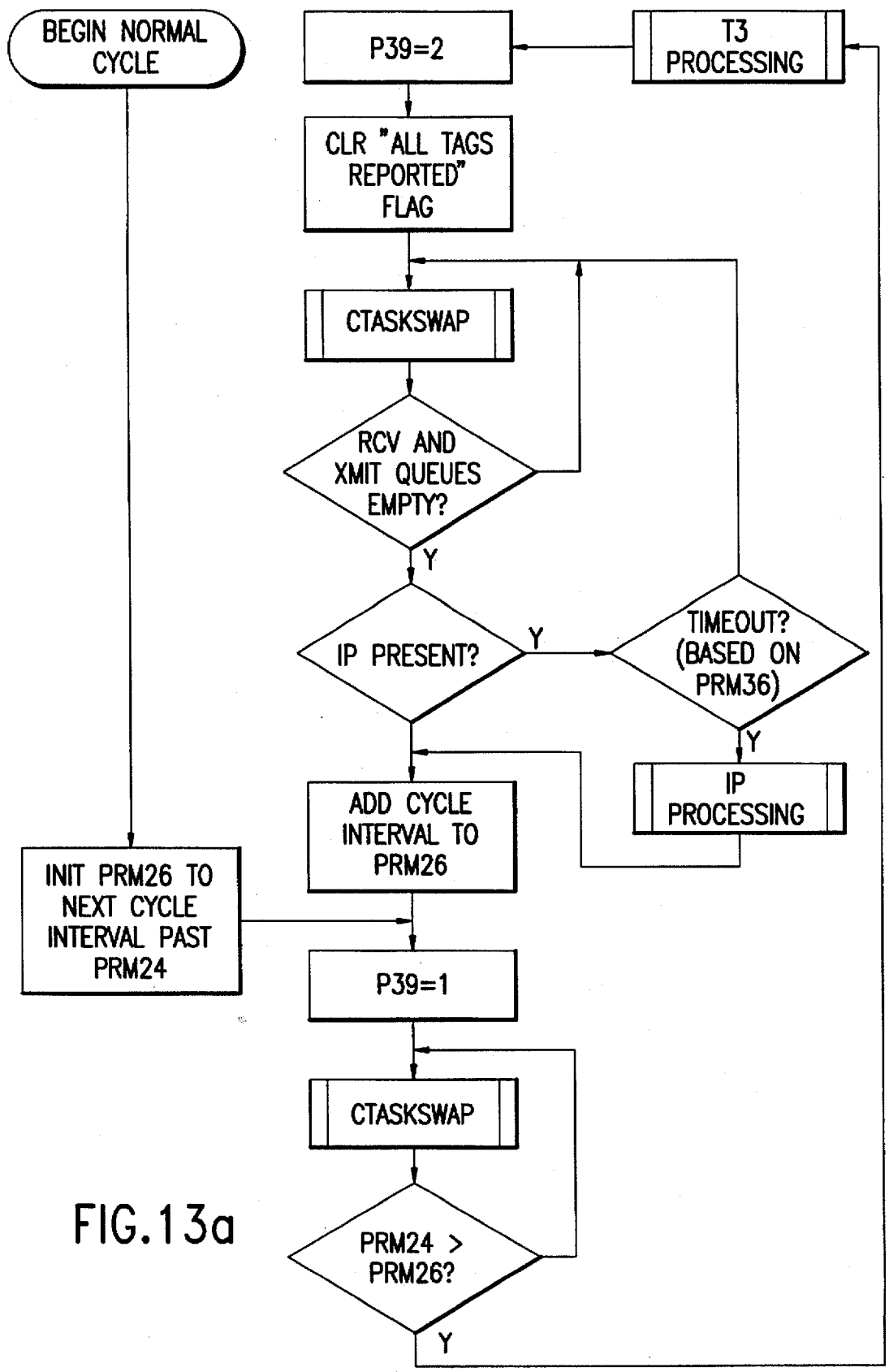
FIGS. 13A–13C illustrate the normal cycle mode of the central computer.
Figure 13B:
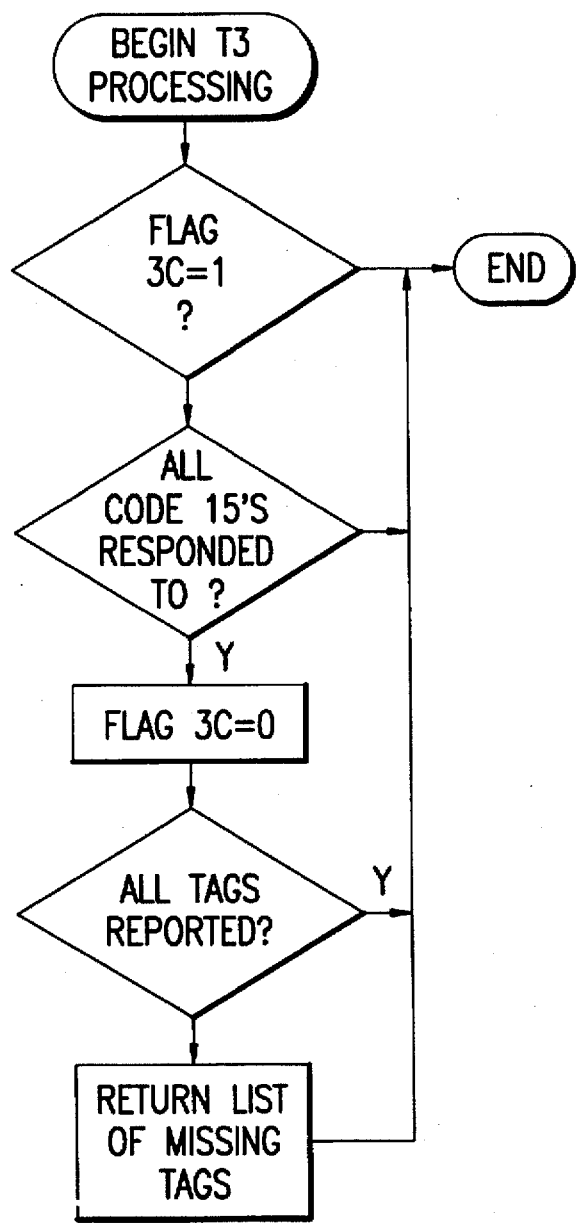
Figure 13C:
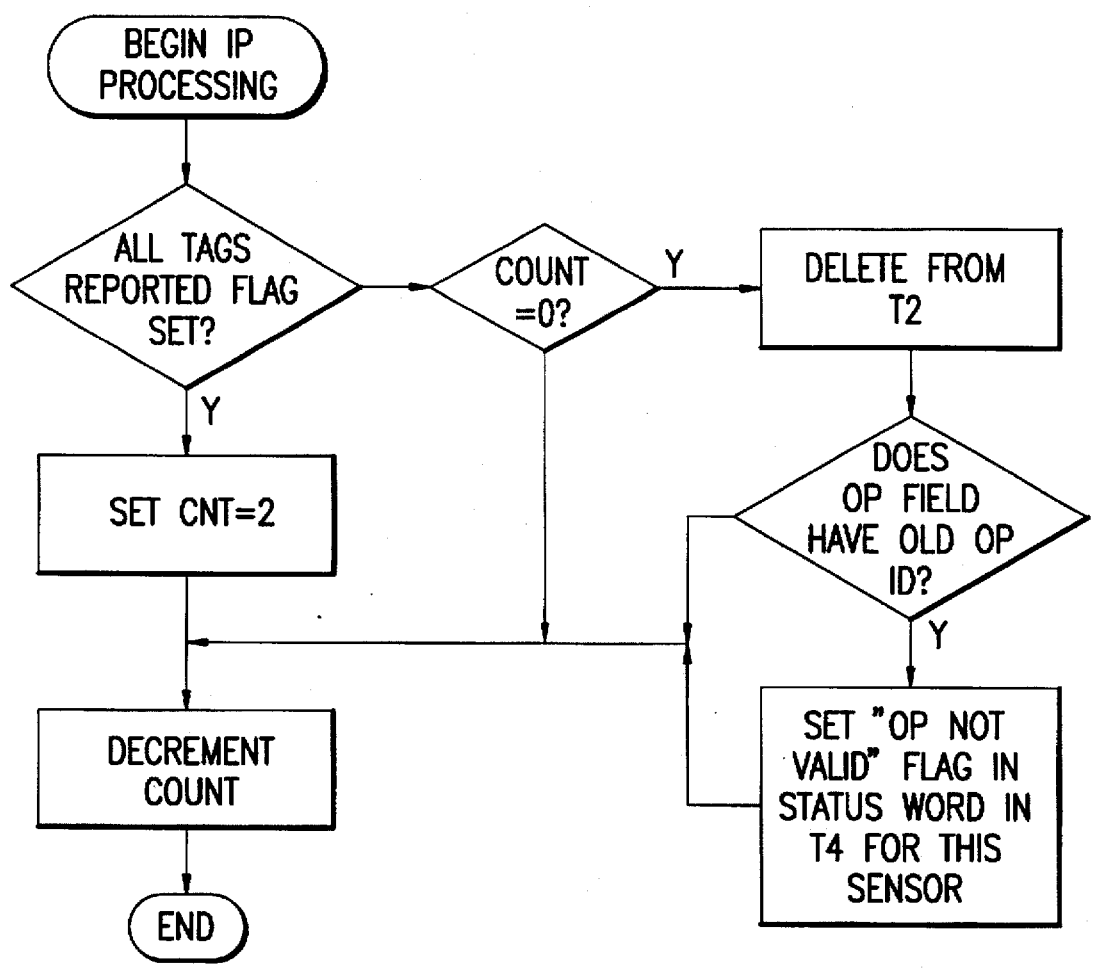

Referring to FIGS. 13A–13C, the basic operation of normal cycle in the central computer 17 is very similar to that of the monitors 15. That of the central computer 17 is not as complicated, since the central computer 17 only has one ip in the present embodiment and doesn't have an op to report to. The complexity of the central computer's software lies in the table 3 processing and the clisten software.

CENTRAL LISTEN

Figure 14:
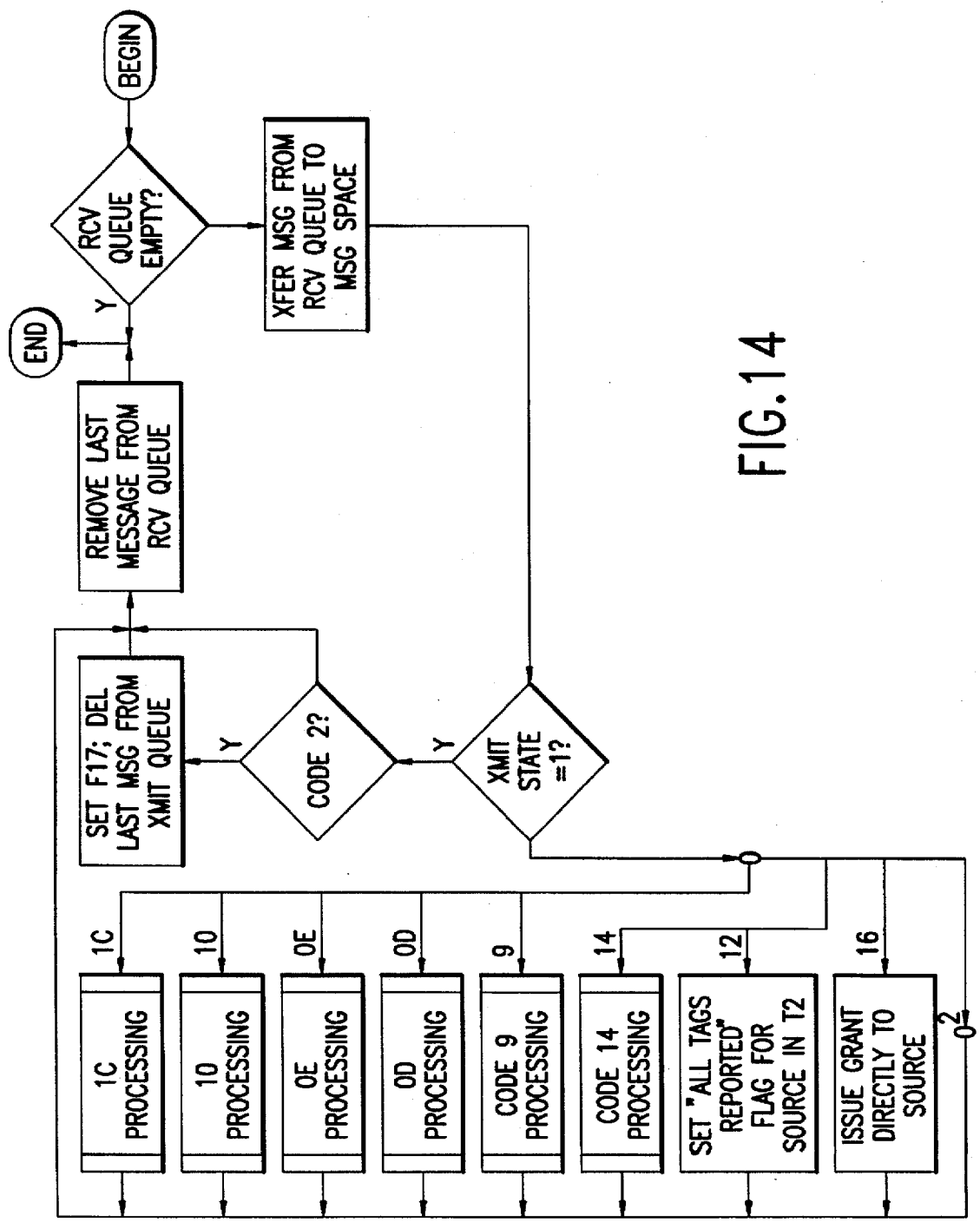
FIG. 14 illustrates the listen mode of the central computer.

The job of the central computer listen software is to direct execution to the code processing routine corresponding to the message received. Referring to FIG. 14, when entered, central listen will first check to see if anything is in the receive queue. If nothing is there, central listen will be exited. If the receive queue is not empty, the xmit state (p22) is checked. If it is 01 and the message retrieved from the receive queue is a code2, f17 is set and the code2 is removed from the receive queue. If p22 is 01 and the message is not a code2, it will be discarded.

If p22 is clear, the code number will be examined and execution of the corresponding subroutine will occur. Because processing for codes 12 and 16 is simple, they are shown in FIG. 14. The other code processing is shown in FIGS. 15A–15F.

CODE PROCESSING

Figure 15A:
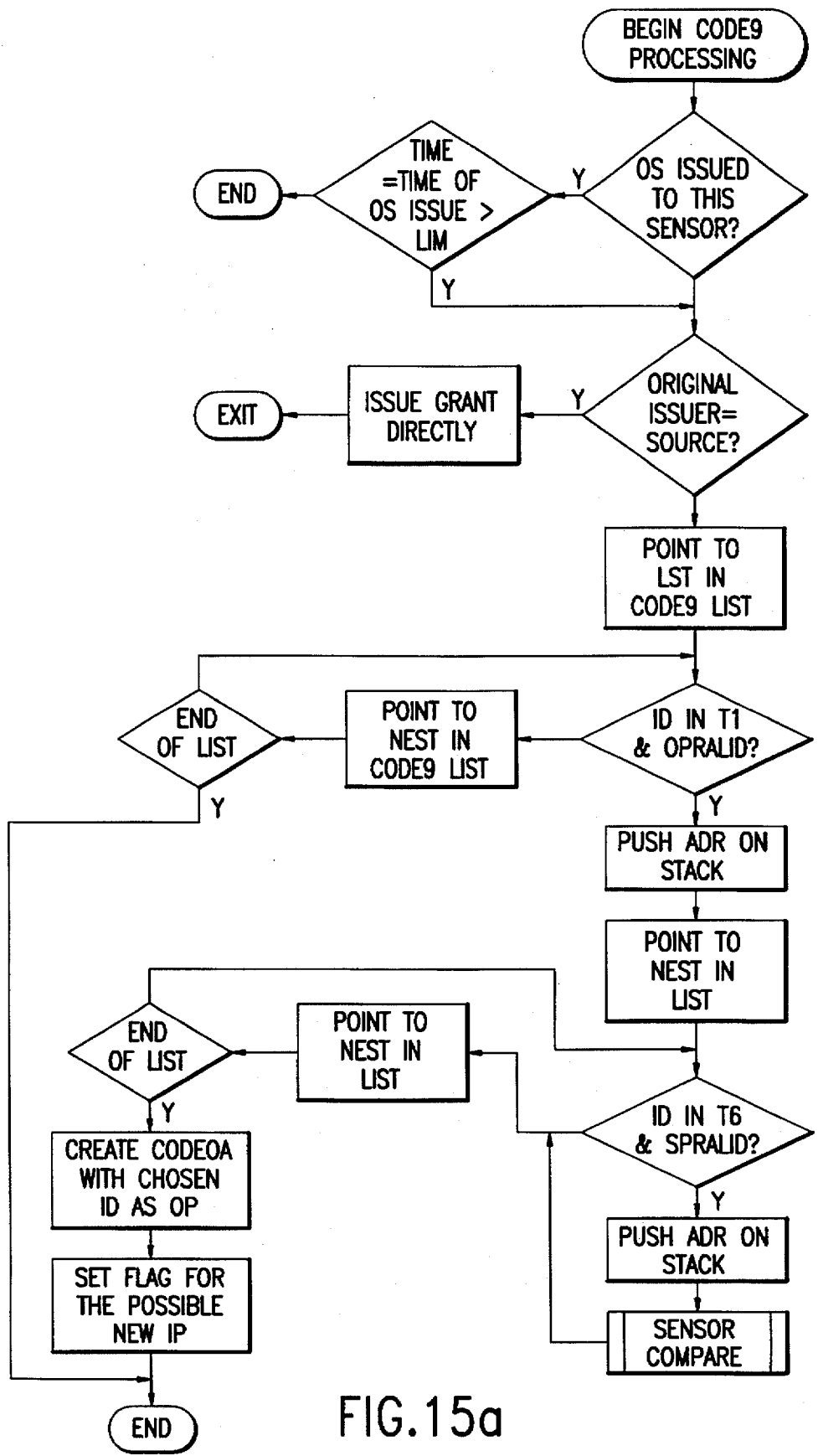
FIGS. 15A–15F illustrate the code processing arrangement of the central computer.

Referring to FIG. 15A, Code9 processing will first check to see if a code0a has been sent recently to this monitor. If one hasn't been sent recently, the message is checked to see if the distressed monitor 15 is the central monitor 15A. In such a case, a code0a will be issued immediately to central monitor 15A. Otherwise, the neighbor list in the code9 message will be examined to find out which one would be the best op for the monitor in distress. When an op candidate has been chosen, a code0a is constructed accordingly and then placed in the transmit queue.

Figure 15B:
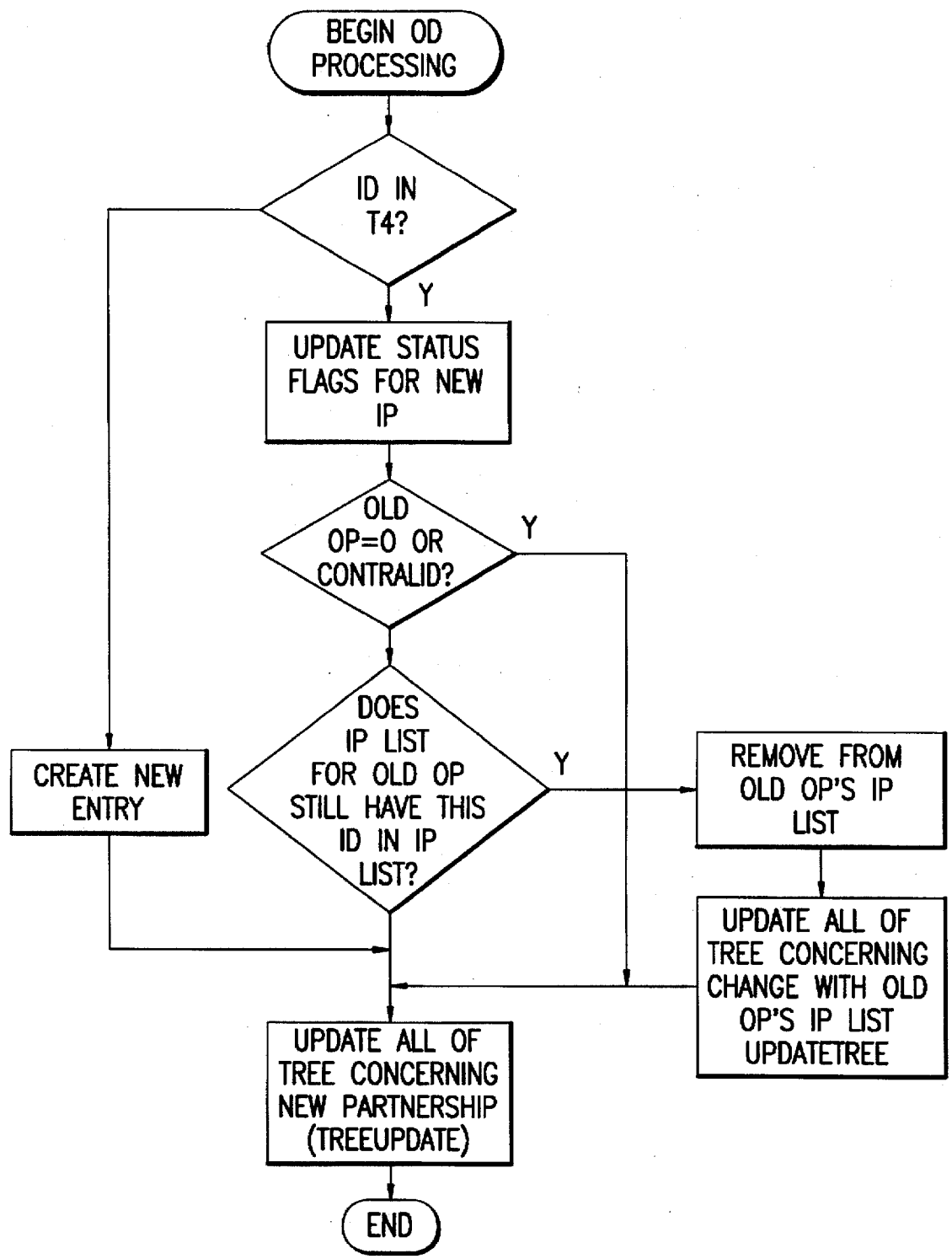
Figure 15C:
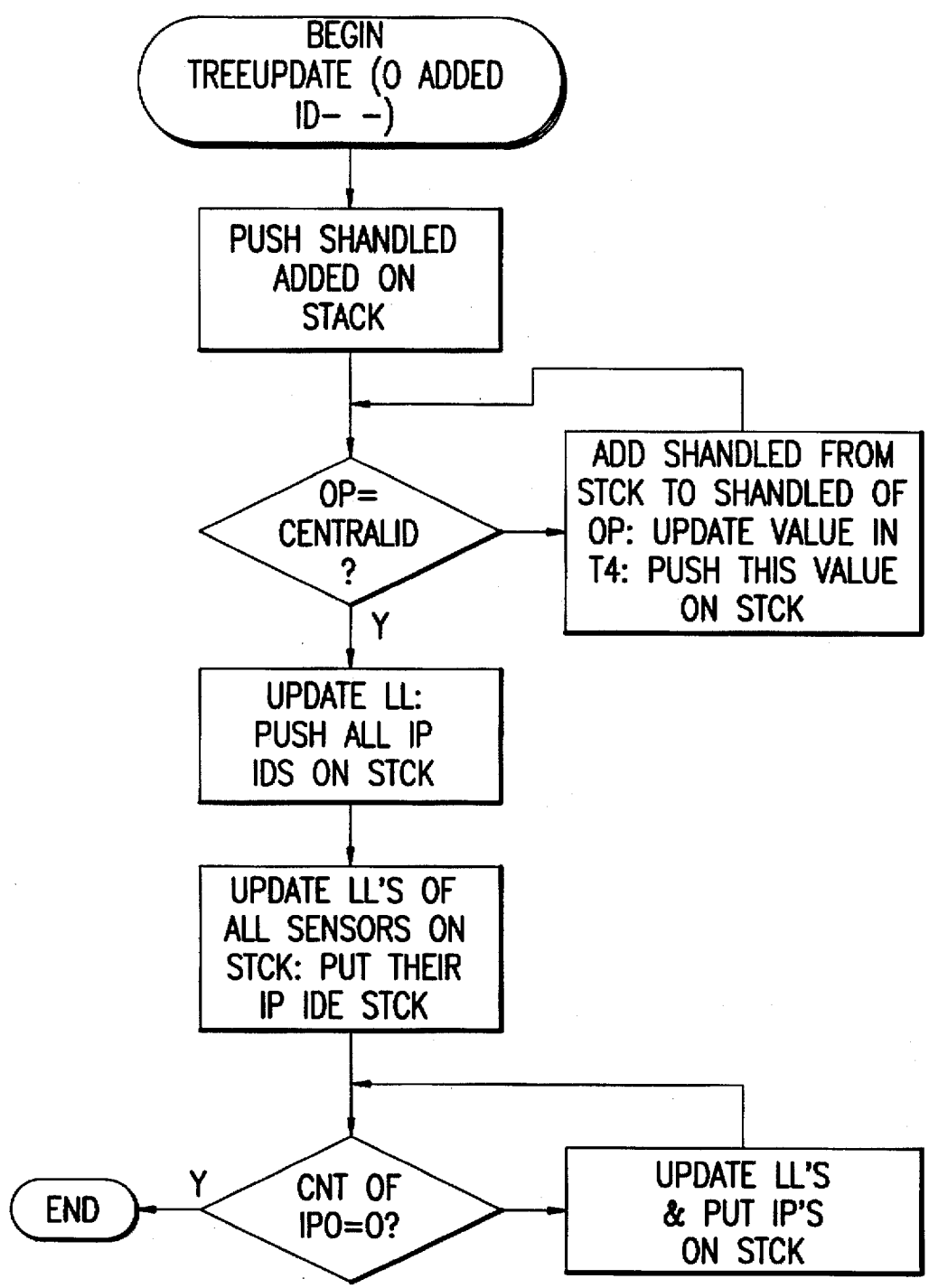

When the central computer 17 issues a code0a, a resulting code0d should occur. The processing for a code0d is shown in FIG. 15B. T4 is first searched to see if the monitorID has ever been placed there before. If it hasn't, a new entry is created. If the ID is already there, measures will be taken to disassociate that monitor from its old op. Last of all, the new partnership is recorded in T4. This is called a treeupdate and is shown in FIG. 15C. Treeupdate will update all #handled and load-level values affected by the new partnership. (Note: T4 is the actual tree structure.)

The #handled for a given monitor 15 is defined as the number of descendants of that monitor. The load level for a given monitor 15 is defined as the sum of the #handled for that monitor plus the #handled by its output partner. It is a measure of expected traffic congestion/delays, and the smaller its value, the more attractive this monitor becomes as a potential output partner for its neighbors.

Figure 15D:
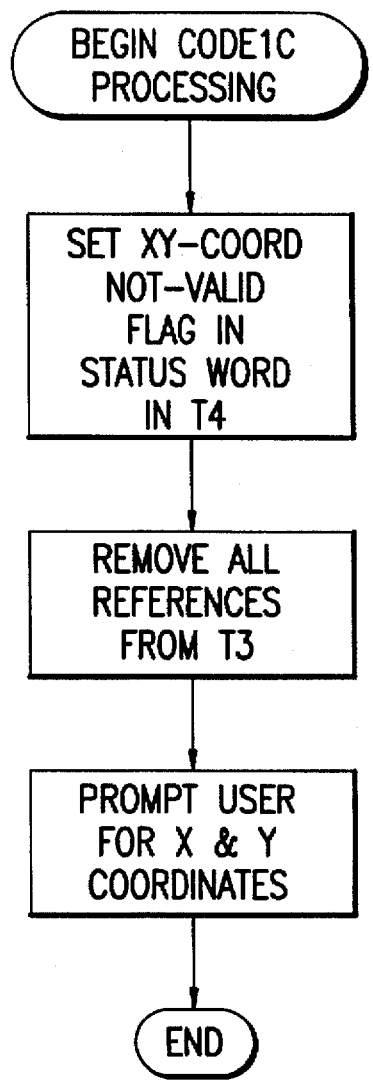

FIG. 15D shows the processing for a code1c. This routine will clear all tag references to this monitor from t3 (tag data base). Old location data will be invalidated as the user is prompted for new coordinates.

Figure 15E:
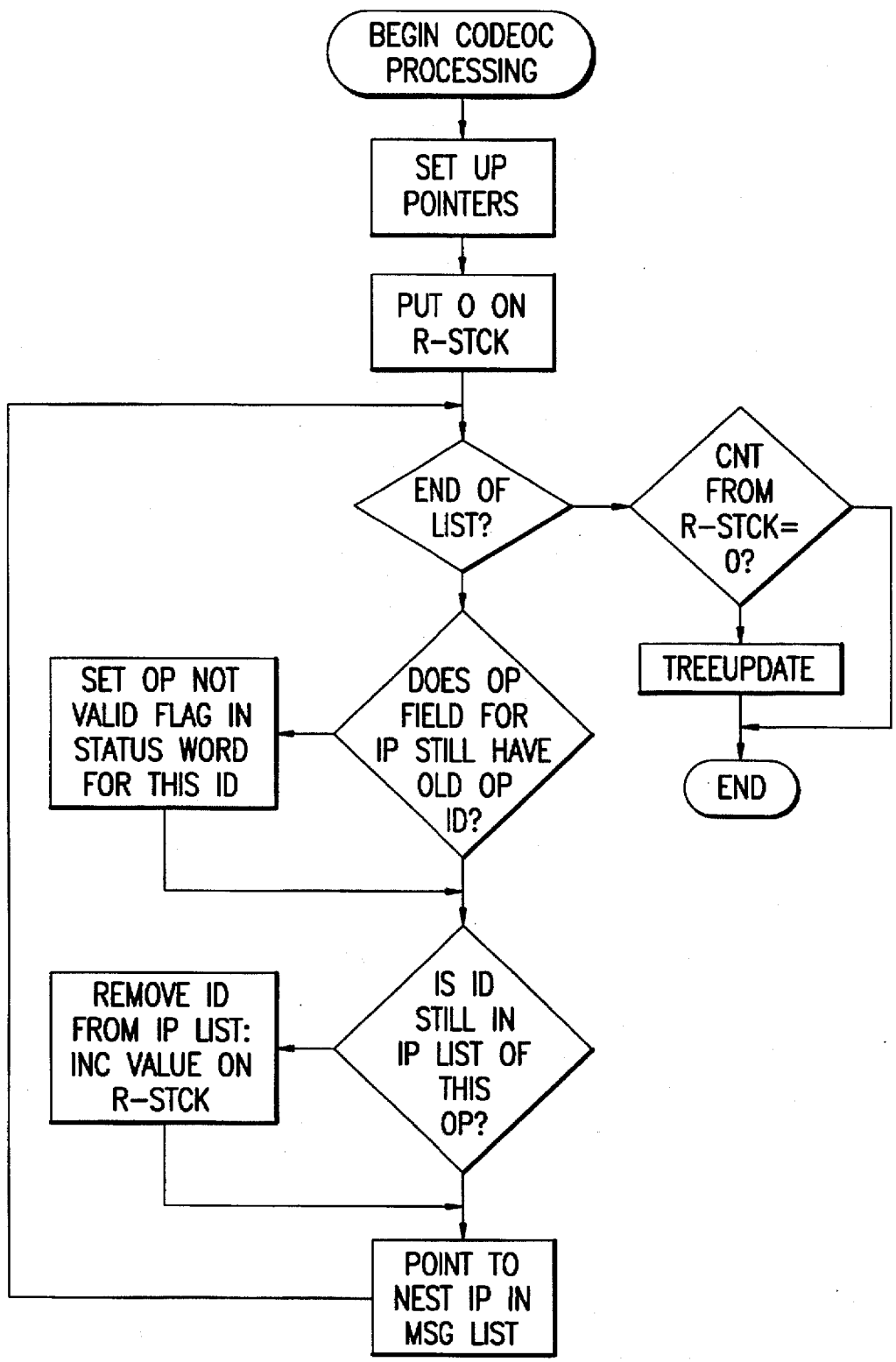

The code0e processing in FIG. 15E does the opposite of code0d processing; instead of a partnership being recorded into t4, one is removed.

Figure 15F:
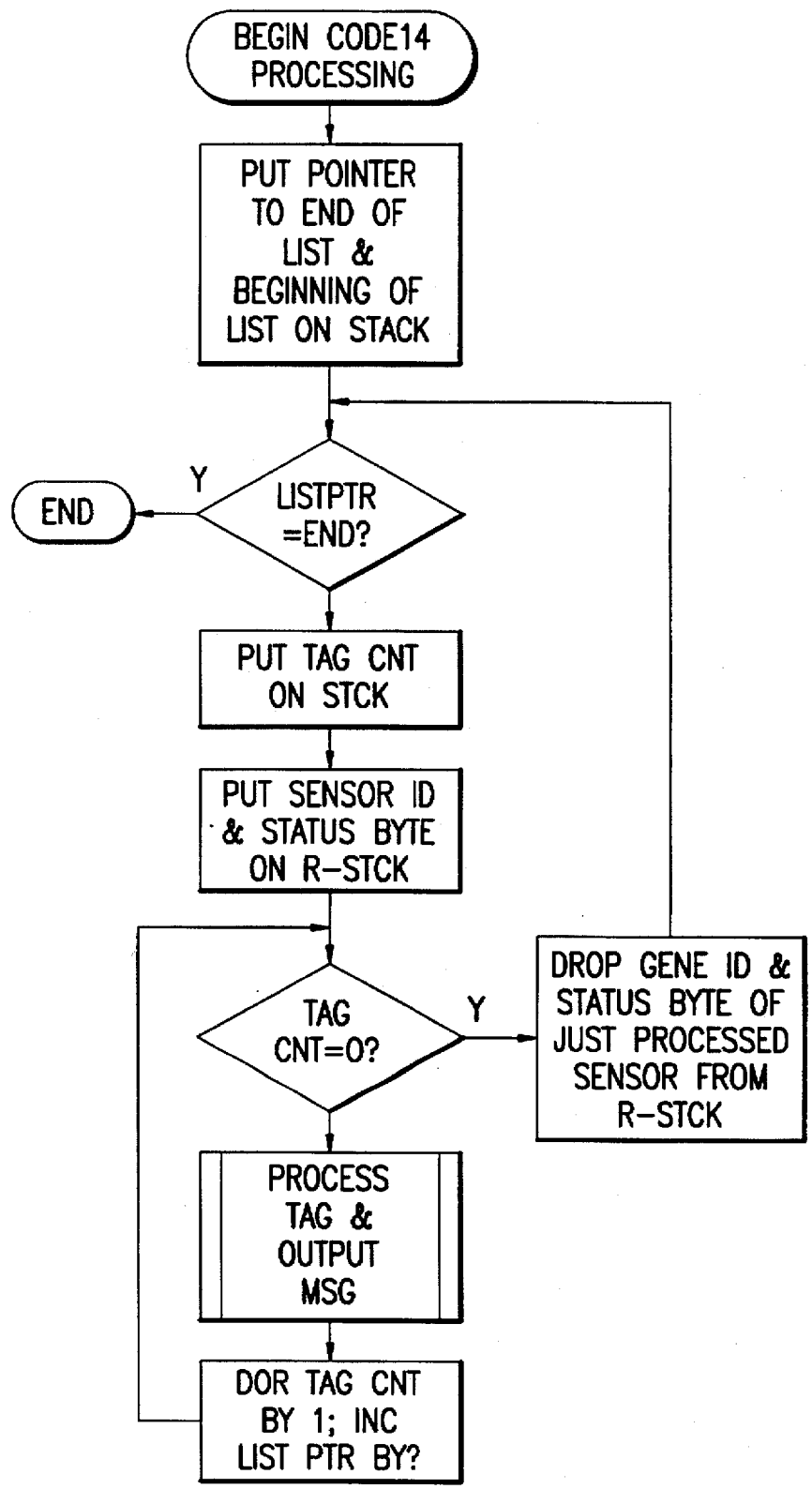

The function of code14 processing in FIG. 15F is to record tag data from the message into t3.

CENTRAL TRANSMIT

Figure 16A:
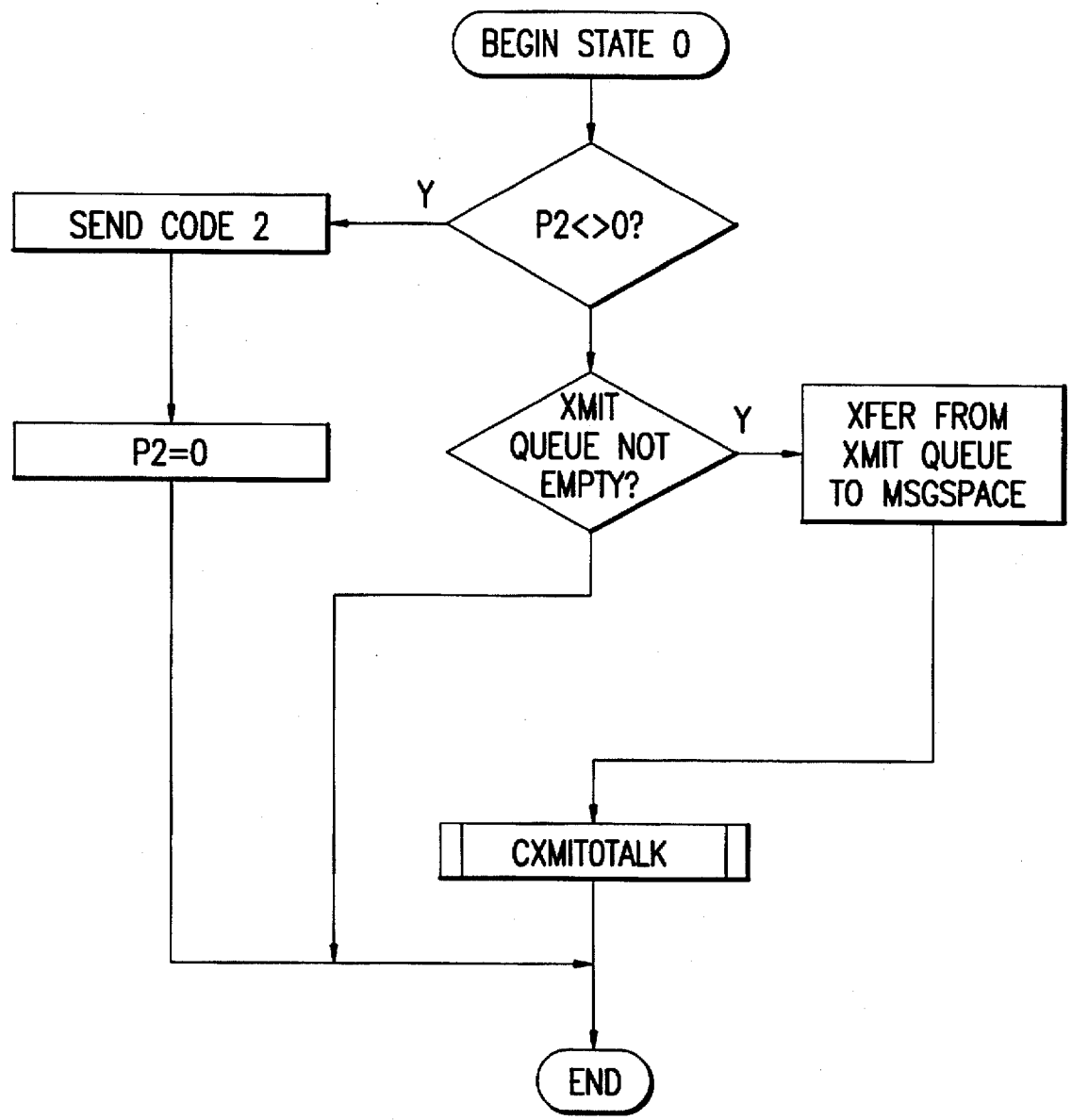
FIGS. 16A–16E illustrate the transmit mode of the central computer.
Figure 16B:
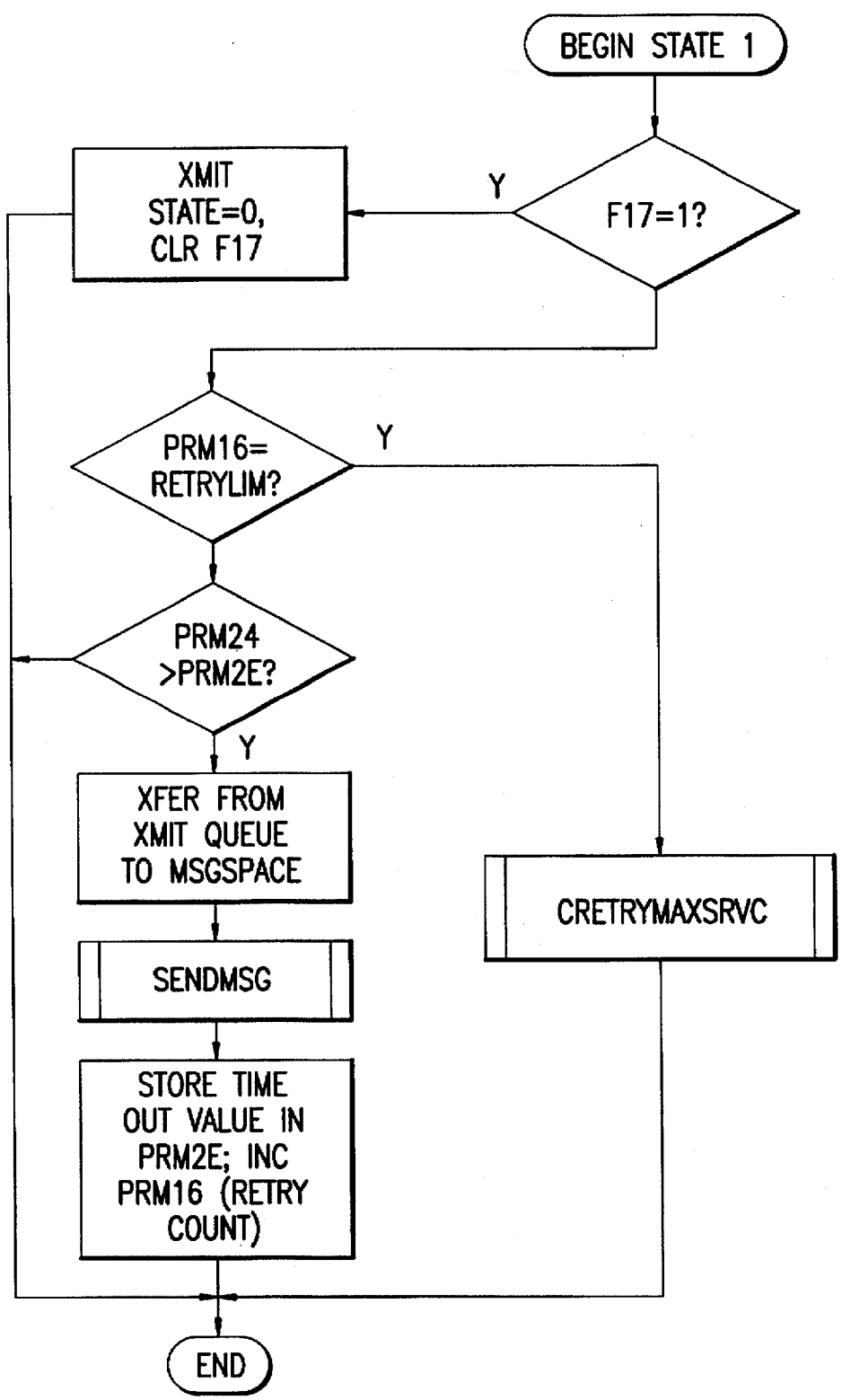

Central transmit is simpler than monitor transmit because all messages are of the single destination type. State 0 and state 1 (FIGS. 16A & 16 B) are still used although they are simpler. Because messages are sent via the rs232 and not over the airwaves, p1 and f9 are not used. If the transmit retry maximum is reached, the only explanation is an rs232 break.

Figure 16C:
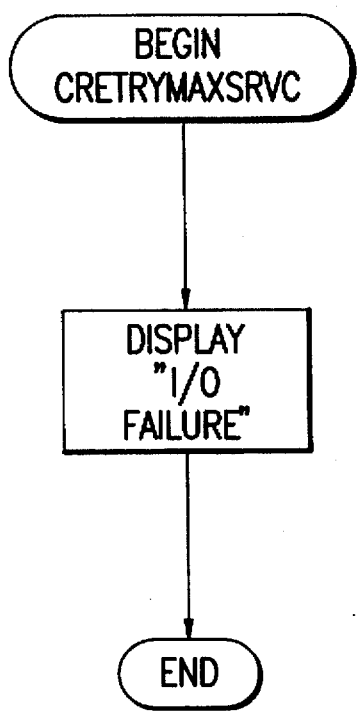
Figure 16D:
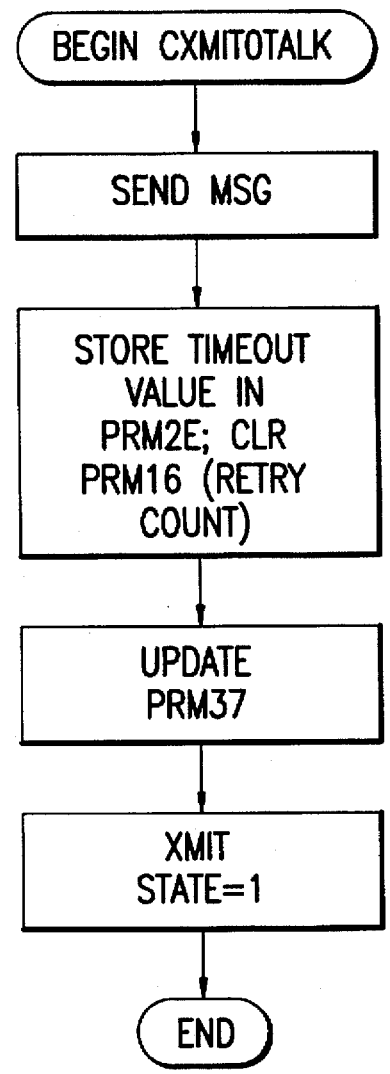
Figure 16E:
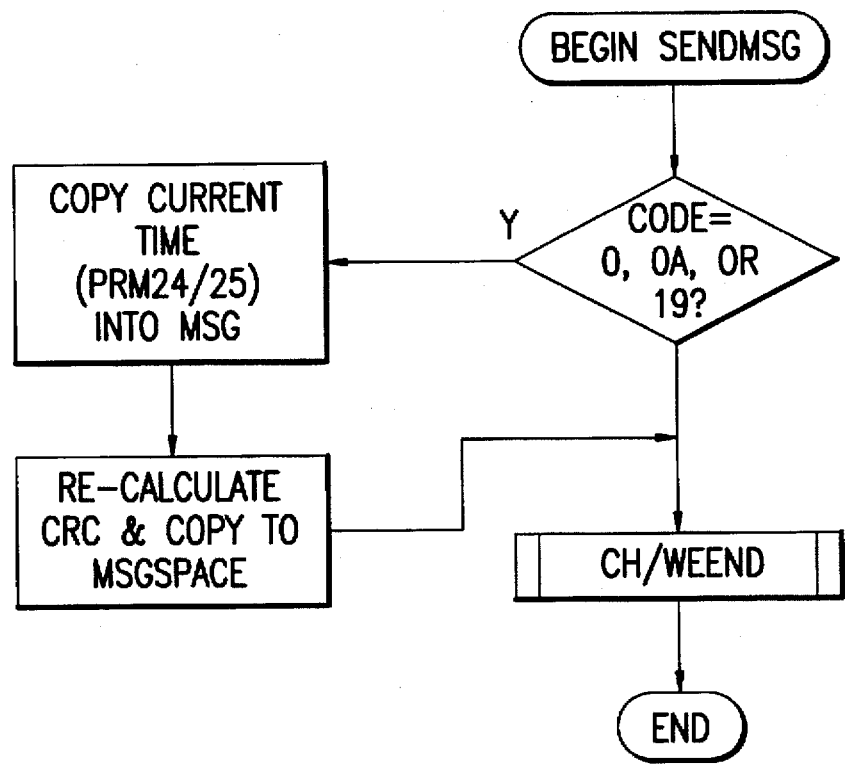

In such a case the user is informed of the condition as shown in FIG. 16C. In cxmit0talk (FIG. 16D), the message is sent and then all associated parameters are set. FIG. 16E shows sendmsg. This routine is very similar to the monitor version; depending on the code number, the current time may be inserted into the message just before it is sent out.

FIG. 17 illustrates Flags (parameters) and their meaning. Many of the flags and parameters listed in FIG. 17 are common to both central and the monitors. Some are used by one device but not the other. Flags are values which are either 0 or 1 while parameters can be any value from 0 to ffff(hex) if needed. Many parameters were skipped because the need for them disappeared during development.

FIG. 18 illustrates Message Code meaning. The messages in FIG. 18 have the same meaning for all devices. Some devices don't use certain messages. For instance, the central computer would never send out a code16 since it doesn't have a distress mode. FIG. 25 shows the actual format of these messages.

Notes on tables: The number of bytes used to store a parameter in a certain entry is not always indicative of the number of bytes required by that parameter. For instance, in T1 and T2, 2 bytes are used to store the monitor ID's even though monitor ID's are only one byte in length. Offsets listed in tables are in hexadecimal notation.

FIG. 19 illustrates T1 which is the neighbor list and is used by the monitors 15. All numbers appear in hex. The purpose of T1 is to allow a monitor 15 to keep track of which monitors 15 are in its vicinity. When a monitor 15 goes into distress mode, the monitor Id's along with their signal strengths are copied from this table into the code9 message. A monitor ID from this table which has its code9 inhibit flag clear will be chosen as the destination of the code9 message.

Another way T1 is used is to prevent messages from being sent out to destinations which don't exist; this prevents wasted air time. Before a message is sent, T1 is searched for the destination ID. If the ID is not found, the message is not sent and is deleted from the transmit queue.

FIG. 20 illustrates T2, which is the input partner list. Its function is to help a given monitor to keep track of its ip's. Using this table, a monitor 15 knows when to issue a code0e and it knows when to re-transmit a broadcast message.

FIG. 21 illustrates T3 which is the tag table. The information in the code 14's is based on this data. If flag7 has been set, data for all tags with their signal strengths are sent out in code 14's. If flag7 is clear, only data for entries that have their new flags set will be included in the code 14's.

FIG. 22 illustrates Monitor T4 which contains the "residual" code14 data mentioned previously. There are three of these elements in T4. When a partial code14 is received from an ip, the monitor will attempt to build a code14 of optimum length from the newly received partial code14 and one from this table. If one of optimum length cannot be built, the newly received code14 will be stored in one of these entries.

FIG. 23 illustrates Central T3 which is the actual tag location data maintained by the central computer 17. Up to three monitor ID's are stored for each tag 13 since that is the amount needed for triangulation. For many applications triangulation is not necessary and only the most recently reporting monitor ID is relevant.

FIG. 24 illustrates Central T4 which, in the central computer software, makes up the monitor tree structure discussed with particular reference to FIGS. 2A-2C. When the central computer 17 receives a code9, it uses this structure to determine which ID listed in the message would be the best op for the monitor 15 which is in distress mode. Table 4 is also used to store a monitor's physical location.

TAG CIRCUIT

As noted above, each of the tags 13 periodically sends out a radio signal 21 containing as a minimum the tag's unique identification code. According to one embodiment of the present invention, the radio signal 21 comprises a message containing a leader to allow the receiving monitor's AGC to adjust, plus a code identifying the radio signal 21 as a tag identification signal, plus a 48 bit identification code unique to the tag, plus an 8 bit cyclical redundancy check (CRC) code which can be used by the receiving circuitry of the monitor to verify the transmission of the radio signal is error free.

This embodiment, for example, uses Manchester encoding of the serial baseband data, which is then amplitude modulated onto a 303.825 Megahertz carrier and radiated via a one inch diameter circular loop antenna at the maximum power level permitted under Federal Communications Commission regulations for Part 15 (Unlicensed) transmission.

The loop antenna when lying in its normal horizontal plane radiates approximately equal power in all horizontal directions, which is a desired characteristic. This particular embodiment of the tag transmits approximately once per 5 minutes or so, and the transmission time is approximately 90 milliseconds. The approximate 5 minute period is preferred to provide adequately current information to the central computer, yet rare enough to minimize the likelihood transmissions from two tags will "collide" even if thousands of tags are simultaneously in the same general location.

The approximate 5 minute period also helps to increase battery life since battery current is much higher during transmission. The 90 millisecond transmission time consists of 88 bits sent at approximately one (1) per millisecond. This short transmission time is also important for minimizing collisions and increasing battery life.

Figure 26B:
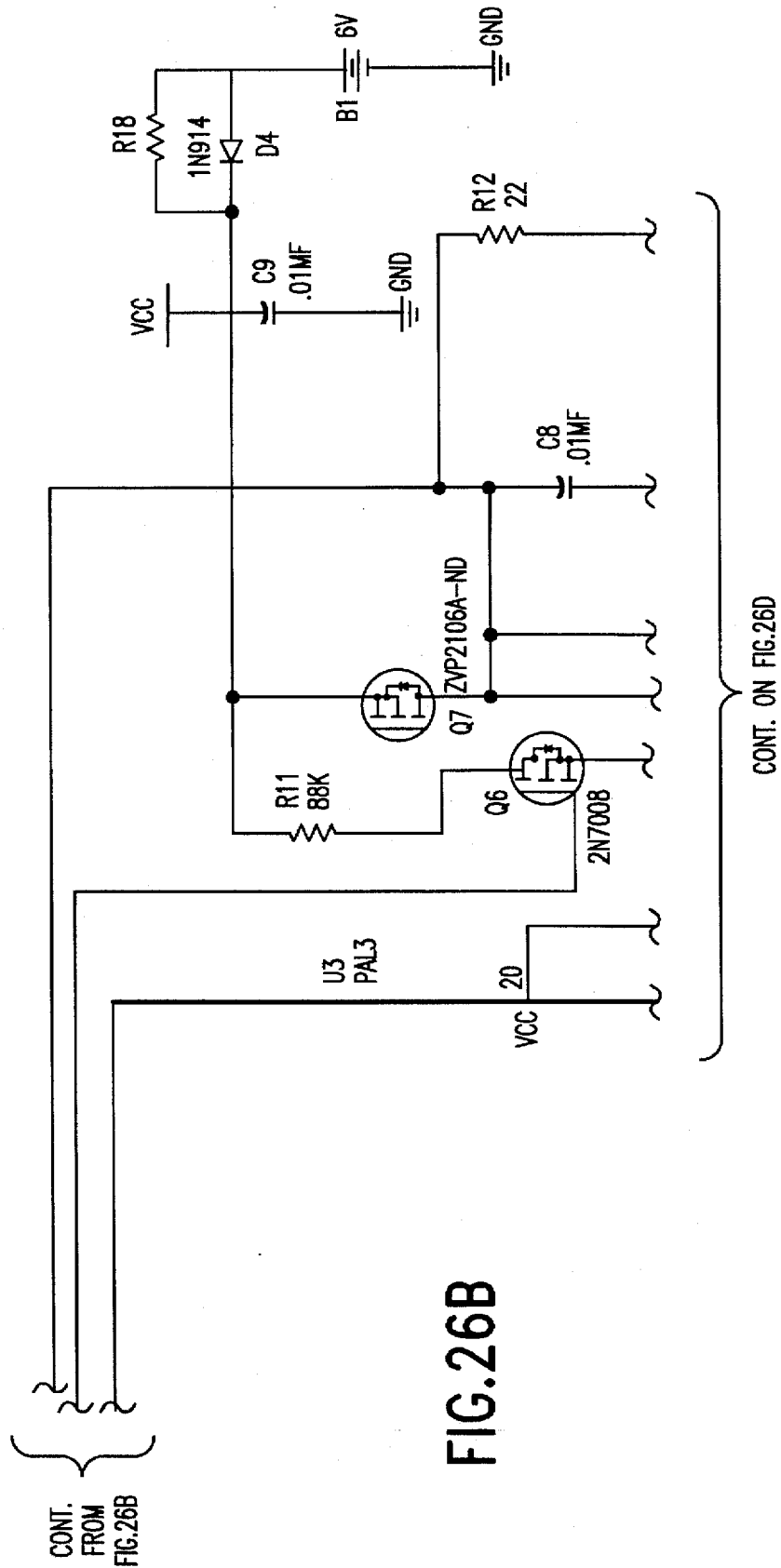
FIG. 26 is a circuit diagram illustrating the circuitry of the RF tag according to one embodiment of the present invention.
Figure 26C:
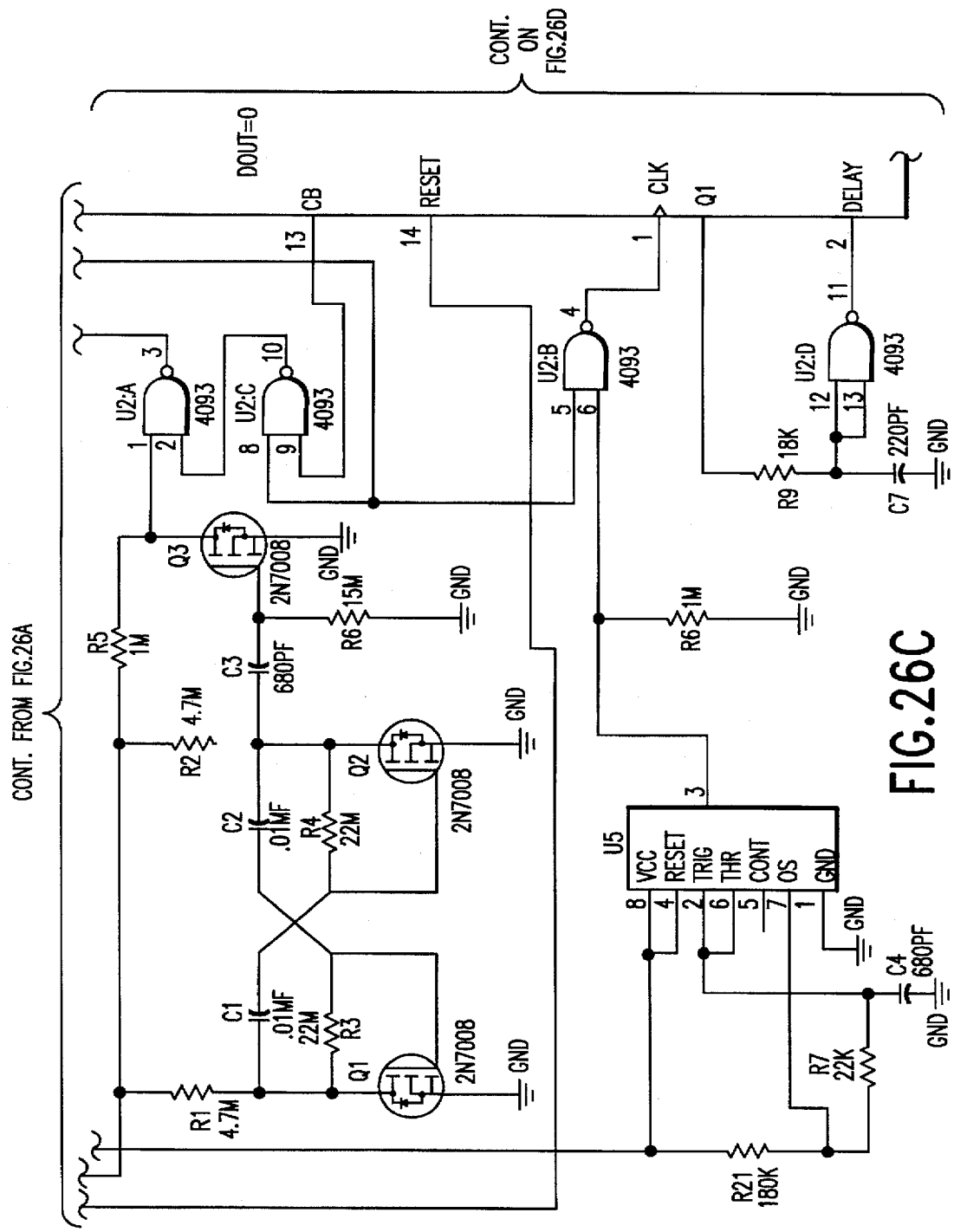
Figure 26D:
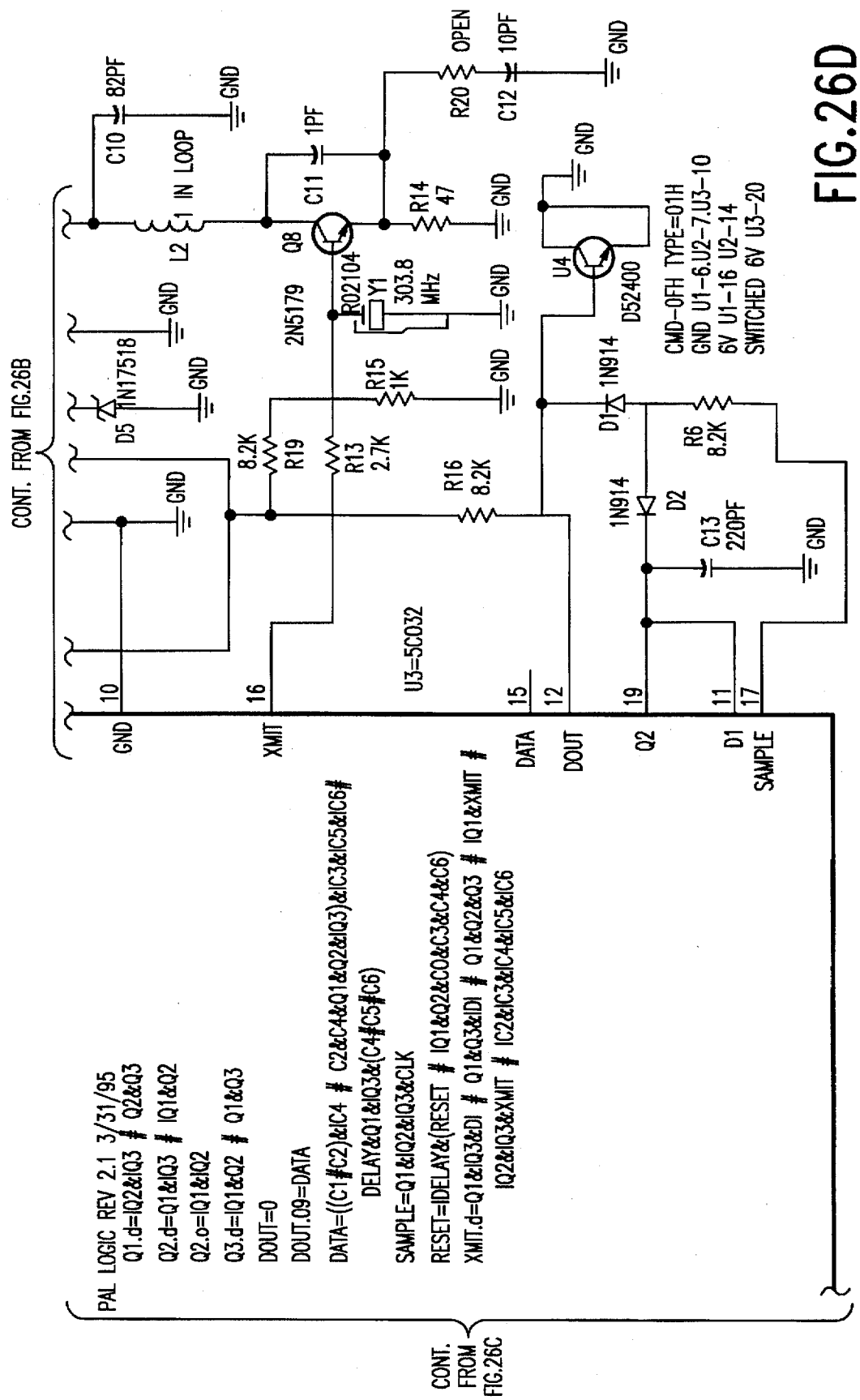

Referring to FIG. 26, a tag schematic diagram for interconnection and identification of the components is provided. Resistors R1 through R4, plus capacitors C1 and C2, plus CMOS N channel enhanced mode transistors Q1 and Q2 comprise a more or less conventional astable multivibrator, except that the use of CMOS transistors and the use of extremely high resistor values enables the circuit to draw extremely small current from the battery (the key to its long life) and yet be able to oscillate very slowly with physically tiny components. This astable multivibrator is self-starting, and runs continuously, providing a rounded square wave signal of approximately 0.3 second period into capacitor C3.

Capacitor C3, resistors R5 and R6, and CMOS N channel enhanced mode transistor Q3 perform the function of converting the moderate amplitude rounded square wave into a square 0 to VCC volt pulse into pin 1 of U2. U2 contains a schmidt trigger capable of performing this squaring operation itself, but U2 draws unacceptably high power supply current when any of its input signals have voltages that are neither high nor low. Q3 performs this squaring operation without using excessive energy.

R6 is made large enough to prevent overloading the multivibrator. R5 is made large enough to minimize current drain on the battery. C3 is made large enough to give a full voltage signal into U2, yet small enough to prevent R5 and U2 from staying in their high current states for much time. The net result of this arrangement of components is that U2 pin 1 is provided with a signal which is normally high but momentarily switches low approximately every 0.3 seconds.

U1 is a digital counter integrated circuit. Its count advances on each negative-going edge of the clock signal on pin 10. The counter is used to count data bits during transmission, and while not transmitting it counts the number of pulses generated by the multivibrator. In the embodiment illustrated in FIG. 2, the counter is binary. The entire counter is cleared to zero by the RESET signal at the end of each transmission cycle.

After approximately 5 minutes, bit Q11, which is U1 pin 15, goes high and remains high until the end of the transmission cycle, which clears the counter. U1 pin 15 enables the transmission cycle. Just after U1 pin 15 goes high, bits Q1 through Q10 are all zero due to the nature of a binary counter. Consequently, the low order bits of the counter start at zero count and can be used for keeping count of how many bits have been transmitted.

When not transmitting, U1 pin 15 is low, which forces NAND gate U2:C to output a high signal on pin 10, which in turn causes NAND gate U2:A to output a positive pulse to the clock input of counter U1 each time U2:A receives a negative pulse. Each such pulse advances the count by one.

To conserve battery life, during the interval between transmissions, none of the circuitry except the components involved with timing the 5 minute delay receive electrical power. Power is shut off from the other circuitry by CMOS P channel enhanced mode transistor Q7, which is driven off by resistor R11 because CMOS N channel enhanced mode transistor Q6 is held off by U1 pin 15 being low.

As explained above, the transmission cycle begins when U1 pin 15 goes high. That signal turns on Q6, which turns on Q7, which then connects VCC (6 volt battery voltage) to Programmable Array Logic (PAL) device U3, timing oscillator U5, transmitter transistor Q8, and other circuitry associated with transmission. Diode D4 combined with R18 drops enough voltage to let the PAL operate within the 4.75 to 5.25 volt supply range it is designed to operate on, regardless of whether the battery is new or approaching the end of its useful life.

The method does not afford very precision regulation, but is cheap, small, and most importantly, achieves its regulation without bypassing any current to ground. Diode D4 prevents VCC from being held low by the large inrush of current momentarily drawn by the PAL prior to reaching its full operating voltage. C9 and C8 serve as bypass capacitors to reduce ripple on the supply voltage caused by ac components of the current. The many power saving strategies employed on this circuit combine to reduce average battery current drain to a little over 1 microampere, which in turn gives the battery an expected 7 year life, with continuous operation.

Timing during the transmission is governed by U5, a CMOS version of the familiar type 555 timer, which draws very little current and generates a square wave at pin 3. The period of the square wave is 8 Khz plus or minus about 10%, governed by C4, R21, and R7, where C4, R7, and R21 are 5% tolerance components. Since U1 pin 15 is high, the output of U5 is inverted by U2:B and serves as the clock for the PAL. The purpose of R8 is to keep U2 pin 6 from floating when not transmitting because a floating voltage here would cause U2 to draw excessive current and reduce battery life.

The logic equations shown inside U3 accurately portray the logical relationships of the outputs to the inputs resulting from the PAL program according to the present embodiment of the invention as of the date of filing of this application. Inside this device U3, registers Q1, Q2, and Q3 serve as a 3 bit Grey code counter. This 3 bit Grey code counter is driven by the incoming clock signal, and serves to divide each bit time into an 8 phase cycle. Each phase of the cycle is 125 microseconds nominal, and each cycle is 1 microsecond nominal.

A timing diagram on the schematic illustration of FIG. 26 shows the cycle this counter traverses, and some of the events that occur during the phases. The chart just above the timing diagram shows the status of the U1 counter bits at the beginning of the RESET, PRESENCE, CMD, READ, and QUIT portions of the output message. These will be described later. The Q1 signal drives R9, which charges/discharges C7. Gate U2:D monitors the voltage on C7 and switches its output state when that voltage crosses a threshold.

Consequently the signal labelled DELAY just looks like a delayed version of the Q1 signal, the amount of delay being approximately 4 microseconds. The logic for U3 pin 13 causes this pin to go low for the first 4 microseconds that Q1 is high. Thus it pulses negative once each bit cycle, and since U2 pins 1 and 8 are both staying high during the transmit cycle, the negative pulse at U3 pin 13 routes through in un-inverted form to the clock input of U1, causing U1 to count the number of bits.

Referring to the actual PAL programming equations, which are as follows:

```
Q1.d =      !Q2 & !Q3 # Q2 & Q3;
Q2.d =          Q1 & !Q3 # !Q1 & Q2;
Q2.oe =     !Q1 & !Q2;
Q3.d =      !Q1 & Q2 # Q1 & Q3;
DOUT =      'b'0;
DOUT.oe =   DATA;
XMIT.d =        Q1 & !Q3 & DI #
                Q1 & Q3 & !DI #
                Q1 & Q2 & Q3 #
            !Q1 & XMIT #
            !Q2 & !Q3 & XMIT #
            !C2 & !C3 & !C4 & !C5 & !C6;
DATA =      C1 & !C3 & !C4 & !C5 & !C6 #
            C2 & !C3 & !C4 & !C5 & !C6 #
            Q1 & !Q2 & !Q3 & C2 & !C3 & C4 & !C5 & !C6
            #
            (DELAY & Q1 & !Q3) & (C4 # C5 # C6);
RESET =     !DELAY & (RESET # !Q1 & Q2 & C0 & C3 & C4 &
            C6);
SAMPLE =    Q1 & !Q2 & !Q3 & CLK;
/************************************************/
Counter sequence (Grey code)
Q3  Q2  Q1      action at start of or during state
0   0   0       advance count, dischg sample & hold
0   0   1       clock DS2400, sample & hold, write
0   1   1       set xmit if DI hi
0   1   0       clr xmit if DI lo
1   1   0
1   1   1
1   0   1       xmit always hi
1   0   0       xmit goes lo if DI hi, dischg sample & hold
/************************************************/
```

Note: In the following logic equations, the symbol & represents the "AND" function, # represents the "OR" function, ! represents the "NOT" function, $ represents the "EXCLUSIVE OR" function, and except where parentheses dictate otherwise, the various functions are performed in the following time sequence: !, &, #, $. Parentheses indicate that the desired function is that function that results from first performing all operations internal to the parentheses and then performing the indicated external operation on that result. Suffix .d denotes D input of clocked register, suffix .oe denotes output enable of tri-state output, and suffix .ck denotes special clock for register.

Deceptively simple looking element U4 is the focal point of the entire tag circuit. This is only a two terminal device, having the physical appearance of a small low power plastic transistor, yet its read only memory contains the entire data message that is to be transmitted. The inventor's idea of using this device as part of the tag circuit was the key to making the tag small without having to buy custom made integrated circuits. The manufacturer of this device (Dallas Semiconductor Corp., 4401 S. Beltwood Pkwy, Dallas, Tex. 75244-3292) has pre-programmed each device with a 48 bit identification number that is unique world wide. The device also contains an 8 bit type code 01, and an 8 bit CRC code for verifying the readout.

Since power and two-way signals are all multiplexed onto a single pin on this device, communication with it becomes a bit tricky. Pullup resistor R16 provides power to the device. U4 and also signal DOUT, which is U3 pin 12 have only the two states "open" and "ground". By keeping DOUT most of the time in the open state, U4 is allowed to control the data line most of the time, but the PAL can send it clock and control signals as needed by momentary grounding of the line.

D1, D2, R17, and C13 comprise a sample and hold circuit which charges C13 to whatever voltage U4 has during the sample time, i.e., during the time the SAMPLE signal is high. Prior to taking each sample, C13 is completely discharged by the signal labelled Q2. This signal is in the open state normally, but goes low during the time where DATA is true. C13 remains charged to either its high or low voltage level until discharged by Q2 going low. The voltage level on C13 is sampled by U3 pin 11 before Q2 discharges it.

Protocol for U4 requires it to first be powered up by leaving the input high momentarily. Thus DOUT is programmed to stay in the open state for two bit times, i.e., until U3 pin 4=C3 goes high. U4 protocol next requires DOUT to be driven low for at least 480 microseconds to reset U4. This is accomplished by letting DOUT go low while either C1 or C2 is high but while C3 through C6 are still low.

The protocol for U4 next requires that U4 be given control of the bus for at least the next 480 microseconds. The PAL is programmed to give it control for 8 bit times (until C4 goes high) which exceeds the required 480 microseconds. During the next 8 bit times U4 expects the external circuit to send it an 8 bit command consisting of 4 ones (1's) followed by 4 zeros (0's). A 1 is sent by holding the bus low for at least 1 microsecond but considerably less than 15 microseconds. A 0 is sent by holding the bus low for 60 to 120 microseconds. Since C4 is now high, the PAL accomplishes this by making DOUT low for the three microsecond period that Q3 is low and Q1 is high but DELAY is not yet low, and also making DOUT low for the entire time that Q1 is true and Q2 and Q3 are both low if C2 and C4 are high but not C3 and not C5 and not C6.

During the next 64 bit times, U4 expects to simply be sent 1's (i.e clocks) at the beginning of each bit time, and U4 then serially reads out its 8 bit type code (01), its 48 bit identification code, and an 8 bit cyclical redundancy check (CRC) code. In this readout mode, U4 simply allows the bus to return high immediately after the clock to denote a 1, whereas U4 keeps the bus low for 15 to 60 microseconds after the clock pulls it low to denote a 0.

The data is transferred least significant bit first. During this readout phase, logic in the PAL device samples this data as follows: C13 has been discharged to ground during the previous bit cycle where Q1 and Q2 were both low. (Note that U3 is labelled Q2, but it is only enabled while Q1 and Q2 are low.) During the first phase of the current bit cycle, where Q1 has just gone high, and DELAY is still high, DOUT clocks U4. Simultaneously, PAL logic drives the SAMPLE pulse high just after DELAY goes low, and it remains true until the clock goes low.

While SAMPLE is high, its current through R17 charges C13 to whatever voltage U4 is putting on the bus. SAMPLE is guaranteed to go low at or before the 15 microsecond point because R7 is chosen to give a clock width of 12. Though the bus voltage may subsequently change, the sampled voltage will remain on C13 at least until it has been sampled by the XMIT signal via U3 pin 11.

XMIT is the baseband signal used to modulate the 303.825 MHz radio carrier wave. Through a voltage divider consisting of R13 and R15, the XMIT signal switches Q8 between its low current and high current states. Y1, Q8, R14, R20, C12, C11, L2, C10, and R12 comprise a high frequency oscillator whose frequency is precisely held at 303.825 MHz by surface acoustic wave (SAW) resonator Y1. R12 and C10 serve to keep the high frequency current from getting to the power supply line, where it might degrade the performance of other circuit components.

L2 is a 1 inch diameter single turn of wire lying in a plane substantially parallel to the circuit board. It serves not only as an inductor but also as a loop antenna for radiating the signal. The loop antenna is ideal for this application because it radiates the signal equally in all horizontal directions when the tag is lying on a level surface (its typical orientation). R14 governs the peak antenna current, and is chosen in the present embodiment to reach but not exceed the radiation level permitted by the Federal Communications Commission for Part 15 (unlicensed) transmission. R19 provides a bias current that can keep the oscillator oscillating at a reduced amplitude even when XMIT is low. Without this bias, oscillation may build up much too slowly to track the XMIT signal.

PAL logic for the XMIT signal causes it to stay high for the first 4 bit times. This is not necessary, but helps the AGC circuit in the receiver to come up more quickly. From that point henceforth, the XMIT signal is a Manchester version of the serial data seen on the U4 bus as sampled by C13. Manchester means that the transmitted representation of a 1 is a high level output during the first half of the bit cycle and a low level output during the second half. The transmitted representation of a 0 is a low level output during the first half and a high level during the second half of the cycle. The main advantage of Manchester encoding is that it has a built-in clock, i.e. a transition in the middle of every bit cycle, and also has no dc bias.

PAL logic for the RESET signal causes it to latch high on the first !DELAY signal after counter U1 reaches a count of 89, signifying that the entire message has been sent. The RESET signal clears counter U1, which shuts off power to all the transmission circuitry, and begins the 5 minute quiet interval. The purpose of latching the RESET signal is so that it will remain high long enough to clear all bits in counter U1 and not just part of them. The purpose of gating RESET with !DELAY is to keep RESET from getting set during the PAL startup transient.

MONITOR CIRCUIT

Each monitor contains a radio receiver that can receive and decode radio transmissions from tags as well as from other monitors, yet discard noise signals and other radio signals that may be present in the area. Each monitor also contains a transmitter for sending messages to other nearby monitors via radio waves.

In the case of messages from tags, the monitor extracts and validates the identification code contained in the message. The monitor contains a microprocessor and memory with software that enables the monitor to store and process data received from other monitors or from tags. The monitor stores in its memory a list of the tags it has been hearing recently, along with the signal strength of each tag. When a message arrives from anywhere, the monitor first validates the message by comparing the CRC code and checking it against the received CRC codes stored in memory.

If the message is valid, the monitor then checks the message type and proceeds accordingly. If the type indicates the message is from a tag, the tag ID is extracted and compared with the identification codes already in memory. If the identification code is already in memory and the signal strength has not changed significantly, no further processing of the message is necessary. However, if the tag is a "newcomer" or if its strength has changed significantly, the memory is updated accordingly, and the monitor sends a special message to its "output partner" (DOP) monitor specifying the new status of this tag.

That output partner, which is also a DOP monitor, will forward that information to its associated output partner or DOP monitor, and the information continues being relayed from one monitor to another until it reaches the monitor that ties directly to the central computer. That monitor is slightly different than other monitors in that its software is modified to forward messages over its RS232 port to a central computer. Software in the central computer then uses this incoming information to update its data base.

Besides keeping track of tags in its own vicinity and reporting that status, each monitor must also serve as a relay station, forwarding incoming radio messages from other monitors to the appropriate destination. Radio communication between monitors is governed by a complex protocol as explained above.

DETAILED DESCRIPTION OF MONITOR CIRCUITRY RECEIVER

Figure 27A:
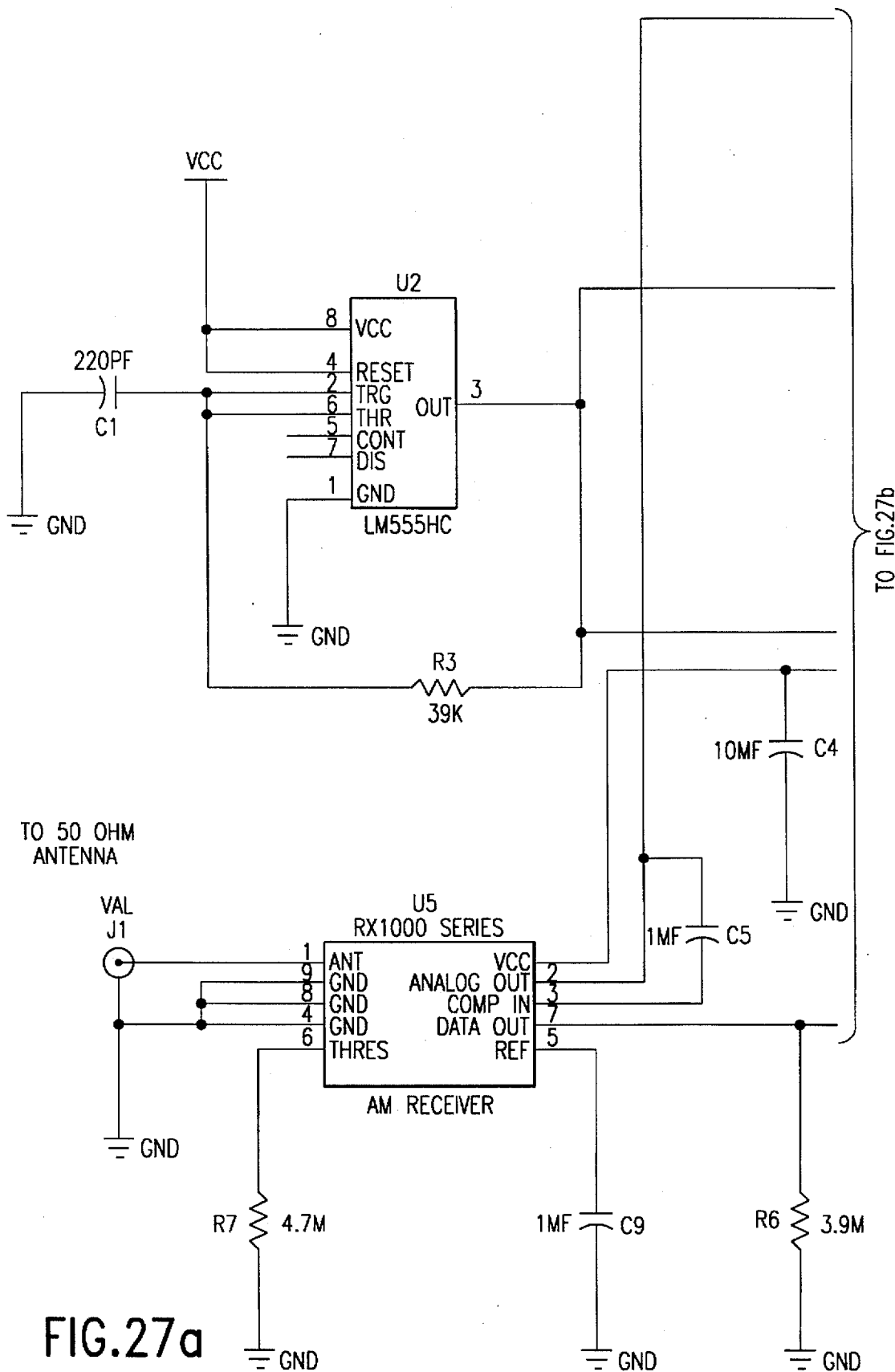
FIGS. 27a–27q are circuit diagrams illustrating the circuitry of the monitor according to one embodiment of the present invention.

Referring to FIG. 27a, a 50 ohm antenna is connected by an optional 50 ohm coax cable to connector J1, to match the impedance expected by the ASH receiver U5. The ASH receiver U5 has been chosen in this case to simplify the circuitry, but any number of other radio receivers would also suffice. The antenna is typically an omni-directional horizontally polarized antenna such as a loop. The weak RF signal from the antenna is fed to ASH receiver U5 which essentially discards all signals except 303.825 Mhz, which is the frequency transmitted by the tags 13 and monitors 15 in the system 11.

There is nothing magic about the chosen frequency for this system. That frequency was chosen in this application primarily because the ASH receiver was available for that frequency. All transmitters and receivers in this system 11 must obviously be designed for the same radiated frequency however, in order to make radio intercommunication possible.

U5 has an analog output at U5 pin 2, which is the AM detector output. When 303.825 Mhz radiation is detected, this output rises 0.3 volts or so above its no-signal level, which is typically about 2.1 volts. This particular receiver can easily be saturated by excessive background noise.

Provision has been made for the monitor 15 to measure the dc level of this signal (labelled RSSI) to recognize the presence of excessive background noise, should that occur.

This analog output is ac coupled through C5 to a comparator input U5-3. The digital output of the comparator appears on U5-7. The threshold level of the comparator can be adjusted from 0 to about 25 millivolts by the value of R7. The end result is that U5-7 is high while the 303.825 Mhz signal is present at the antenna, and thus reproduces the on-off keyed modulation present in the antenna signal. C4 and C9 are capacitors recommended by the manufacturer of U5 to filter the 3 volt dc power supplied to U5 pin 1 and the internally generated bias at U5 pin 6. Since the output at U5 pin 7 is only 3 volts, Q1 is used to boost that signal to 5 volts for driving the 5 volt CMOS logic. R6 and R4 have large values to minimize power consumption.

This high impedance circuitry has slow rise and fall times, which are speeded up by Schmidt trigger U1:C to reduce power consumption of succeeding circuitry.

MISCELLANEOUS CIRCUITRY

C7 and C8 provide local filtering of the 5 volt VCC power. R5, C3, and C6 are a decoupling circuit to prevent U3 and U4 from introducing noise onto the 5 volt power. The function of diode D3 is to supply the heavy inrush current drawn by U3 and U4 as they are being powered up. U2 is a CMOS version of the popular 555 timer circuit. Associated components R3 and C1 cause it to supply an output square wave signal operating at approximately 64 Khz. That signal is used as the clock to PAL (Programmable Array Logic) circuits U3 and U4.

PALS

The PALs are programmed with the following logic:
U3 Logic:
    Device is Alterra EP610
    Inputs:
        Pin 1 = CLK1
        Pin 2 = CLK
        Pin 11 = DATA_IN
        Pin 13 = CLK2
        Pin 14 = SCHMIDT
        Pin 23 = P3
    Note: CLK, CLK1, and CLK2 are really the same signal
    Outputs:
        Pin 3 = W0
        Pin 4 = W1
        Pin 5 = W2
        Pin 6 = Spare1
        Pin 7 = Spare2
        Pin 8 = OC0
        Pin 9 = OC1
        Pin 10 = DLSYNC
        Pin 15 = ANODE
        Pin 16 = CATHODE
        Pin 17 = ENABLE
        Pin 18 = SYNC
        Pin 19 = OCLK
        Pin 20 = RSETW
        Pin 21 = RDATA
        Pin 22 = RESET
    Logic Equations:

| PALS | |
|---|---|
| W0.d = | !RSETW & (!W1 $ W2 $ W3); |
| W1.d = | !RSETW & (!W1 $ (!W0 # (W1 $ W2 $ W3))); |
| W2.d = | !RSETW & (!W2 $ (W0 # !W1 # (W2 $ W3))); |
| Spare1.d = | 'B'0; |
| Spare2.d = | 'B'0; |
| OC0.d = | !OC1 & !RESET; |
| OC1.d = | OC0 & !RESET; |
| RESET.d = | P3 # ENABLE & OC1 & !OC0 # !ENABLE & OC0 # RESET & (OC0 # OC1); |
| ANODE = | !DATA_IN & CLK |
| CATHODE = | !(DATA_IN & CLK); |
| ENABLE.d = | P3 # ENABLE & (OC0 # !OC1); |
| DLSYNC.d = | SYNC; |
| OCLK = | !SYNC & DLSYNC & !(!W0 & !W1 & W2) # RESET & !CLK; |
| RSETW = | SYNC & !DLSYNC; |
| SYNC.d = | SCHMIDT; |
| RDATA = | DATA_IN & ENABLE; |
| OC0.ck = | OCLK; |
| OC1.ck = | OCLK; |

The signals reaching the receive antenna from other components of this system arrive in short bursts lasting a small fraction of a second. While no such message signal is present, the received signal will just be noise. It would be a waste of time for the Motorola 68HC11 microprocessor (U8) to deal with this noise. The main purpose of PAL U3 is to recognize noise, and prevent it from reaching the 68HC11. The PAL generates an ENABLE signal, which is false during noise, and true during legitimate messages. That ENABLE signal gates the DATA_IN signal to produce the RDATA signal that goes to the 68HC11.

W0 through W2 compose a Gray code counter with W0 being the least significant bit. A Gray code counter is one in which only one bit at a time changes states. The binary counting sequence for this particular counter is 000, 001, 011, 010, 110, 111, 101, 100. Logic for this particular counter is such that when the counter reaches the 100 state, it will remain there until the RSETW signal occurs, which will return it to the 000 state. It is referred to as the "width" counter, for it is used to measure the width (time duration) of pulses. OC0 and OC1 compose another Gray code counter called the "occurrence" counter. It counts the pulses yielding a width count of less than 7. The count sequence of OC0 and OC1 is 00, 01, 11, 10, where OC0 is the least significant. A pulse is considered good if it gives a full scale width count, and is otherwise considered bad. The ENABLE signal is set by P3, an external signal indicating the arrival of 8 consecutive good pulses. The ENABLE signal is reset by the occurrence counter reaching state 10, which means 3 bad pulses were found in a group of 7 or less.

U4 Logic:
    Device is Alterra EP610
    Inputs:
        Pin 1 = CLK1
        Pin 11 = SYNC
        Pin 13 = CLK2
        Pin 14 = RESET
        Pin 23 = TDATA
    Note: CLK1, and CLK2 are really the same signal
    Outputs:
        Pin 3 = P0
        Pin 4 = P1
        Pin 5 = P2
        Pin 6 = P3
        Pin 7 = EDGE
        Pin 8 = DL_DATA
        Pin 9 = DL_SYNC
        Pin 10 = C0
        Pin 15 = C1
        Pin 16 = C2
        Pin 17 = C3
        Pin 18 = C4

-continued

```
Pin 19 = XMIT
Pin 20 = SPARE1
Pin 21 = SPARE2
Pin 22 = SPARE3
Logic Equations:
    C0.d =        !C0;
    C1.d =        C0 & !C1 # !C0 & C1;
    C2.d =        C0 & C1 & !C2 # !C0 & C2 #
                  !C1 & C2;
    C3.d =        C0 & C1 & C2 & !C3
                  # C3 & (!C0 # !C1 # !C2);
    C4.d =        C0 & C1 & C2 & C3 & !C4
                  # C4 & (!C0 # !C1 # !C2 # !C3);
    DL_DATA.d =   TDATA;
    XMIT =        TDATA # DL_DATA;
    DL_SYNC.d =   SYNC;
    EDGE =        SYNC & !DL_SYNC;
    P0.d =        !RESET & (EDGE & !P0 # !EDGE &
                  P0);
    P1.d =        !RESET & (EDGE & P0 & !P1
                  # P1 & (!EDGE # !P0));
    P2.d =        !RESET & (EDGE & P0 & P1 & !P2
                  # P2 & (!EDGE # !P0 # !P1));
    P3.d =        !RESET & (P3 # EDGE & P0 & P1 &
                  P2);
    DL_DATA.ck =  C3;
```

U4 is miscellaneous logic. C0–C4 divide the clock frequency by 32 to provide a nominal 2 Khz clock (TCLOCK) for the Manchester data provided by the CPU. P0–P3 count the SYNC pulses. Both counters are standard binary counters.

Processing of Received Signal

The output of U1:C has been described earlier as being the cleaned up digital data stream from the radio receiver U5. This signal enters U3 and is named DATA_IN. From that signal, U3 with the help of U1:A, U1:B, D1, D2, R1, R2, and C2 produces a signal named SYNC that is the same as DATA_IN except that its edges have been shifted enough to align them with positive edges of the clock. A separate patent application is being filed on this unique synchronizing approach, which eliminates metastability using standard components.

From SYNC, U4 generates a signal named EDGE that is sort of a one-shot pulse occurring on each positive transition of SYNC, but lasting only one clock period. That EDGE pulse is used to advance the pulse counter comprising P0 through P3. That counter is reset by the RESET signal generated in U3. While ENABLE is true, the counter counts upward until it either reaches 8 counts or 3 bad pulses arrive. While ENABLE is false, the counter always counts to 8 before resetting.

The RDATA signal, which is essentially the received signal with noise removed, is fed directly to a timing input on the 68HC11. The 68HC11 contains circuitry that is able to record the time of arrival of each transition of the waveform, and the processing software is able to retrieve the desired information by analyzing these times of arrival.

Transmit Signal Processing

The previously discussed TCLOCK signal, which runs at nominal 2 Khz, is fed to pin 24 of the 68HC11, where it serves as the clock signal for the synchronous serial peripheral interface circuitry inside the 68HC11. The software loads data in parallel form 8 bits at a time into a shift register inside the 68HC11, and that data gets shifted out on U8 pin 22 (signal TDATA), which presents a new bit on each positive edge of TCLOCK. If the software stops loading parallel data, TDATA enters a static 0 state because the serial input to the transmit shift register is pin 23, which is grounded through R16. TDATA is fed to U4 pin 23. The logic inside U4 generates signal XMIT, which is identical to TDATA except that all high to low transitions are delayed by one clock cycle. This deliberate lengthening of positive pulses is intended to compensate for the transmitter radio frequency oscillation building up more slowly than it decays. The XMIT signal is the modulation input to the radio frequency transmit circuit to be discussed later. We have chosen to use Manchester encoded data, but the Manchester encoding is done in software before loading it into the shift register. Similarly, the Manchester decoding in the receiver is done by software. In the case of tags, the Manchester encoding is done within the PAL. Therefore, a different type of encoding could be achieved by simply revising the software and the logic inside the tag PAL, if desired.

Figure 27B:
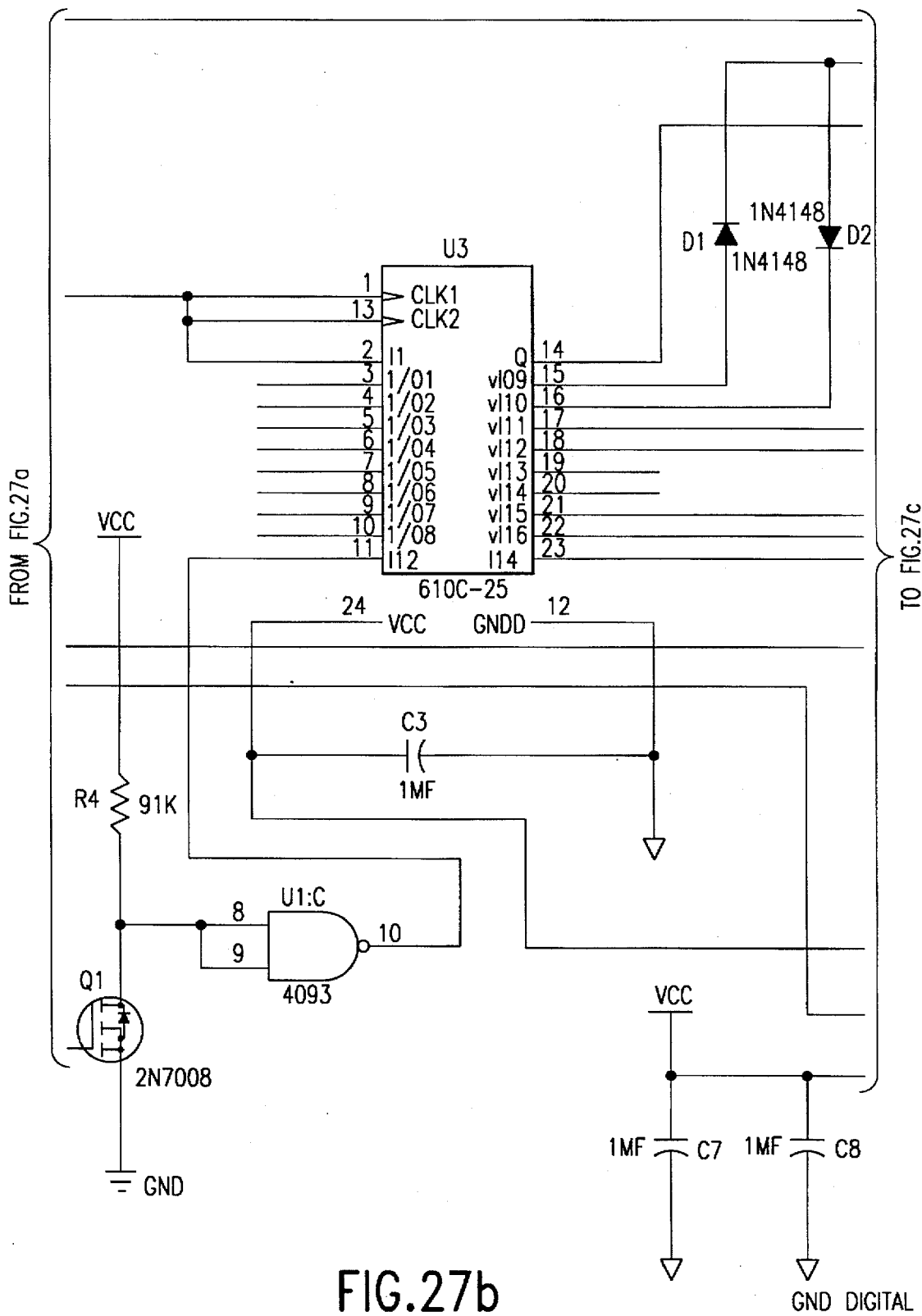
Figure 27C:
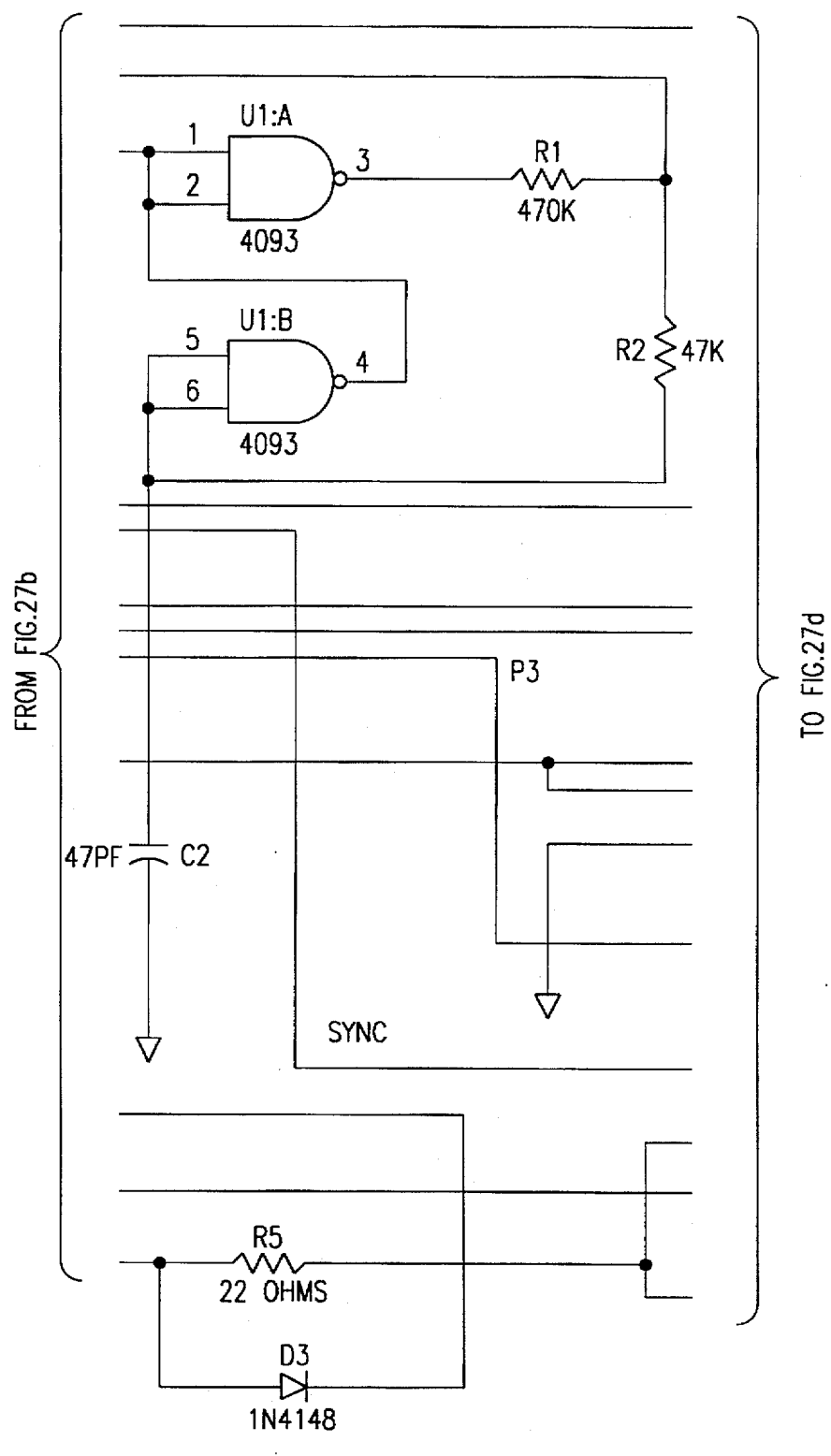
Figure 27D:
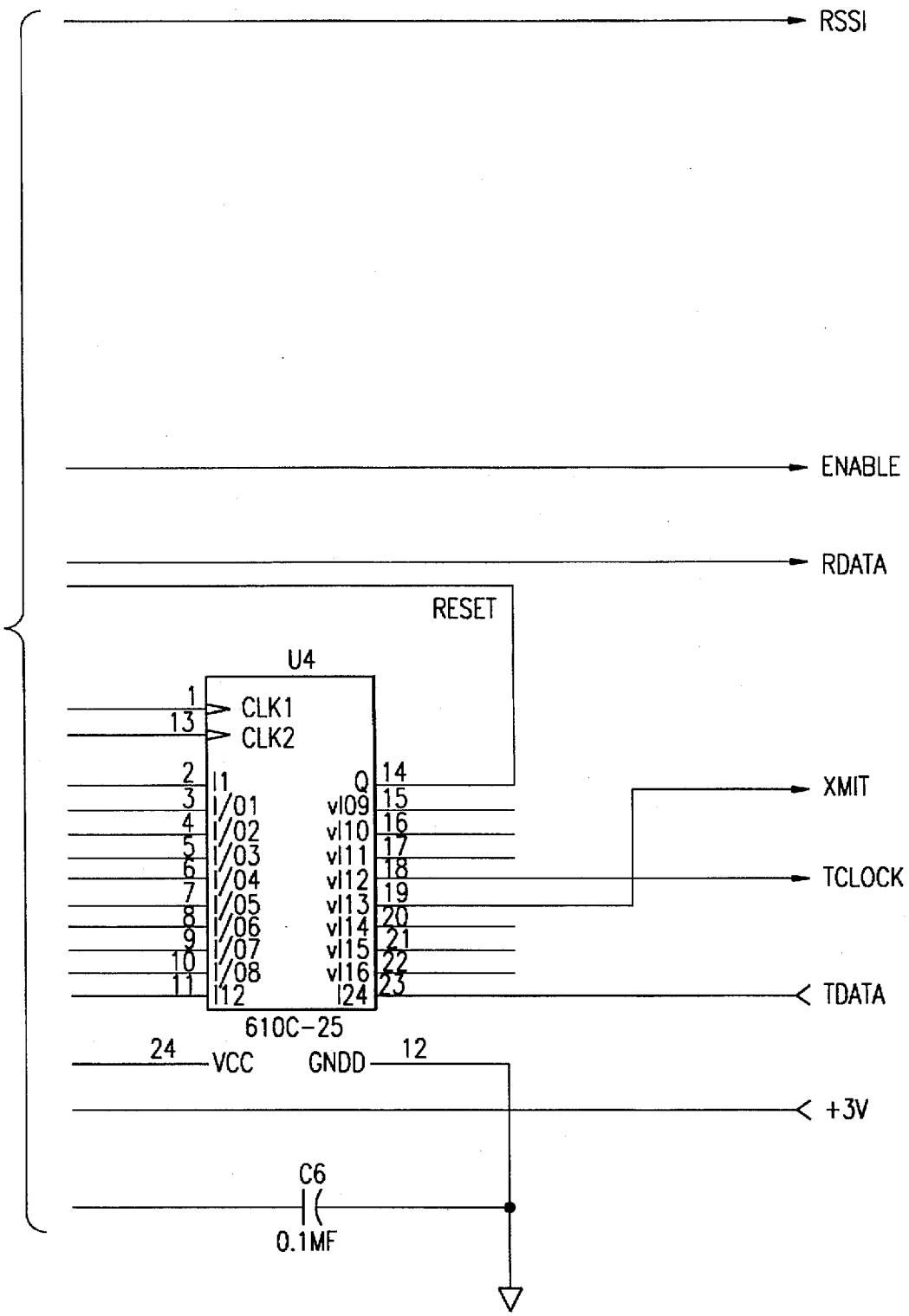
Figure 27E:
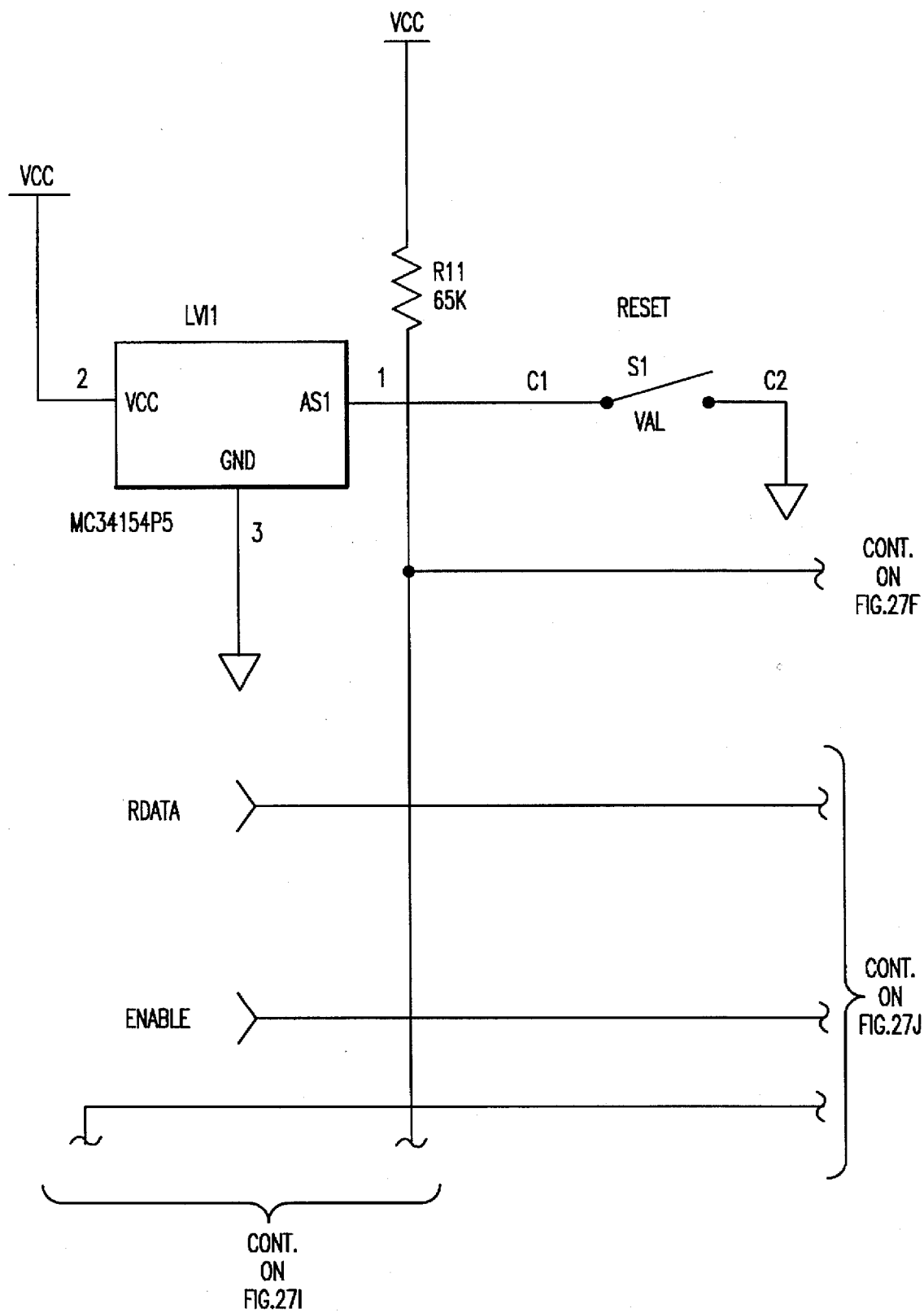
Figure 27F:
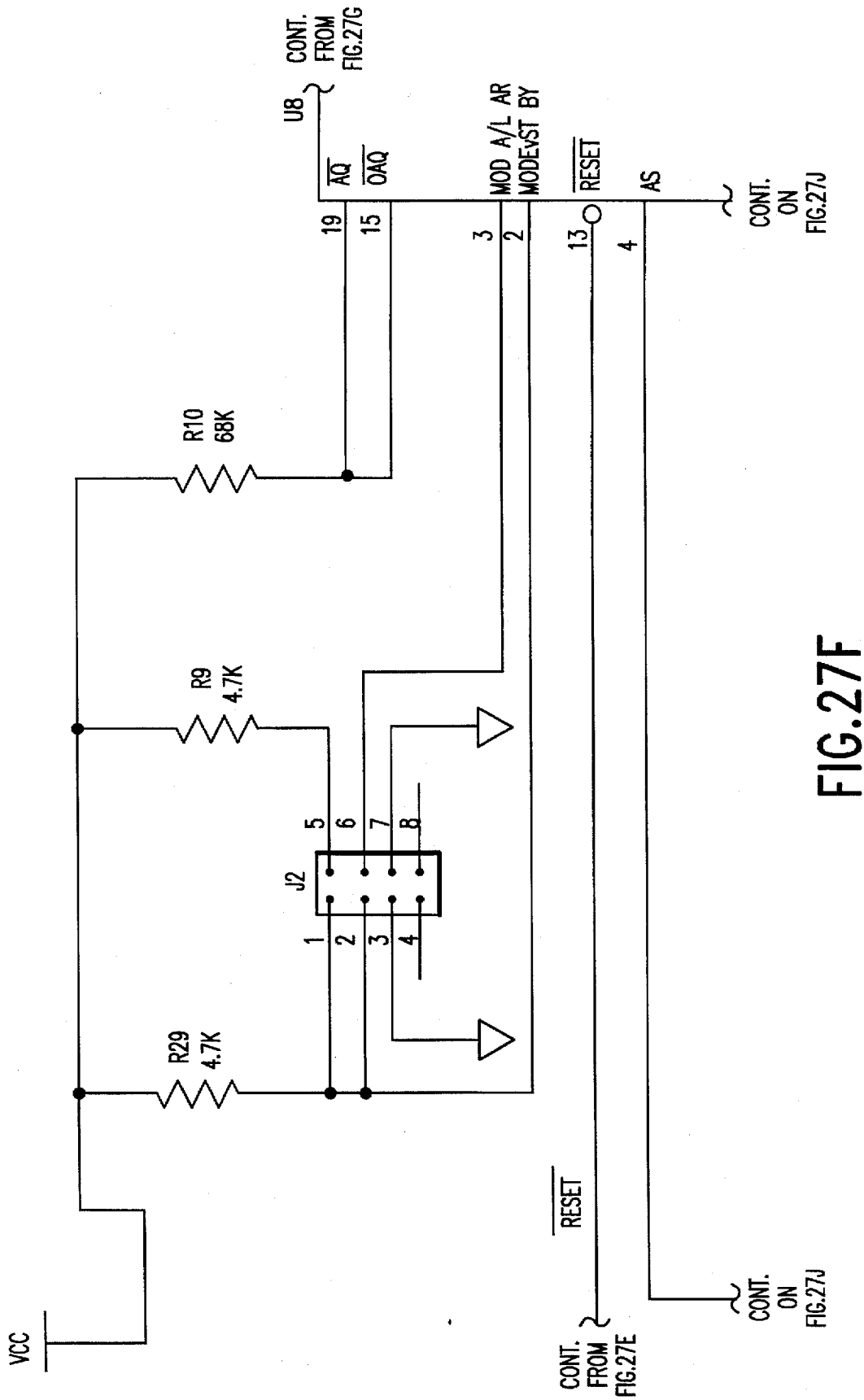
Figure 27G:
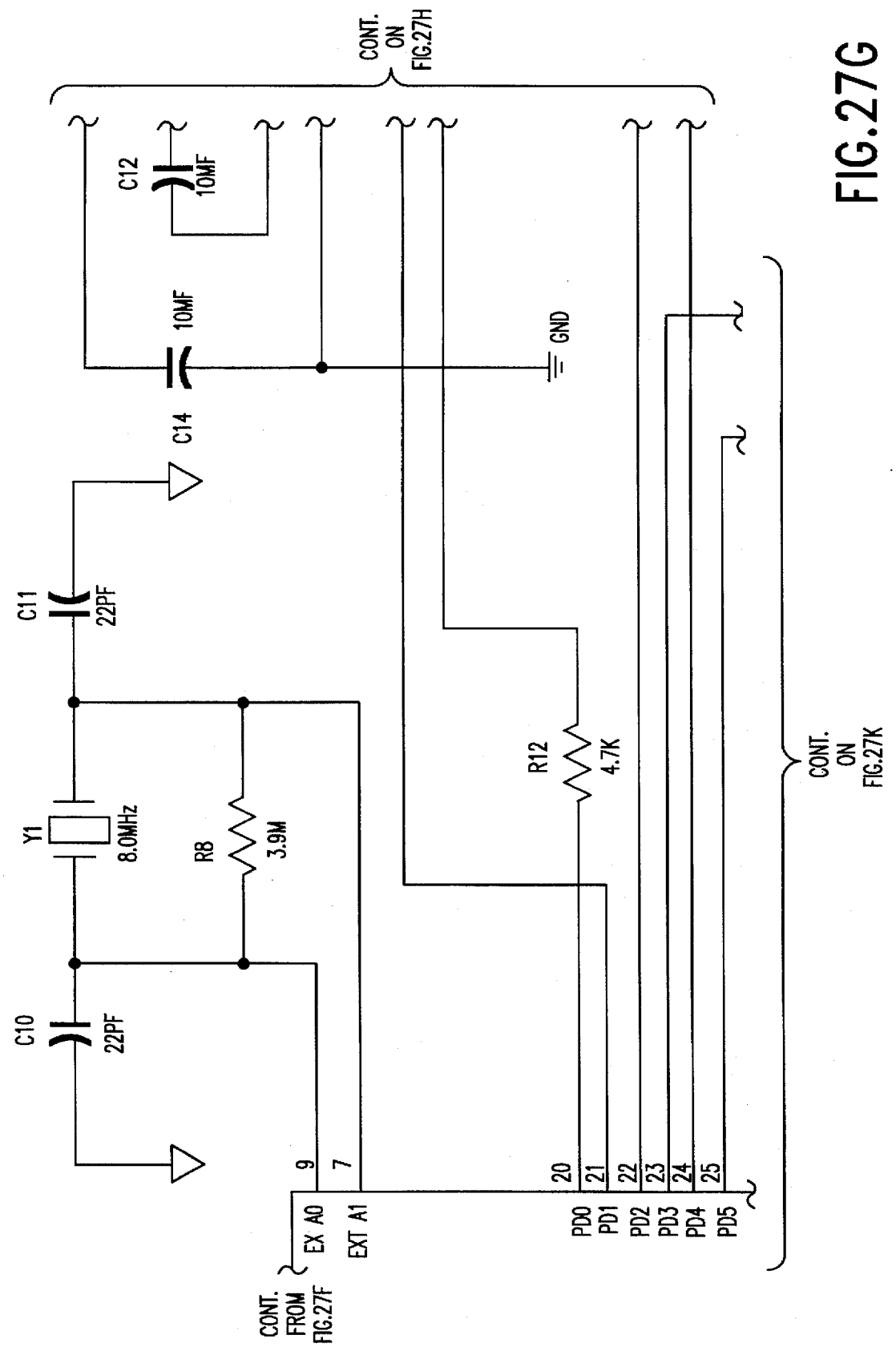
Figure 27H:
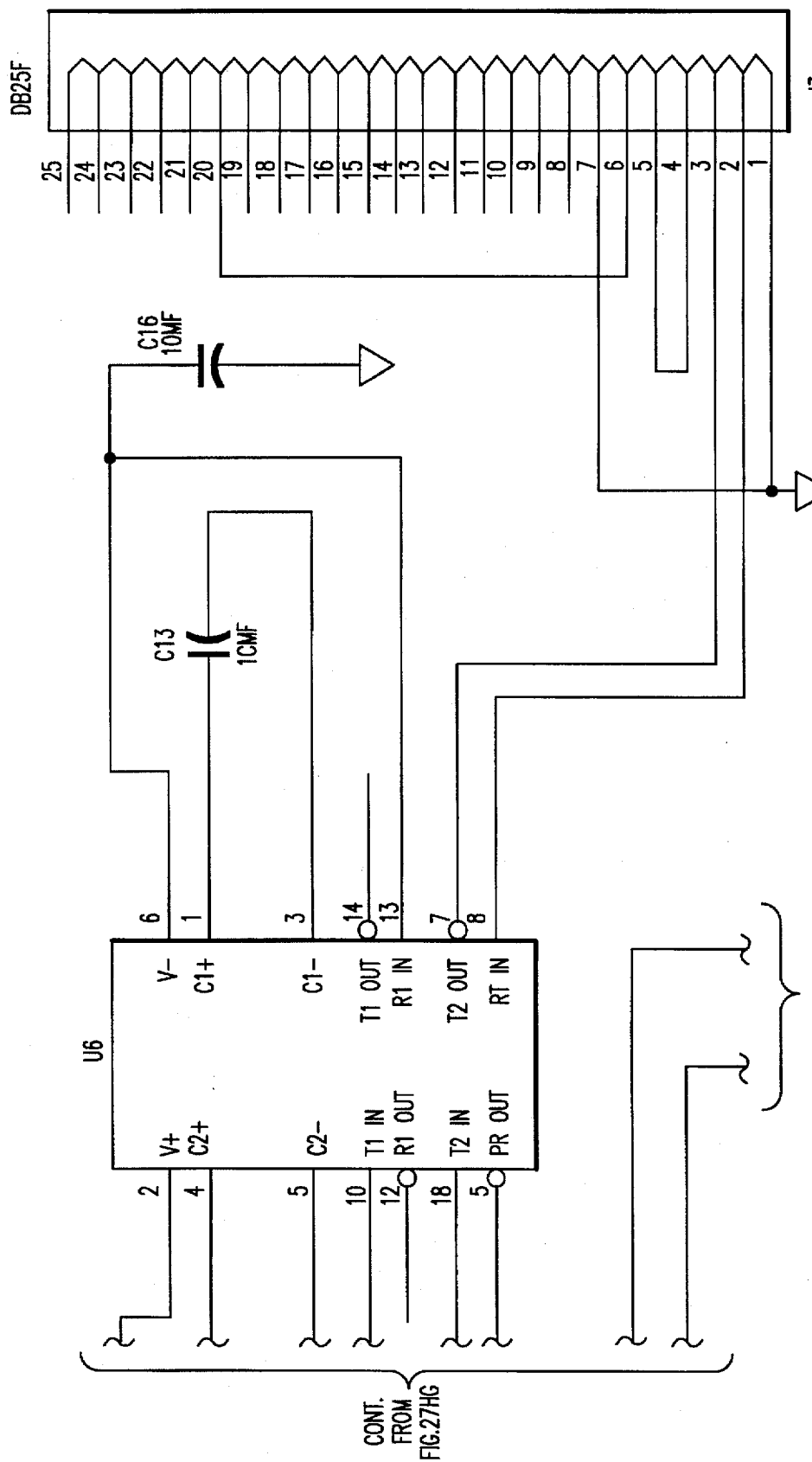
Figure 27I:
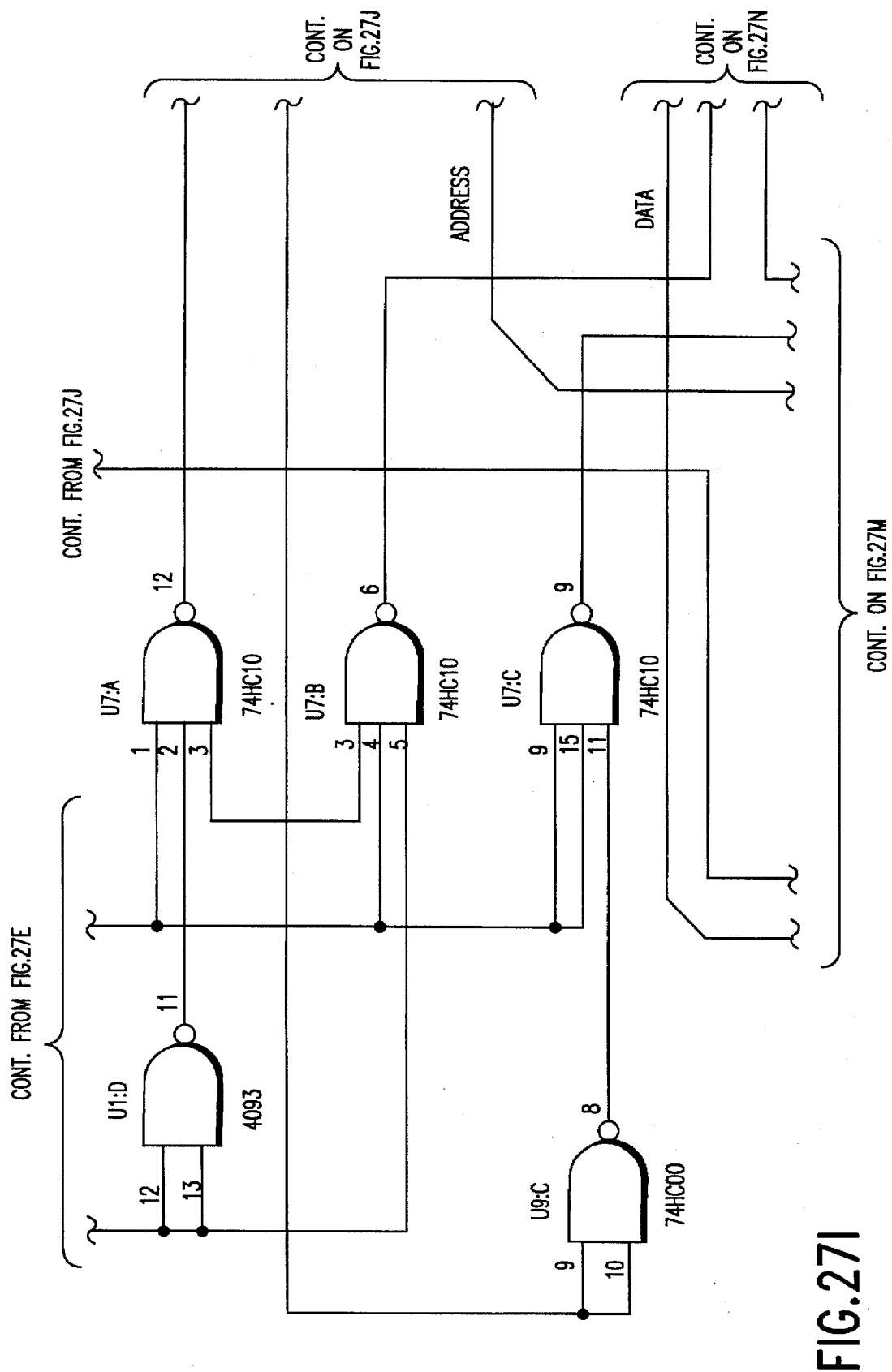
Figure 27J:
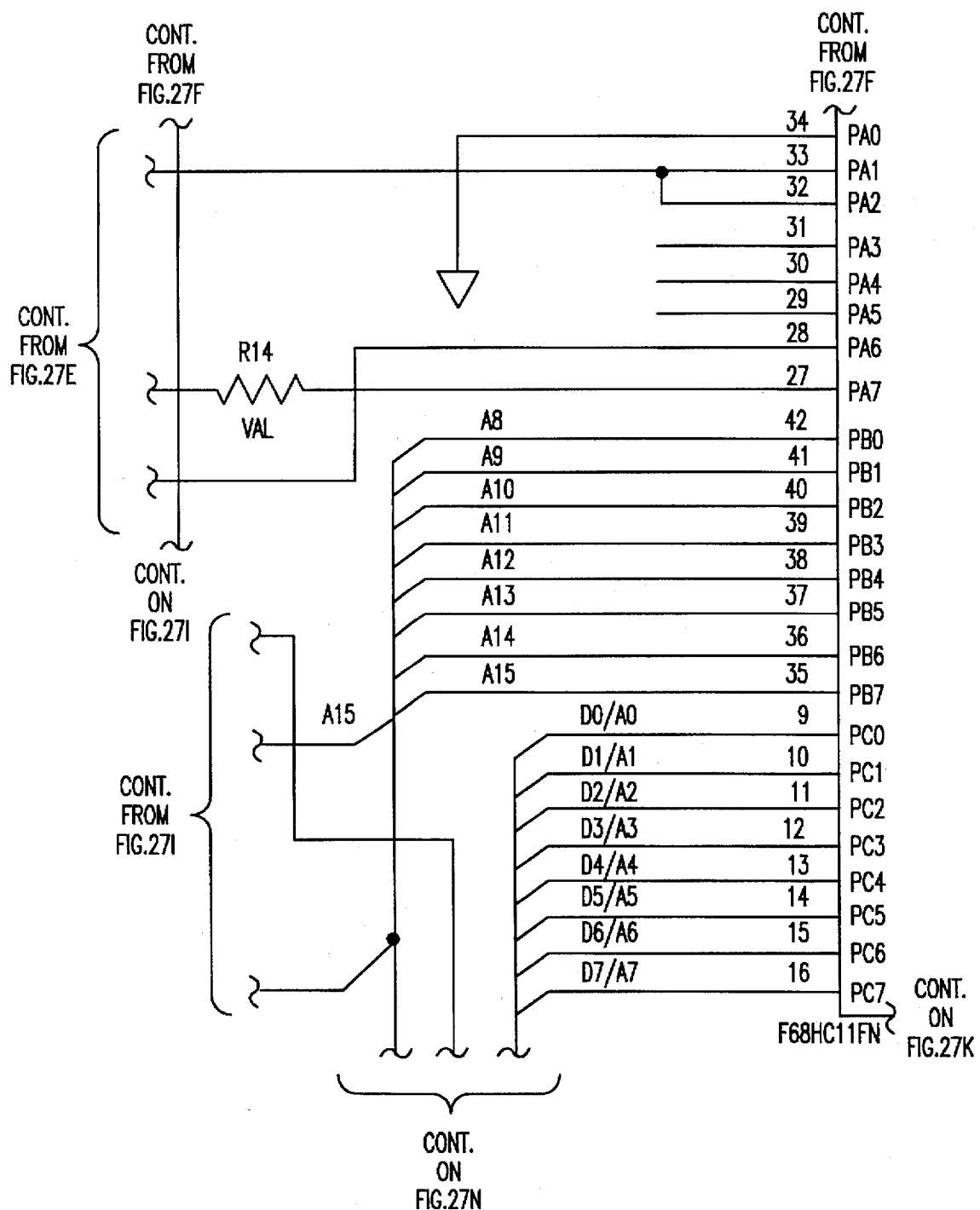
Figure 27L:
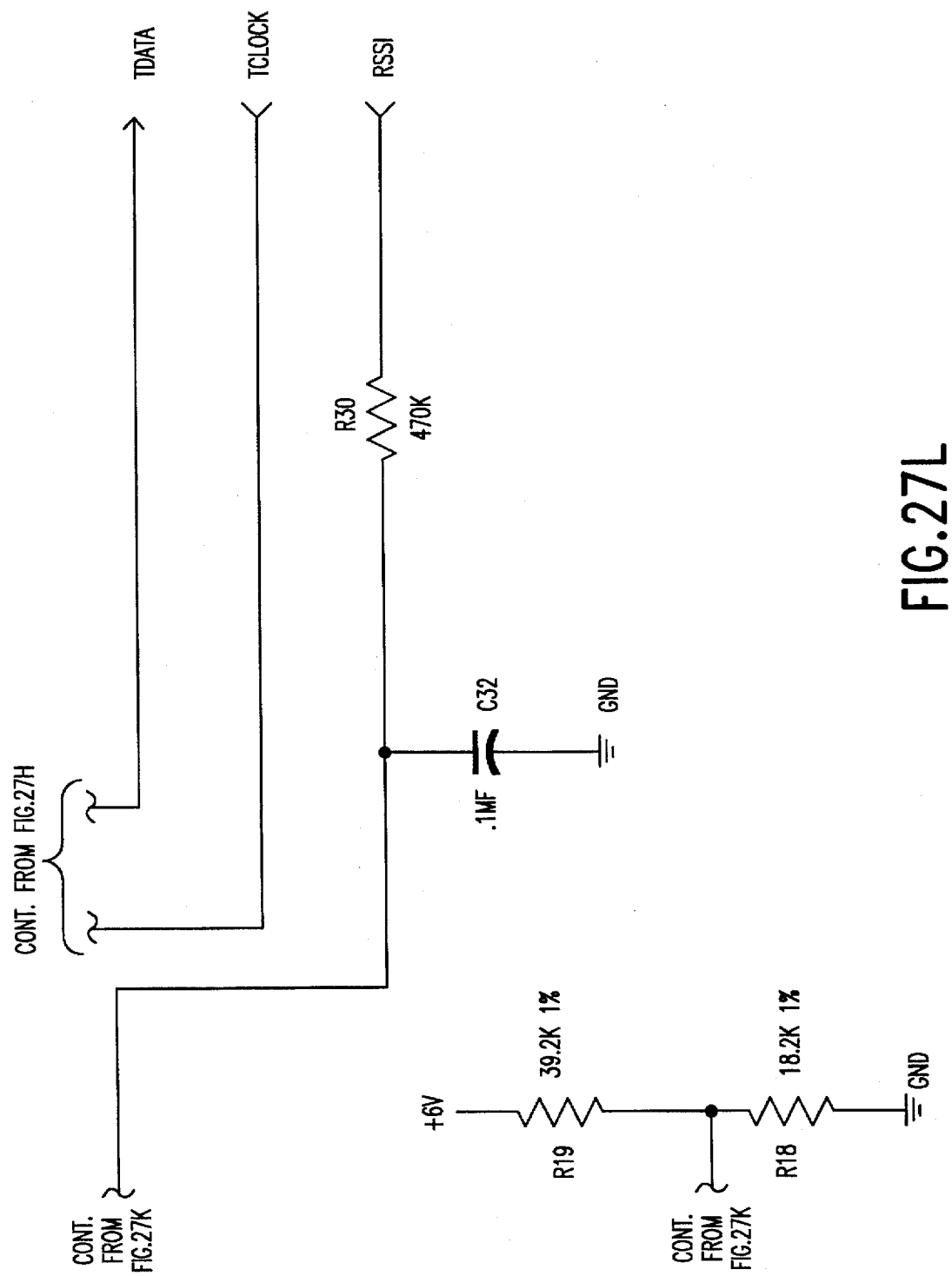
Figure 27N:
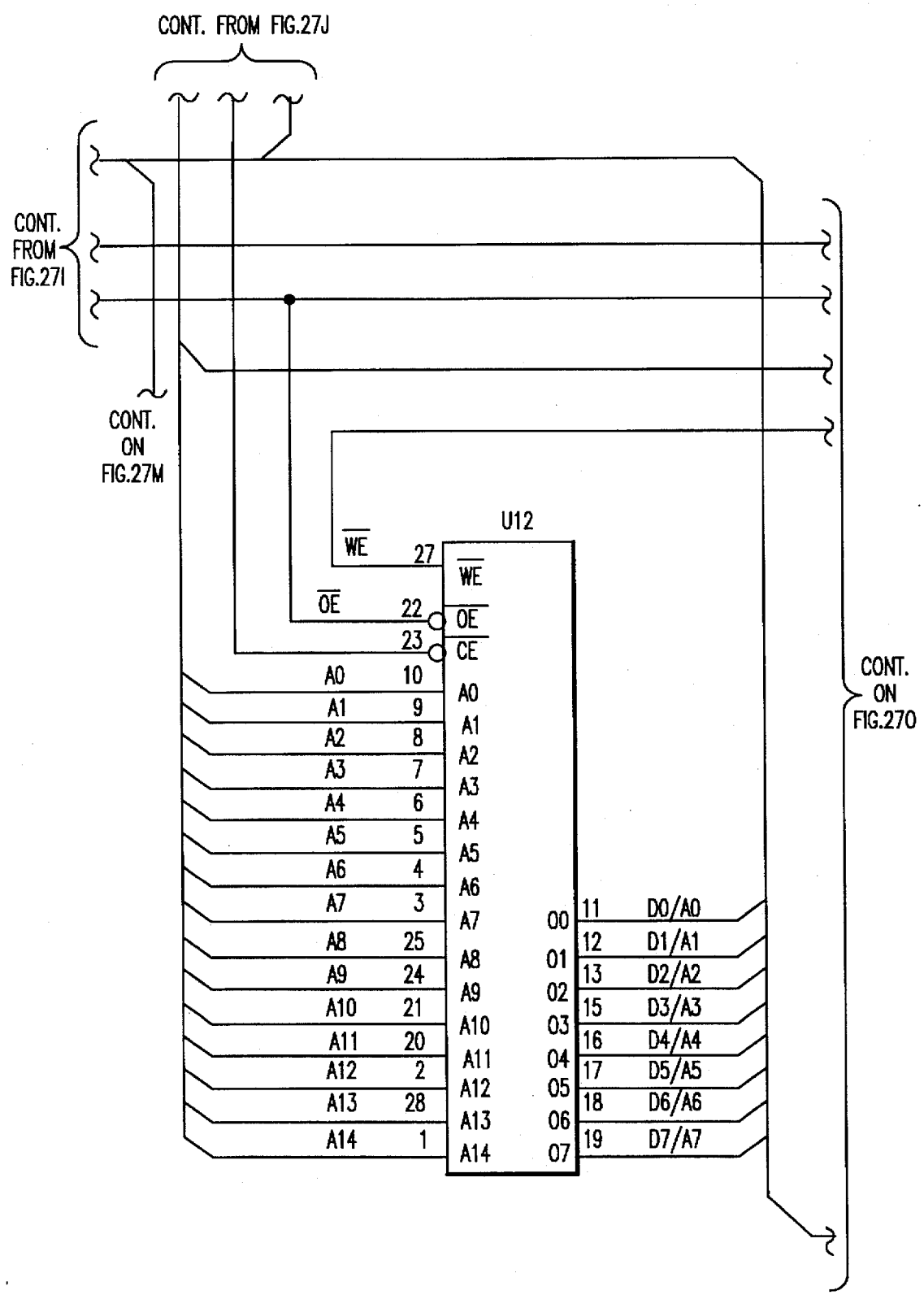
Figure 27:
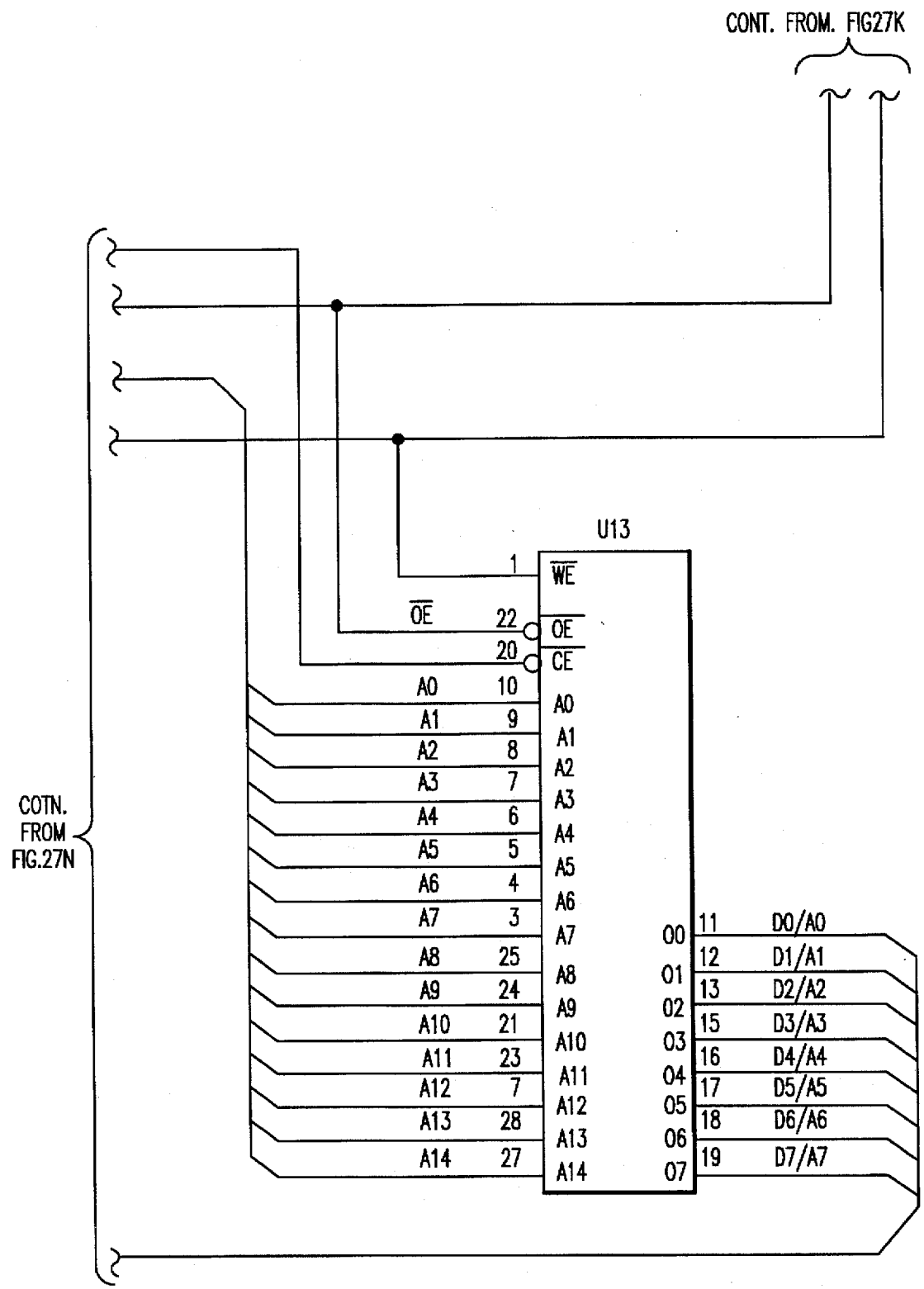
Figure 27P:
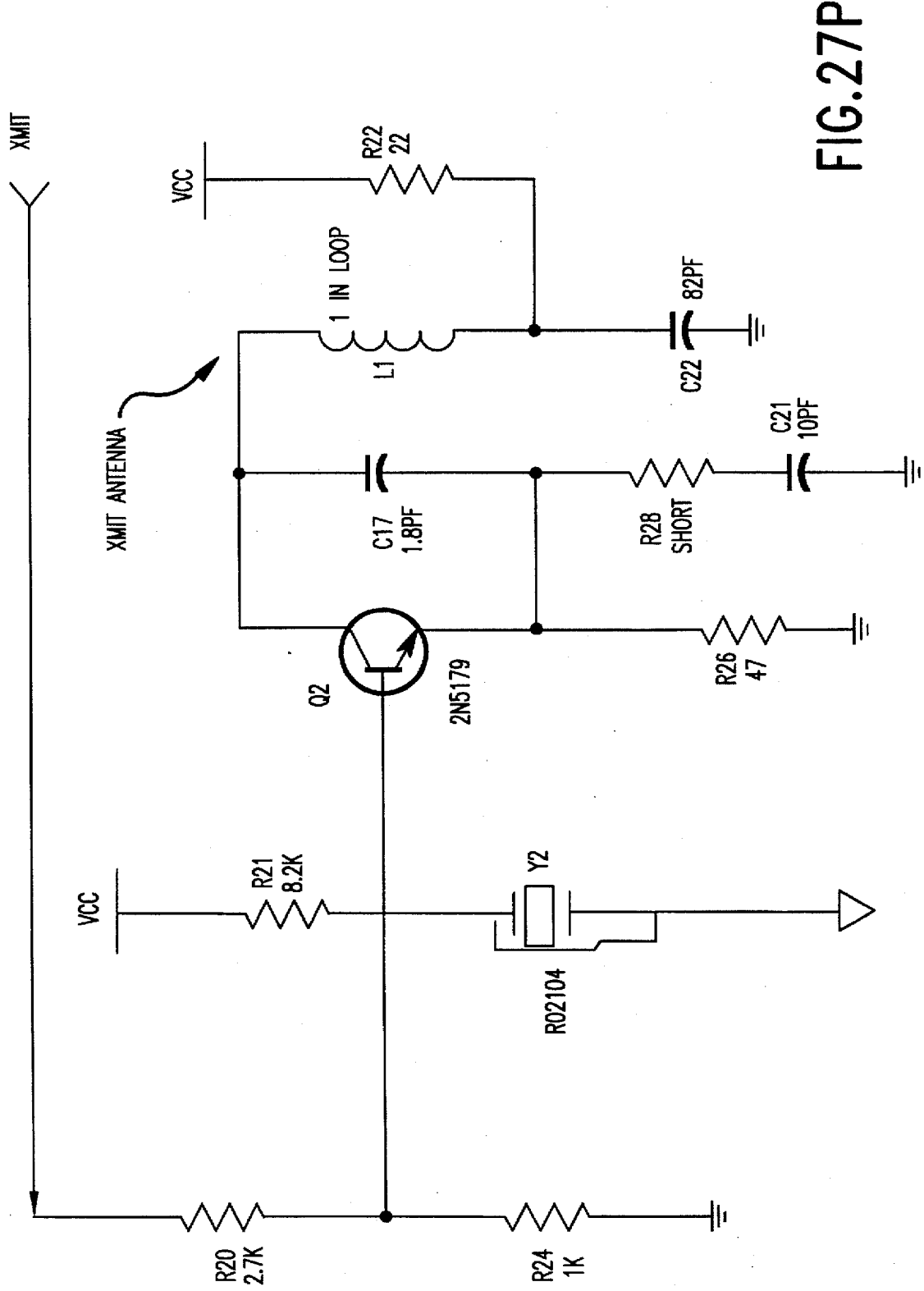
Figure 27Q:
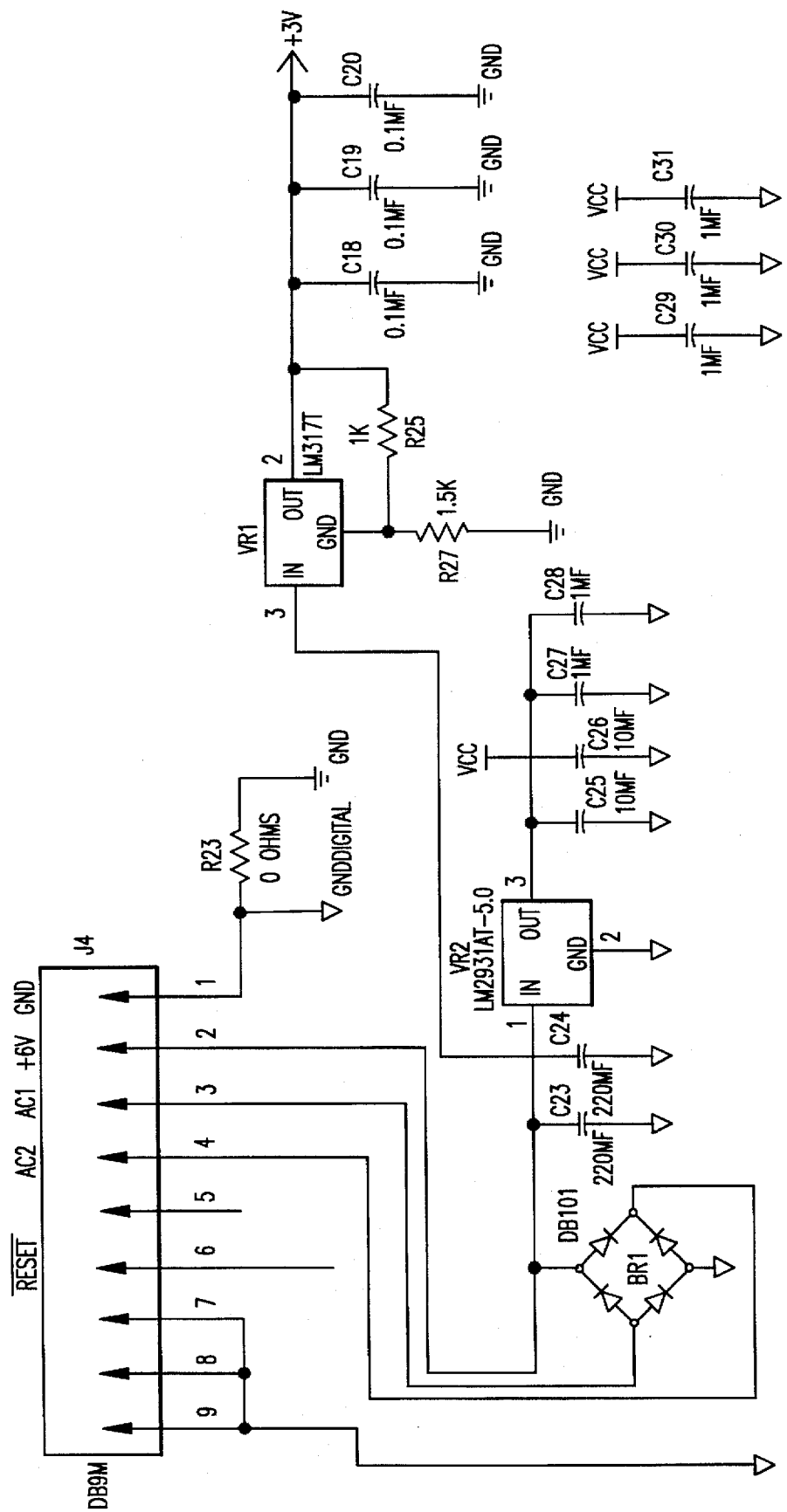

FIG. 27B of the monitor schematic illustrates the voltage regulators, the transmit circuit, and a microprocessor with associated memory, address decoding, etc., plus an RS232 port of the monitor.

The voltage regulators are for deriving V+ and VCC and +5V from either an AC voltage source or a 6 volt battery. VCC is nominally 5 volts dc, whereas the VRI output is nominally 3 volts dc. The regulator circuitry is quite conventional, and consists of voltage regulator integrated circuits VR1, VR2, bridge rectifier BR1, components C18 through C20, C23 through C31, R25 and R27. The capacitors are provided to make the dc voltages steady and stable. R25 and R27 are chosen to make the VR1 output 3 volts nominal. BR1 converts the optional AC input to a dc signal.

The transmit circuit comprises Q2, a 303.825 Mhz SAW resonator Y2, and components R20 through R22, R24, R26, R28, C17, C21 C22, and L1. This circuit is identical to the transmit circuit of the tag. L1 is an antenna. The circuit sends out a 303.825 Mhz radio signal amplitude modulated by the XMIT signal.

Microprocessor U8 is the heart of the remaining circuitry. It is a Motorola 68HC11 microprocessor but New Micros has had its ROM memory preprogrammed with a proprietary FORTH compiler. Thus all of the programming is done in the FORTH language. U8 also contains a built in analog to digital converter, which reads the ASH voltage (filtered by R30 and C32) on pin 47, and battery voltage +6V on pin 43 via divider R84/85. It also contains built in time circuits which are programmable to record the time of arrival of + and − edges of the RDATA signal arriving on pins 32 and 33. This makes it possible for the software to decode the incoming signal. The signals PA0 through PE7 are input or output ports most of which can be programmed for a variety of possible uses. It also contains a UART to be discussed later. It also contains the circuitry discussed earlier for generating TDATA.

Crystal Y1, C10, C11, and R8 constitute the standard circuit recommended by the manufacturer of U8 to provide the 8 Mhz clock signal which controls all time in U8. R10 connects 5 volts to pins 18 and 19 of U8 to prevent IRQ and XIRQ interrupts. J2 R9, and R29 allow the microprocessor to be operated in any of its four operating modes, although only one of those modes is normally used. (Normally, on J2, pin 1 is jumpered to pin 2 and pin 5 is jumpered to pin 6.)

U11 is a 32 kilobyte EPROM (erasable programmable read only memory) containing all of the application software. U12 and U13 are 32 kilobyte RAM (read and write memory) used for storing temporary data such as what tags are in the area. The microprocessor has only 64 kilobytes of address space, so these memory devices to some degree overlap memory that is inside the microprocessor. However, the microprocessor is smart enough to ignore external memory for those addresses where it has internal memory. Also, output port pin 28=PA6 selects U12 or U13 as the external RAM. Address bit A15 low selects EPROM, A15 high selects RAM. The data bus of these memory chips is bi-directional and feeds into ports PC0 through PC7.

The microprocessor also multiplexes the least significant address lines onto this port, so those address bits must be latched somewhere. Eight bit register U10 serves that purpose. U7, U9, and U1:D provide the gates necessary to enable reading or writing of the memory chips. LV1 is a low voltage detection circuit. Its open collector output generates a reset by pulling the RESET signal low when the circuit is first powered up or if a power failure occurs. The RESET signal causes microprocessor U8 to restart the software at its beginning. When no reset is called for, the not RESET line is held high by pullup resistor R11.

Microprocessor U8 contains circuitry to generate synchronous full duplex UART type serial data transfers on pins 20 and 21. However, the voltage levels are not proper for RS232 operation. U6 is provided to convert between the 5 volt levels used by the microprocessor and the +−8 volt levels required by RS232. The 8 volt supplies required for this are built into the U6 chip. However, the manufacturer of component U6 requires external capacitors C12 through C15 in order for its internal circuitry to function. Timing for the RS232 signals is also provided internal to the microprocessor, and the baud rate has been pre-selected by the ROM software provided by the manufacturer of U8.

Although the present invention has been described with particular reference to its preferred embodiments, it should be understood that many variations and modifications will now be obvious to those skilled in that art, and it is preferred, therefore, that the scope of the invention be limited, not by the specific disclosure herein, but only by the appended claims.

What is claimed is:

1. A monitor network for a tag location system having a plurality of tags which each transmit a tag signal unique to an individual tag and a central station, remote from the monitor network, for communicating with the monitor network using central station messages, and for determining the location of each individual tag based on information derived from the tag signals, the monitor network comprising:

a grid of monitors, positioned at a space adjacent to a location of the plurality of tags, for receiving tag signals and delivering monitor messages containing information derived from the tag signals to the central station, for receiving central station messages from the central station and for respectively issuing and delivering monitor messages, from and to individual monitors of the grid;

wherein the grid of monitors includes monitor software for causing selected adjacent monitors of the grid to transfer messages from a source to an intended destination by sequentially relaying the messages from one monitor to a selected adjacent monitor when the source and intended destination are not adjacent to one another;

wherein each monitor of the grid receives tag signals and monitor messages, respectively, from tags and monitors within range;

wherein each monitor of the grid transmits monitor messages including information derived from tag signals to a selected monitor of the grid for forwarding to the central station by sequentially relaying the monitor messages from one monitor to a selected adjacent monitor, and transmits received monitor messages to the selected adjacent monitor of the grid for forwarding to the central station by relaying the monitor messages from one monitor to a selected adjacent monitor; and wherein each monitor of the grid transmits central station messages by sequentially relaying the central station messages from one monitor to a selected adjacent monitor toward an intended monitor destination.

2. A monitor network according to claim 1, wherein each monitor of the grid has a unique identity for identifying the monitor as a unique individual of the grid and for indicating the location of the monitor in the grid.

3. A monitor network according to claim 2, wherein the monitor software includes means for automatically determining a first route for transferring messages from a source to an intended destination by sequentially relaying the messages from one monitor to a selected adjacent monitor when the source and the intended destination are not adjacent to one another.

4. A monitor network according to claim 3, wherein the monitor software includes means for automatically defining an alternative route when the communication from the source to the intended destination is not establish using the first route.

5. A monitor network according to claim 4, wherein the monitor software includes means for determining the identity of the monitor for forwarding monitor messages to the central station, and means for determining the identities of the monitors from which a given monitor receives monitor messages for forwarding to the central station.

6. A monitor network according to claim 5, wherein the monitor software includes means for generating a computed value for verifying the integrity of messages received by monitors and means for verifying the integrity of messages received by monitors based on the computed value.

7. A monitor network according to claim 1, wherein the monitor software includes means for transmitting an acknowledgment of receipt of a valid message and for transmitting a message until an acknowledgment is received.

8. A monitor network according to claim 1, wherein each monitor of the network includes means for measuring and recording a value indicating a signal strength of a tag signal for inclusion in a monitor message.

9. A monitor network according to claim 1, wherein each monitor of the network comprises:

a) a message transmitting and receiving device for transmitting and receiving monitor messages from selected neighboring monitors of the communication network and tag signals from tags within range of the monitor;

b) a memory device for storing: 1) an unique identity of the monitor, 2) a list of the unique identities of each neighboring monitor within range of the monitor, 3) an unique identity of each input partner monitor from which the monitor receives messages for forwarding to the central station, 4) an unique identity of an output partner monitor to which the monitor sends messages for forwarding to the central station, 5) monitor messages received from input monitors, 6) an identity of each tag within range, 7) a signal strength of the tag signal associated with each tag's identity; and c) a computer for: 1) measuring the signal strength of each tag signal received by the monitor and determining the identity of the tag which transmitted the tag signal, 2) determining significant changes in the signal strength of each tag signal, 3) storing the tag identity and associated signal strength, in the storage device, 4) periodically causing all tag identities and associated signal strengths stored in the memory device, to be transmitted to the output partner monitor by the message transmitting and receiving device, 5) forwarding monitor messages received from input partner monitors to the output partner monitor by the message transmitting and receiving device, 6) causing an acknowledgement message to be transmitted to a source by the message transmitting and receiving device upon receipt of a message from the source, 7) determining if an acknowledgement signal has been received from the output partner monitor in response to messages transmitted thereto, and 8) sending a distress signal to all neighboring monitors within range of the monitor if an acknowledgement signal is not received from the output partner monitor after a predetermined number of attempts;

wherein, tag signals issued by tags and received by the monitor directly from tags within range of the monitor or from input partner monitors are transmitted to the output partner monitor for forwarding to the central station, and wherein, monitor messages issued by the central station are forwarded toward the intended destination, if the central station and intended destination are not adjacent to one another.

10. A monitor network according to claim 9, wherein the message transmitting and receiving device of the monitor is a two-way radio.

11. A monitor of a monitor network of a tag location system for tracking the location of items each marked with a tag within a space to be monitored without the requirement that the tags be polled, the monitor comprising:

a) a message transmitting and receiving device for transmitting and receiving monitor messages from selected neighboring monitors of the communication network and tag signals from tags within range of the monitor;

b) a memory device for storing: 1) an unique identity of the monitor, 2) a list of the unique identities of each neighboring monitor within range of the monitor, 3) an unique identity of each input partner monitor from which the monitor receives messages for forwarding to the central station, 4) an unique identity of an output partner monitor to which the monitor sends messages for forwarding to the central station, 5) monitor messages received from input monitors, 6) an identity of each tag within range, 7) a signal strength of the tag signal associated with each tag's identity; and c) a computer for: 1) measuring the signal strength of each tag signal received by the monitor and determining the identity of the tag which transmitted the tag signal, 2) determining significant changes in the signal strength of each tag signal, 3) storing the tag identity and associated signal strength, in the storage device, 4) periodically causing all tag identities and associated signal strengths stored in the memory device, to be transmitted to the output partner monitor by the message transmitting and receiving device, 5) forwarding monitor messages received from input partner monitors to the output partner monitor by the message transmitting and receiving device, 6) causing an acknowledgement message to be transmitted to a source by the message transmitting and receiving device upon receipt of a message from the source, 7) determining if an acknowledgement signal has been received from the output partner monitor in response to messages transmitted thereto, and 8) sending a distress signal to all neighboring monitors within range of the monitor if an acknowledgement signal is not received from the output partner monitor after a predetermined number of attempts;

wherein, tag signals issued by tags and received by the monitor directly from tags within range of the monitor or from input partner monitors are transmitted to the output partner monitor for forwarding to the central station, and wherein, monitor messages issued by the central station are forwarded toward the intended destination, if the central station and intended destination are not adjacent to one another.

12. A monitor according to claim 11, wherein the message transmitting and receiving device is a radio.

* * * * *